（12）United States Patent
Umetsu et al.

(10) Patent No.: US 11,107,639 B2
(45) Date of Patent: Aug. 31, 2021

(54) POSITIVE ELECTRODE PRECURSOR

(71) Applicant: Asahi Kasei Kabushiki Kaisha, Tokyo (JP)

(72) Inventors: Kazuteru Umetsu, Tokyo (JP); Nobuhiro Okada, Tokyo (JP); Keita Kusuzaka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/761,085

(22) PCT Filed: Jan. 20, 2017

(86) PCT No.: PCT/JP2017/002006
§ 371 (c)(1),
(2) Date: Mar. 16, 2018

(87) PCT Pub. No.: WO2017/126687
PCT Pub. Date: Jul. 27, 2017

(65) Prior Publication Data
US 2018/0261399 A1 Sep. 13, 2018

(30) Foreign Application Priority Data

Jan. 22, 2016 (JP) .............................. JP2016-010895
Aug. 8, 2016 (JP) .............................. JP2016-155698
Aug. 8, 2016 (JP) .............................. JP2016-155837

(51) Int. Cl.
*H01G 11/06* (2013.01)
*H01G 11/24* (2013.01)
(Continued)

(52) U.S. Cl.
CPC ............ *H01G 11/06* (2013.01); *H01G 11/24* (2013.01); *H01G 11/26* (2013.01); *H01G 11/34* (2013.01);
(Continued)

(58) Field of Classification Search
CPC .................................. H01B 1/04; H01G 11/06
See application file for complete search history.

(56) References Cited

U.S. PATENT DOCUMENTS 5,427,875 A    6/1995    Yamamoto et al.
5,702,843 A   12/1997    Mitate et al.
(Continued)

FOREIGN PATENT DOCUMENTS

CN    1954397 A    4/2007
CN    101847516 A    9/2010
(Continued)

OTHER PUBLICATIONS

Barrett et al., "The Determination of Pore Volume and Area Distributions in Porous Substances: Computations from Nitrogen Isotherms," The Journal of the American Chemical Society, 73: 373-380 (1951).
(Continued)

*Primary Examiner* — William D Young
(74) *Attorney, Agent, or Firm* — Morgan, Lewis & Bockius LLP

(57) ABSTRACT

This positive electrode precursor includes: a positive electrode active material containing a carbon material and an alkali metal compound, wherein $5 \leq A \leq 35$, when A (g/m$^2$) is a weight of the alkali metal compound in the positive electrode active material layer at one surface of the positive electrode precursor, $10 \leq B \leq 100$ as well as $0.20 \leq A/B \leq 1.00$, when B (g/m$^2$) is a weight of the positive electrode active material in the positive electrode active material layer, and $1 \leq C \leq 20$, when C (m$^2$/cm$^2$) is a specific surface area per unit area as measured by the BET method at one surface of the positive electrode precursor.

1 Claim, 2 Drawing Sheets

(51) Int. Cl.
*H01G 11/64* (2013.01)
*H01M 4/1393* (2010.01)
*H01M 10/052* (2010.01)
*H01M 10/0567* (2010.01)
*H01M 10/0585* (2010.01)
*H01G 11/84* (2013.01)
*H01G 11/34* (2013.01)
*H01G 11/26* (2013.01)
*H01G 11/86* (2013.01)
*H01G 11/46* (2013.01)

(52) U.S. Cl.
CPC ............. *H01G 11/64* (2013.01); *H01G 11/84* (2013.01); *H01G 11/86* (2013.01); *H01M 4/1393* (2013.01); *H01M 10/052* (2013.01); *H01M 10/0567* (2013.01); *H01M 10/0585* (2013.01); *H01G 11/46* (2013.01); *Y02E 60/13* (2013.01); *Y02T 10/70* (2013.01)

(56) References Cited

U.S. PATENT DOCUMENTS

| | | |
|---|---|---|
| 5,928,812 A | 7/1999 | Xue |
| 6,294,292 B1 | 9/2001 | Tsushima et al. |
| 10,396,361 B2 | 8/2019 | Kamijo et al. |
| 10,403,447 B2 | 9/2019 | Umetsu et al. |
| 2004/0126659 A1 | 7/2004 | Graetz et al. |
| 2005/0130043 A1 | 6/2005 | Gao et al. |
| 2005/0233218 A1 | 10/2005 | Ogawa et al. |
| 2005/0271944 A1 | 12/2005 | Suhara et al. |
| 2006/0105242 A1 | 5/2006 | Sato et al. |
| 2006/0134517 A1 | 6/2006 | Sawa et al. |
| 2006/0194114 A1 | 8/2006 | Saito |
| 2006/0209493 A1* | 9/2006 | Fujino .................. H01G 11/38 361/306.3 |
| 2007/0020385 A1 | 1/2007 | Naoi et al. |
| 2007/0281216 A1 | 12/2007 | Petrat et al. |
| 2008/0055819 A1* | 3/2008 | Taguchi ................ H01G 9/155 361/504 |
| 2008/0254368 A1 | 10/2008 | Ooyama et al. |
| 2009/0174986 A1 | 7/2009 | Matsui et al. |
| 2010/0255377 A1 | 10/2010 | Tsubata et al. |
| 2011/0039160 A1 | 2/2011 | Takahata et al. |
| 2011/0159382 A1 | 6/2011 | Matsui et al. |
| 2012/0050950 A1 | 3/2012 | Kim et al. |
| 2012/0094177 A1 | 4/2012 | Honoki et al. |
| 2012/0212186 A1 | 8/2012 | Fujii et al. |
| 2013/0155577 A1 | 6/2013 | Yang et al. |
| 2013/0208405 A1 | 8/2013 | Okada et al. |
| 2013/0224608 A1 | 8/2013 | Sasaki et al. |
| 2014/0292281 A1 | 10/2014 | Kiya et al. |
| 2014/0295274 A1 | 10/2014 | Kim et al. |
| 2015/0115206 A1 | 4/2015 | Fujii et al. |
| 2015/0162598 A1 | 6/2015 | Kim et al. |
| 2015/0255781 A1 | 9/2015 | Hashimoto |
| 2015/0311002 A1 | 10/2015 | Okada et al. |
| 2017/0200943 A1 | 7/2017 | Kawakami |
| 2017/0207459 A1 | 7/2017 | Okada et al. |
| 2017/0244098 A1 | 8/2017 | Duong et al. |

FOREIGN PATENT DOCUMENTS

| | | |
|---|---|---|
| CN | 103000880 A | 3/2013 |
| CN | 103700860 A | 4/2014 |
| CN | 104037418 A | 9/2014 |
| EP | 2219247 A1 | 8/2010 |
| EP | 2485303 A1 | 8/2012 |
| EP | 2284934 B1 | 10/2012 |
| JP | H04-328278 A | 11/1992 |
| JP | H05-343066 A | 12/1993 |
| JP | 2001-84998 A | 3/2001 |
| JP | 2001-167767 A | 6/2001 |
| JP | 3287376 B2 | 6/2002 |
| JP | 2002-252028 A | 9/2002 |
| JP | 2003-297424 A | 10/2003 |
| JP | 2004-095188 A | 3/2004 |
| JP | 2004-362859 A | 12/2004 |
| JP | 2006-261516 A | 9/2006 |
| JP | 2007-035770 A | 2/2007 |
| JP | 2008-177263 A | 7/2008 |
| JP | 2008-181830 A | 8/2008 |
| JP | 2008-251434 A | 10/2008 |
| JP | 2010-205827 A | 9/2010 |
| JP | 2010-225291 A | 10/2010 |
| JP | 4597727 B | 12/2010 |
| JP | 4738042 B2 | 8/2011 |
| JP | 2011-249507 A | 12/2011 |
| JP | 2012-074467 A | 4/2012 |
| JP | 2012-174437 A | 9/2012 |
| JP | 5278467 B2 | 9/2013 |
| JP | 2014-143380 A | 8/2014 |
| JP | 2014-146448 A | 8/2014 |
| JP | 2014-199723 A | 10/2014 |
| JP | 2015-072867 A | 4/2015 |
| JP | 2015-092478 A | 5/2015 |
| JP | 2016-012620 A | 1/2016 |
| WO | 2012/070397 A1 | 5/2012 |
| WO | 2012/081348 A1 | 6/2012 |
| WO | 2014/088074 A1 | 6/2014 |
| WO | 2014/134967 A1 | 9/2014 |
| WO | 2015/141808 A1 | 9/2015 |
| WO | 2016/006632 A1 | 1/2016 |
| WO | 2016/010056 A1 | 1/2016 |

OTHER PUBLICATIONS

Lippens et al., "Studies on Pore Systems in Catalysts: The t Method," Journal of Catalysts, 4: 319-323 (1965).
Mikhail et al., "Investigations of a Complete Pore Structure Analysis: Analysis of Micropores," Journal of Colloid and Interface Science, 26: 45-53 (1968).
International Preliminary Report on Patentability and Written Opinion issued in corresponding International Patent Application No. PCT/JP2017/002006 dated Aug. 2, 2018.
Supplemental European Search Report issued in corresponding European Patent Application No. 17741564.3 dated Nov. 23, 2018.
International Search Report issued in corresponding International Patent Application No. PCT/JP2017/002006 dated Apr. 18, 2017.
Office Action issued in corresponding Japanese Patent Application No. 2017-509059 dated Sep. 12, 2017.
Office Action issued in U.S. Appl. No. 16/070,425 dated Jan. 24, 2020.

\* cited by examiner

POSITIVE ELECTRODE PRECURSOR

TECHNICAL FIELD

The present invention relates to a positive electrode precursor.

BACKGROUND ART

In recent years, a power smoothing system of wind power generation or a midnight power storage system, a household dispersive power storage system based on solar power generation technologies, a power storage system for an electric car, and etc. have been received attention from the viewpoint of effective utilization of energy aiming at conservation of global environment and resource saving.

The first requirement of a battery to be used in these power storage systems is high energy density. Researches on a lithium ion battery have been energetically undergoing rapid development as a strong candidate of a high energy density battery which is capable of responding to such requirements.

The second requirement is high output characteristics. For example, in a combined case of a highly efficient engine and a power storage system (for example, a hybrid electric car) or a combined one of a fuel cell and a power storage system (for example, a fuel cell electric car), high output discharging characteristics in the power storage system have been required during its acceleration.

At present, an electric double layer capacitor, a nickel-hydrogen battery, and etc. have been undergoing development as a high output storage device.

Among the electric double layer capacitors, the one using an activated carbon as an electrode has output characteristics of about 0.5 to 1 kW/L. This electric double layer capacitor has been considered to be the most suitable device in a field where the high output is required, because it also has high durability (cycle characteristics and storage characteristics at high temperatures). However, an energy density thereof is only about 1 to 5 Wh/L. Then, further improvement of the energy density has been necessary.

On the other hand, a nickel-hydrogen battery which has been adopted in a hybrid electric car at present has a high output equivalent to that of the electric double layer capacitor and an energy density of about 160 Wh/L. However, energetic attempts have been made to further enhance the energy density and output thereof as well as to enhance durability (particularly, stability at high temperatures).

Another attempts for a high output have also been made in lithium ion batteries. For example, such a lithium ion battery has been developed which is capable of providing a high output of over 3 kW/L at 50% depth of discharge (the depth indicates a state of discharging of the storage element in terms of percentage). However, the energy density thereof is equal to or lower than 100 Wh/L, i.e., it is designed to intentionally suppress the high energy density which is the greatest characteristics of the lithium ion battery. Durability (cycle characteristics and storage characteristics at high temperatures) thereof is inferior to that of the electric double layer capacitor. Therefore, it is limited to be used in a narrower range of discharging depth of 0 to 100% to hold practical durability. Since a practical capacitance is considered to be further decreased, energetic researches have been made to further enhance the durability.

As described above, an application for practical use of the storage element having a high energy density, high output characteristics, and durability has been strongly required.

However, each of these existing storage elements has its merits and demerits. Namely, a new storage element satisfying these technological requirements has been required. The storage element called a lithium ion capacitor, i.e., one of nonaqueous hybrid capacitors has been received attention as a strong candidate thereof, and researches on this have energetically undergone development.

A lithium ion capacitor (nonaqueous hybrid capacitor) is one of storage elements using a nonaqueous electrolytic solution containing a lithium salt, and carrying out charging and discharging, not only in the positive electrode by non-Faraday reaction based on adsorption/desorption of anions which is similar to the case of the electric double layer capacitor at equal to or higher than about 3 V, but also in a negative electrode by Faraday reaction based on occlusion/releasing of lithium ions which is similar to the case of the lithium ion battery.

In summarizing the aforementioned electrode materials and characteristics, the high output as well as high durability is both realized, however, the energy density is decreased (for example, assuming the density of one time) in the case where a material such as an activated carbon, etc. is used as the electrode, and charging and discharging are carried out by adsorption/desorption (non-Faraday reaction) of ions at a surface of the activated carbon. On the other hand, in the case where an oxide or a carbon material is used as the electrode, and charging and discharging are carried out by Faraday reaction, the energy density is increased (for example, a density of ten times obtainable by non-Faraday reaction using the activated carbon), however, problems occur in the durability and the output characteristics.

The electric double layer capacitor as a combination of these electrode materials has characteristics wherein an activated carbon (having an energy density of one time) is used as a positive electrode and a negative electrode, charging and discharging at both of electrodes proceed by non-Faraday reaction, and an energy density (one time at the positive electrode×one time at the negative electrode=1) is low in spite of a high output as well as high durability.

The lithium ion secondary battery have characteristics wherein a lithium transition metal oxide (having an energy density often times) is used as a positive electrode, a carbon material (having an energy density of ten times) is used as a negative electrode, and charging and discharging at both electrodes proceed by Faraday reaction. However, it has a problem in output characteristics and durability in spite of a high energy density (ten times at the positive electrode×ten times at the negative electrode=100). Furthermore, depth of discharging should be restricted to satisfy high durability which is required in a hybrid electric car, and 10 to 50% of the energy can only be used for the lithium ion secondary battery.

The lithium ion capacitor has characteristics wherein an activated carbon (having an energy density of one time) is used as a positive electrode, a carbon material (having an energy density of ten time) is used as a negative electrode, and charging at positive electrode proceeds by Faraday reaction, although discharging at the negative electrode proceeds by non-Faraday reaction. It is a novel asymmetric capacitor possessing the combined characteristics of the electric double layer capacitor as well as the lithium ion capacitor, and having characteristics wherein a high energy density (one time at the positive electrode×ten times at the negative electrode=10), in spite of the high output and high durability, is exhibited, and the depth of discharging is not needed to be restricted as is the case with the lithium secondary battery.

In the lithium ion capacitor, superior I/O characteristics as well as and the high energy density is realized by pre-doping lithium in advance to the negative electrode. Various methods with respect to this pre-doping method have been proposed. A method for supplying lithium ions to a negative electrode active material in the fastest and most reliable way is to attach metal lithium on a surface of the negative electrode active material layer, and pour it into a nonaqueous electrolytic solution.

As a pre-doping method using this metal lithium, there have been proposed specifically, for example, the following methods.

In Patent Document 1, there has been proposed a pre-doping method by crimping a metal lithium foil onto a negative electrode active material layer. However, the metal lithium foil, being now produced industrially, usually has a thickness of equal to or more than 30 µm. When a capacitance of the metal lithium foil having a thickness of equal to or more than 30 µm is calculated from the theoretical capacitance (3.86 $Ah/m^2$) of metal lithium, it can contain lithium having a capacitance of equal to or more than 61.9 $Ah/m^2$ per unit area. Accordingly, an excessively thick negative electrode having a thickness of equal to or more than 100 µm must be used to pre-dope a suitable amount of lithium ions to the negative electrode. A method for attaching a stripe-shape metal lithium foil to the electrode is applied in replace of using such an excessively thick negative electrode. According to this method, however, doping of lithium ions becomes unstable in the negative electrode.

Therefore, the pre-doping method using the metal lithium foil had a problem of not exhibiting the high output of the element.

In Patent Document 2, there has been proposed a method for pre-doping lithium ions to the negative electrode by decomposing lithium oxalate by charging and discharging with addition of the lithium oxalate to the negative electrode or the electrolytic solution. However, there is a problem that the lithium oxalate which has low oxidation potential causes gas generation by gradual decomposition thereof, and remains in the electrolytic solution or the negative electrode during a long period of storage.

On the other hand, various investigations have been conducted on a positive electrode of the aforementioned storage element (particularly, the lithium ion secondary battery).

For example, in Patent Document 3, there has been proposed a lithium ion secondary battery with the positive electrode containing lithium carbonate, and having a mechanism for interrupting the current in response to increase in internal pressure of the battery. In Patent Document 4, there has been proposed a lithium ion secondary battery using a lithium composite oxide such as lithium manganate, etc. as the positive electrode, and suppressing elution of manganese by containing lithium carbonate in the positive electrode. In Patent Document 5, there has been proposed a method for oxidizing various kinds of lithium compounds in the positive electrode so as to recover the capacitance of a deteriorated storage element. In Patent Document 6, there has been proposed a method for containing a carbonate salt, a hydroxide, and a silicate salt as an antacid in the activated carbon positive electrode. In Patent Document 7, there has been proposed a method for suppressing capacitance deterioration accompanied by charging and discharging cycles, and increasing the initial capacitance by addition of lithium carbonate to a composite oxide containing lithium and nickel in the positive electrode.

These methods, however, have not considered at all pre-doping to the negative electrode in the nonaqueous hybrid capacitor, and there has remained much room for enhancing efficiency of pre-doping and exhibiting a higher capacitance of the nonaqueous hybrid capacitor.

PRIOR ART DOCUMENTS

Patent Documents

[Patent Document 1] Japanese Patent Publication No. 4738042
[Patent Document 2] Japanese Patent Publication No. 3287376
[Patent Document 3] Japanese Unexamined Patent Publication No. H4-328278
[Patent Document 4] Japanese Unexamined Patent Publication No. 2001-167767
[Patent Document 5] Japanese Unexamined Patent Publication No. 2012-174437
[Patent Document 6] Japanese Unexamined Patent Publication No. 2006-261516
[Patent Document 7] Japanese Unexamined Patent Publication No. 2001-84998

Non-Patent Documents

[Non-patent Document 1] E. P. Barrett, L. G. Joyner, and P. Halenda, J. Am. Chem. Soc., 73, 373(1951)
[Non-patent Document 2] B. C. Lippens, J. H. de Boer, J. Catalysis, 4319 (1965)
[Non-patent Document 3] R. S. Mikhail, S. Brunauer, E. E. Bodor, J. Colloid Interface Sci., 26, 45 (1968)

DISCLOSURE OF THE INVENTION

Problems to be Solved by the Invention

The present invention has been proposed in view of the status quo.

The problem to be solved by the present invention is to provide the positive electrode precursor composed of the carbon material and the alkali metal compound for the nonaqueous hybrid capacitor which is capable of not only carrying out pre-doping to the negative electrode in a short time by promoting decomposition of the alkali metal compound, but also having a high capacitance; and to provide the production method of the nonaqueous hybrid capacitor which is capable of pre-doping lithium ions to the negative electrode without using metal lithium, and having less gas generation during storage at high temperatures as well as excellent charging and discharging cycle characteristics under a high load.

Means for Solving the Problems

The present invention has been accomplished based on this knowledge.

Namely, the present invention has the following constitutions:
[1] A positive electrode precursor comprising a positive electrode active material containing a carbon material and an alkali metal compound,
wherein $5 \leq A \leq 35$, when A ($g/m^2$) is a weight of the alkali metal compound in the positive electrode active material layer at one surface of the positive electrode precursor, $10 \leq B \leq 100$ as well as $0.20 \leq A/B \leq 1.00$, when B (g/m$^2$) is a weight of the positive electrode active material in the positive electrode active material layer, and $1 \leq C \leq 20$, when C (m$^2$/cm$^2$) is a specific surface area per unit area measured by the BET method at one surface of the positive electrode precursor.

[2] The positive electrode precursor according to [1], wherein the alkali metal compound is the compound selected from the group consisting of an alkali metal carbonate salt, lithium oxide, and lithium hydroxide.

[3] The positive electrode precursor according to [1], wherein the alkali metal compound is an alkali metal carbonate salt, and the carbonate salt is one or more kinds selected from lithium carbonate, sodium carbonate, potassium carbonate, rubidium carbonate, and cesium carbonate.

[4] The positive electrode precursor according to [3], wherein at least lithium carbonate is contained in an amount of equal to or more than 10% by weight in the alkali metal compound.

[5] The positive electrode precursor according to [3] or [4], wherein $5 \leq X \leq 50$, when X % by weight is a weight ratio of the alkali metal compound in the positive electrode active material layer of the positive electrode precursor, $5 \leq S_1 \leq 60$, and $0.50 \leq S_1/X \leq 2.00$, when $S_1$% is an area of oxygen whose luminance values are binarized based on the average luminance value in the oxygen mapping of the surface of the positive electrode precursor measured by a scanning electron microscope—an energy-dispersive X-ray spectroscopy (SEM-EDX).

[6] The positive electrode precursor according to [5], wherein $5 \leq S_2 \leq 60$, and $0.50 \leq S_2/X \leq 2.00$, when $S_2$% is an area of oxygen whose luminance values are binarized based on the average luminance value in the oxygen mapping obtained by SEM-EDX measurement of the cross section of the positive electrode precursor which is processed by a broad ion beam (BIB).

[7] The positive electrode precursor according to any one of [1] to [6], wherein $0.3 \leq D \leq 5.0$ and $0.5 \leq E \leq 10$ are satisfied, when D (μL/cm$^2$) is mesopore volume per unit area derived from fine pores having a diameter of equal to or larger than 20 Å and equal to or smaller than 500 Å, the diameter of which is calculated by the BJH method at one surface of the positive electrode precursor, and E (μL/cm$^2$) is micropore volume per unit area derived from fine pores having a diameter of smaller than 20 Å, the volume of which is calculated by the MP method.

[8] The positive electrode precursor according to any one of [1] to [7], wherein $0.05 \leq C/B \leq 0.5$ is satisfied.

[9] The positive electrode precursor according to any one of [1] to [8], wherein an average particle diameter of the alkali metal compound is equal to or larger than 0.1 μm and equal to or smaller than 10 μm.

[10] A production method for a nonaqueous hybrid capacitor comprising the following steps of:

(1) a step of accommodating into a casing a laminated body composed of the positive electrode precursor according to any one of [1] to [9], a negative electrode containing a negative electrode active material which is capable of intercalating/releasing lithium ions, and a separator, (2) a step of pouring into the casing a nonaqueous electrolytic solution containing electrolytes including lithium ions, and (3) a step of decomposing the alkali metal compound by applying a voltage between the positive electrode precursor and a negative electrode, in this order, wherein $A_1/G_1$ is equal to or larger than 1.0 (g/Ah) and equal to or smaller than 2.0 (g/Ah), when $A_1$ (g/m$^2$) is an amount of the alkali metal compound per unit area in the positive electrode precursor, $G_1$ (Ah/m$^2$) is a capacitance per unit area of the negative electrode, and the voltage which is applied in the step of decomposing the alkali metal compound is equal to or higher than 4.2 V.

[11] The production method for the nonaqueous hybrid capacitor, according to [10], wherein $A_1/B_1$ is equal to or larger than 0.20 and equal to or smaller than 1.00, when $B_1$ (g/m$^2$) is a weight per unit area of the positive electrode active material.

[12] The production method for the nonaqueous hybrid capacitor, according to [10] or [11], comprising Lewis acid in an amount of equal to or more than 0.5% by weight and equal to or less than 5% by weight in the nonaqueous electrolytic solution.

[13] The production method for the nonaqueous hybrid capacitor, according to any one of [10] to [12], comprising a crown ether in an amount of equal to or more than 1.0% by weight and equal to or less than 10.0% by weight in the nonaqueous electrolytic solution.

[14] A nonaqueous hybrid capacitor comprising the positive electrode precursor according to any one of [1] to [9].

[15] A storage module comprising the nonaqueous hybrid capacitor according to [14].

[16] A power regeneration system comprising the nonaqueous hybrid capacitor according to [14] or the storage module according to [15].

[17] A power load leveling system comprising the nonaqueous hybrid capacitor according to [14] or the storage module according to [15].

[18] A non-service interruption power source system comprising the nonaqueous hybrid capacitor according to [14] or the storage module according to [15].

[19] A non-contact electric supply system comprising the nonaqueous hybrid capacitor according to [14] or the storage module according to [15].

[20] An energy harvest system comprising the nonaqueous hybrid capacitor according to [14] or the storage module according to [15].

[21] A power storage system comprising the nonaqueous hybrid capacitor according to [14] or the storage module according to [15].

Effects of the Invention

According to the present invention, there can be provided the positive electrode precursor for the nonaqueous hybrid capacitor, which is capable of carrying out pre-doping to the negative electrode in a short time by promoting decomposition of the alkali metal compound, and possessing a high capacitance as well as the production method for the nonaqueous hybrid capacitor which is capable of pre-doping lithium ions to the negative electrode without using a metal lithium, and having less gas generation during storage at high temperatures as well as good charging and discharging cycle characteristics under a high load.

BEST MODE FOR CARRYING OUT THE INVENTION

Figure 1:
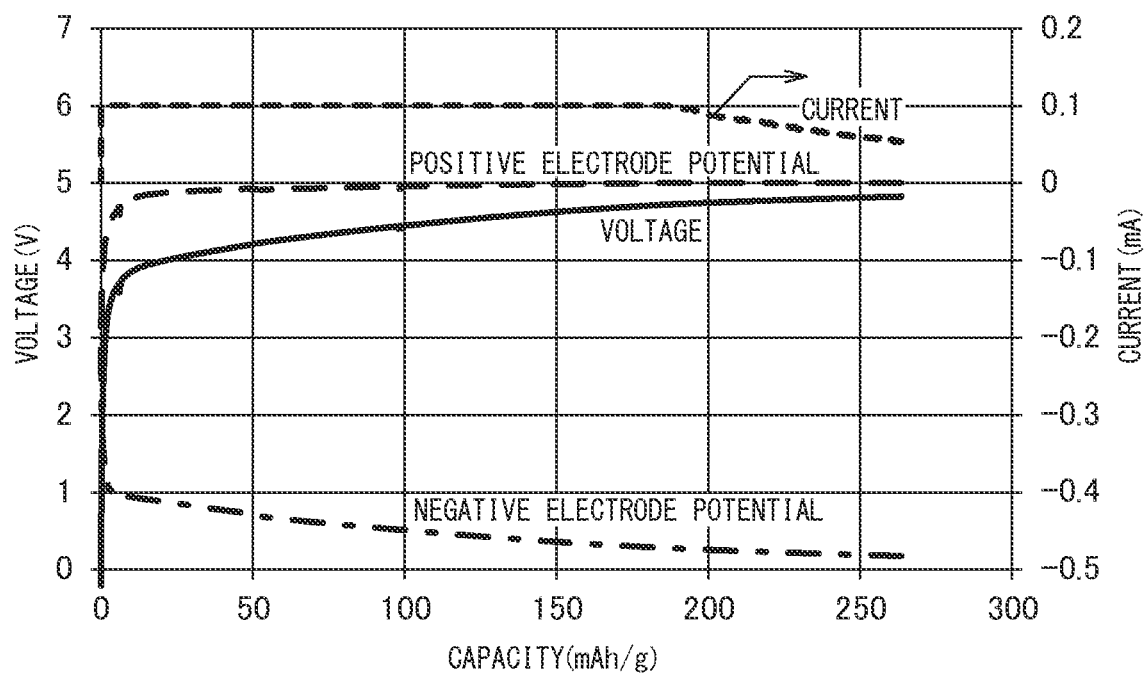
FIG. 1 is a drawing showing charging curves at the initial charging of the nonaqueous hybrid capacitor obtained in Example 1.

An explanation on embodiments of the present invention will be given below.

The nonaqueous hybrid capacitor generally has a positive electrode, a negative electrode, a separator, an electrolytic solution, and a casing as main configuration elements. As the electrolytic solution, an organic solvent dissolved with an electrolyte such as a lithium salt, etc., (hereafter, it is referred to as the nonaqueous electrolytic solution) is used.

Herein, a positive electrode state before a pre-doping step to be described later is defined as the positive electrode precursor, and a positive electrode state after the pre-doping step is defined as the positive electrode. The positive electrode precursor in the present invention is characterized in comprising a positive electrode active material containing a carbon material, and an alkali metal compound. The positive electrode precursor in the present invention may be simply called with respect to the desired construction of the nonaqueous hybrid capacitor, an electrode before pre-doping, a half-side electrode before pre-doping, a half cell, a coated electrode, a dried electrode, and etc.

The positive electrode precursor of the present invention is composed of the following first and second aspects, and further the production method for the hybrid capacitor using the positive electrode precursor is composed of the third aspect, wherein each aspect may be combined arbitrarily.

[The First Aspect]

[1] The first aspect in the present invention is
the positive electrode precursor comprising the positive electrode active material containing a carbon material, and the alkali metal compound,
wherein $5 \leq A \leq 35$, when A (g/m$^2$) is a weight of the alkali metal compound in the positive electrode active material layer at one surface of the positive electrode precursor,
$10 \leq B \leq 100$ as well as $0.20 \leq A/B \leq 1.00$, when B (g/m$^2$) is a weight of the positive electrode active material in the positive electrode active material layer, and
$1 \leq C \leq 20$, when C (m$^2$/cm$^2$) is a specific surface area per unit area measured by the BET method at one surface of the positive electrode precursor.

[The Second Aspect]

[5] The second aspect of the present invention is
the positive electrode precursor,
wherein $5 \leq X \leq 50$, when X % by weight is a weight ratio of the alkali metal compound in the positive electrode active material layer of the positive electrode precursor,
$5 \leq S_1 \leq 60$, and $0.50 \leq S_1/X \leq 2.00$, when $S_1$% is an area of oxygen whose luminance values are binarized based on the average luminance value in the oxygen mapping of the surface of the positive electrode precursor measured by a scanning electron microscope—an energy-dispersive X-ray spectroscopy (SEM-EDX).

[The Third Aspect]

[10] The third aspect of the present invention is the production method for the nonaqueous hybrid capacitor comprising the following steps of:
(1) a step of accommodating into the casing a laminated body composed of the positive electrode precursor according to any one of [1] to [9], the negative electrode containing the negative electrode active material which is capable of intercalating/releasing lithium ions, and a separator,
(2) a step of pouring into the casing the nonaqueous electrolytic solution containing electrolytes including lithium ions and,
(3) a step of decomposing the alkali metal compound by applying a voltage between the positive electrode precursor and the negative electrode, in this order,
wherein $A_1/G_1$ is equal to or larger than 1.0 (g/Ah) and equal to or smaller than 2.0 (g/Ah), when $A_1$ (g/m$^2$) is an amount of the alkali metal compound per unit area in the positive electrode precursor, $G_1$ (Ah/m$^2$) is a capacitance per unit area of the negative electrode, and the voltage which is applied in the step of decomposing the alkali metal compound is equal to or higher than 4.2 V.

[Positive Electrode]

The positive electrode has a positive electrode power collector, and a positive electrode active material layer present at one surface or both surfaces thereof. The positive electrode is characterized in containing the alkali metal compound as the positive electrode precursor before assembling of a storage element. As will be described later, it is preferable, in the present invention, that alkali metal ions are pre-doped to the negative electrode in an assembly step of the storage element, and as the pre-doping method, it is preferable that a voltage is applied between the positive electrode precursor and the negative electrode, after assembling of the storage element using the positive electrode precursor containing the alkali metal compound, the negative electrode, the separator, the casing, and the nonaqueous electrolytic solution. It is preferable that the alkali metal compound is contained in the positive electrode active material layer formed on the positive electrode power collector of the positive electrode precursor.

[Positive Electrode Active Material Layer]

It is preferable that the positive electrode active material layer contains the positive electrode active material including a carbon material, and it may contain, other than this, conductive fillers, a binder, a dispersion stabilizer, etc., as needed.

It is characterized that the alkali metal compound is contained in or at the surface of the positive electrode active material layer of the positive electrode precursor.

[Positive Electrode Active Material]

It is preferable that the positive electrode active material contains the carbon material. It is more preferable to use as this carbon material a carbon nanotube, a conductive polymer, or a porous carbon material, and further preferable to use an activated carbon. As the positive electrode active material, one or more kinds of materials may be used by mixing, and materials other than the carbon material (for example, a composite oxide of lithium and a transition metals, etc.) may be contained.

It is preferable that a content ratio of the carbon material is equal to or higher than 50% by weight, and more preferably equal to or higher than 60% by weight with respect to a total amount of the aforementioned positive electrode active material. A content ratio of the carbon material can be 100% by weight, however, it is preferable to be, for example, equal to or lower than 95% by weight from the viewpoint of exhibiting good performance in combination with other materials, and it may be equal to or lower than 90% by weight. The upper limit and the lower limit of the content ratio of the carbon material may be combined arbitrarily.

When the activated carbon is used as the positive electrode active material, the activated carbon and raw materials thereof are not particularly restricted. However, it is preferable to control an optimal pore size of the activated carbon in order to satisfy both of high I/O characteristics and high energy density. Specifically, when $V_1$ (cc/cm$^2$) is mesopore volume obtained from that of fine pores having a diameter of equal to or larger than 20 Å and equal to or smaller than 500 Å, being calculated by the BJH method, and $V_2$ (cc/cm$^2$) is micropore volume obtained from that of fine pores having a diameter of smaller than 20 Å, being calculated by the MP method, (1) the activated carbon satisfying $0.3<V_1\leq0.8$, $0.5\leq V_2\leq1.0$, and having a specific surface area measured by the BET method of equal to or larger than 1,500 m$^2$/g and equal to or smaller than 3,000 m$^2$/g (hereafter it is also referred to as activated carbon 1) is preferable to exhibit high I/O characteristics, and (2) the activated carbon satisfying $0.8\leq V_1\leq2.5$, $0.8\leq V_2\leq3.0$, and having a specific surface area measured by the BET method of equal to or larger than 2,300 m$^2$/g and equal to or smaller than 4,000 m$^2$/g (hereafter it is also referred to as activated carbon 2) is preferable to obtain high energy density.

The BET specific surface area, the mesopore volume, the micropore volume, and an average fine pore diameter of the active material in the present invention are values, each of which is determined by the following methods. Measurement of an isothermal line of adsorption and desorption of the material is carried out by drying a sample under vacuum at 200° C. overnight, and using nitrogen as an adsorbate. By using the absorption isotherm obtained here, the BET specific surface area is calculated by a BET multi-point method or a BET one-point method, the BJH method and the MP method, respectively.

The BJH method is a calculation method generally used for an analysis of the mesopore, and proposed by Barrett, Joyner, Halenda et al. (Non-patent Document 1).

The MP method means a method of determining micropore volume, micropore area and distribution of the micropore, by utilization of "a t-plot method" (Non-patent Document 2), and is contrived by R. S. Mikhail, Brunauer, and Bodor (Non-patent Document 3).

In addition, the average fine pore diameter indicates the one determined by dividing the total fine pore volume per weight of the sample, which is obtained by measuring each equilibrium adsorption amount of nitrogen gas under each relative pressure at liquid nitrogen temperature by the aforementioned BET specific surface area.

It should be noted here that other than a combination of the upper limit value of V1 and the lower limit value of V2, a combination of each upper limit and lower limit is arbitrary.

An explanation on the aforementioned (1) activated carbon 1 and the above (2) activated carbon 2 will respectively be given below.

(Activated Carbon 1)

Mesopore volume $V_1$ of activated carbon 1 is preferably larger than 0.3 cc/g from the view point of enhancing I/O characteristics, when the positive electrode material is incorporated into the storage element. On the other hand, it is preferably equal to or smaller than 0.8 cc/g from the view point of suppressing decrease in bulk density of the positive electrode. The aforementioned $V_1$ is more preferably equal to or larger than 0.35 cc/g and equal to or smaller than 0.7 cc/g, and further preferably equal to or larger than 0.4 cc/g and equal to or smaller than 0.6 cc/g.

Micropore volume $V_2$ of activated carbon 1 is preferably equal to or larger than 0.5 cc/g in order to enlarge a specific surface area of the activated carbon, and to increase a capacitance. On the other hand, it is preferably equal to or smaller than 1.0 cc/g from the view point of suppressing bulk density of the activated carbon, and increasing a density as the electrode and a capacitance per unit volume. The aforementioned $V_2$ is more preferably equal to or larger than 0.6 cc/g and equal to or smaller than 1.0 cc/g, and further preferably equal to or larger than 0.8 cc/g and equal to or smaller than 1.0 cc/g.

A ratio, ($V_1/V_2$) of mesopore volume $V_1$ with respect to the micropore volume $V_2$ is preferably in a range of $0.3\leq V_1/V_2\leq0.9$. Accordingly, it is preferably is equal to or larger than 0.3 from the view point of enlarging a ratio of the mesopore volume with respect to the micropore volume, whereby a decrease in output characteristics is suppressed, and a high capacitance is held. On the other hand, $V_1/V_2$ is preferably equal to or smaller than 0.9 from the view point of enlarging a ratio of the micropore volume with respect to the mesopore volume, from which a decrease in a capacitance is suppressed, and high output characteristics hold. The more preferable range of $V_1/V_2$ is $0.4\leq V_1/V_2\leq0.7$, and the further preferable range of $V_1/V_2$ is $0.55\leq V_1/V_2\leq0.7$.

An average fine pore diameter of activated carbon 1 is preferably equal to or larger than 17 Å, more preferably equal to or larger than 18 Å, and most preferably equal to or larger than 20 Å from the view point of maximizing an output of the resulting storage element. The average fine pore diameter of activated carbon 1 is also preferably equal to or smaller than 25 Å from the view point of maximizing a capacitance.

A specific BET surface area of activated carbon 1 is preferably equal to or larger than 1,500 m$^2$/g and equal to or smaller than 3,000 m$^2$/g, and more preferably equal to or larger than 1,500 m$^2$/g and equal to or smaller than 2,500 m$^2$/g. When the specific BET surface area is equal to or larger than 1,500 m$^2$/g, a superior energy density is easily obtained. On the other hand, when the specific BET surface area is equal to or smaller than 3,000 m$^2$/g, performance per electrode volume is high, since there is no need to accommodate a large amount of the binder to maintain strength of the electrode.

Activated carbon 1 having the aforementioned characteristics can be obtained using, for example, the raw materials and the treatment methods to be explained below.

In the present embodiment, a carbon source used as a raw material of activated carbon 1 is not particularly restricted. It includes, for example, a plant-based raw material such as wood, wood flour, a coconut shell, a byproduct in pulp production, bagasse, waste molasses, and etc.; a fossil-based raw material such as peat, lignite, brown coal, bituminous coal, anthracite, petroleum distilled residues, petroleum pitch, coke, coal tar, and etc.; various kinds of synthetic resins such as a phenol resin, a vinyl chloride resin, a vinyl acetate resin, a melamine resin, a urea resin, a resorcinol resin, celluloid, an epoxy resin, a polyurethane resin, a polyester resin, a polyamide resin, and etc.; a synthetic rubber such as polybutylene, polybutadiene, polychloroprene, and etc.; other synthetic woods, a synthetic pulp, etc., and carbides thereof. Among these raw materials, the plant-based material such as the coconut shell, wood powder, and carbides thereof are preferable from the viewpoint of mass productivity and cost, and the coconut shell carbide is particularly preferable.

As carbonization and activation systems for converting these materials to activated carbon 1, there can be adopted known methods, for example, a fixed bed system, a moving bed system, a fluid bed system, a slurry system, a rotary kiln system, and etc.

A carbonization method of these raw materials includes a calcination method at about 400 to 700° C. (preferably 450 to 600° C.) for about 30 minutes to 10 hours using an inert gas such as nitrogen, carbon dioxide, helium, xenon, neon, carbon monoxide, exhaust combustion gas, etc., or mixed gas containing theses inert gases as a main component.

As an activation method for the carbide obtained by the aforementioned carbonization method, a gas activation method for the calcination using an activation gas such as steam, carbon dioxide, oxygen, and etc. is preferably used. Among them, a method for using steam or carbon dioxide as the activation gas is preferable.

In this activation method, it is preferable to activate the aforementioned carbide by taking 3 to 12 hours (preferably 5 to 11 hours, and further preferably 6 to 10 hours) by increasing temperature up to from 800 to 1,000° C., while supplying the activation gas in a rate of 0.5 to 3.0 kg/h (preferably 0.7 to 2.0 kg/h).

Furthermore, the aforementioned carbide may be subjected to primary activation, in advance, before activation treatment of the carbide. In this primary activation, the gas activation method by calcination of the carbon materials at a temperature of below 900° C., usually using activation gas such as steam, carbon dioxide, oxygen, and etc. can be preferably adopted.

Activated carbon 1 which can be used in the present embodiment, and has the aforementioned characteristics can be produced by appropriate combination of a calcination temperature and calcination time in the aforementioned carbonization method as well as a supplying amount of activation gas, an increase rate of the temperature, and the maximum activation temperature in the aforementioned activation method.

An average particle diameter of activated carbon 1 is preferably 2 to 20 μm.

When the average particle diameter is equal to or larger than 2 μm, a capacitance per electrode volume tends to be increased, because the density of the active material layer is high. Here, a small average particle diameter may induce disadvantage of low durability, however, it hardly occurs when the average particle diameter is equal to or larger than 2 μm. On the other hand, when the average particle diameter is equal to or smaller than 20 μm, it increases the likelihood of high rate charging and discharging. The aforementioned average particle diameter is more preferably 2 to 15 μm, and further preferably 3 to 10 μm.

(Activated Carbon 2)

Mesopore volume $V_1$ of activated carbon 2 is preferably larger than 0.8 cc/g from the view point of enhancing output characteristics, when the positive electrode material is incorporated in the storage element, and on the other hand, it is preferably equal to or smaller than 2.5 cc/g from the view point of suppressing a decrease in a capacitance of the storage element. The aforementioned $V_1$ is more preferably equal to or larger than 1.00 cc/g and equal to or smaller than 2.0 cc/g, and further preferably equal to or larger than 1.2 cc/g and equal to or smaller than 1.8 cc/g.

On the other hand, micropore volume $V_2$ of activated carbon 2 is preferably equal to or larger than 0.8 cc/g to enlarge a specific surface area of the activated carbon, and to increase a capacitance, while being preferably equal to or smaller than 3.0 cc/g from the view point of increasing a density of an electrode of the activated carbon as well as a capacitance per unit volume. The aforementioned $V_2$ is more preferably equal to or larger than 1.0 cc/g and equal to or smaller than 2.5 cc/g, and further preferably equal to or larger than 1.5 cc/g and equal to or smaller than 2.5 cc/g.

Activated carbon 2 having the aforementioned mesopore volume and micropore volume is the one having the higher BET specific surface area than that of an activated carbon which has been used for a conventional electric double layer capacitor or a lithium ion capacitor. As a specific value of the BET specific surface area of activated carbon 2 is preferably equal to or larger than 3,000 m²/g and equal to or smaller than 4,000 m²/g. It is more preferably equal to or larger than 3,200 m²/g and equal to or smaller than 3,800 m²/g. When the BET specific surface area is equal to or larger than 3,000 m²/g, a superior energy density is easily obtained, on the other hand, when the BET specific surface area is equal to or smaller than 4,000 m²/g, performance per electrode volume is enhanced, since it is not necessary to accommodate a large amount of the binder to maintain electrode strength.

Activated carbon 2 having aforementioned characteristics can be obtained by using, for example, the raw materials and the treatment methods described below.

A carbonaceous material used as a raw material of activated carbon 2 is not particularly restricted as long as it is a carbon source usually used as the raw material of the activated carbon, and includes, for example, the plant-based raw material such as wood, wood flour, a coconut shell, and etc.; a fossil-based raw material such as petroleum pitch, coke, and etc.; various kinds of synthetic resins such as a phenol resin, a furan resin, a vinyl chloride resin, a vinyl acetate resin, a melamine resin, a urea resin, a resorcinol resin, and etc. Among these raw materials, the phenol resin and the furan resin are suitable for preparing the activated carbon having a large specific surface area, and are particularly preferable.

As a carbonization method of these materials or a heating method in the activation treatment of them, there can be included known methods, for example, a fixed bed method, a moving bed method, a fluid bed method, a slurry method, a rotary kiln method, and etc. In a heated atmosphere, there can be used an inert gas such as nitrogen, carbon dioxide, helium, argon, etc., or mixed gas containing these gases as a main component. The raw materials are generally calcinized at a carbonization temperature from about 400 to 700° C. for about 0.5 to 10 hours.

An activation method of the carbide includes a gas activation method for calcination using activation gas such as steam, carbon dioxide, oxygen, and etc.; and an alkali metal activation method for carrying out heat treatment after mixing with an alkali metal compound; and the alkali metal activation method is preferable for preparing an activated carbon having a large specific surface area.

In this activation method, heat treatment is carried out under an inert gas atmosphere in a range of 600 to 900° C. for 0.5 to 5 hours after mixing the carbide and the alkali metal compound such as KOH, NaOH, and etc. so as to adjust a weight ratio of the carbide and the alkali metal compound to be equal to or larger than 1:1 (the amount of the alkali metal compound is the same or more than that of the carbide), and then the alkali metal compound is removed by washing with an acid and water, followed by drying it.

It is recommendable to mix the carbide with KOH in the activation in a slightly excess amount of the former in order to increase the micropore volume and not to increase the mesopore volume. It is recommendable to use KOH in a slightly excess amount in order to increase both of the micropore volume and the mesopore volume. It is preferable to carry out steam activation after alkali activation treatment mainly to increase the mesopore volume.

An average particle diameter of activated carbon 2 is preferably equal to or larger than 2 μm and equal to or smaller than 20 μm, and more preferably equal to or larger than 3 μm and equal to or smaller than 10 μm.

(Usage Aspect of Activated Carbon)

Activated carbons 1 and 2 may respectively consist of one kind of an activated carbon or a mixture of two or more kinds exhibiting the aforementioned each characteristics as the mixture.

As activated carbons 1 and 2, either one or a mixture of them may be selected for use.

The positive electrode active material may contain materials other than activated carbons 1 and 2 (for example, an activated carbon not having specific $V_1$ and/or $V_2$ or a material other than the activated carbons (for example, a composite oxide of lithium and transition metals, etc.)). In the embodiment of the present invention a content of activated carbon 1, a content of activated carbon 2, or a total content of activated carbons 1 and 2 is preferably more than 50% by weight with respect to a total weight of the positive electrode active material, more preferably more than 70% by weight, further preferably more than 90% by weight, and most preferably 100% by weight.

Here, in the first aspect of the present invention, it is preferable that $5 \leq A \leq 35$, when A (g/m$^2$) is a weight of the alkali metal compound in the positive electrode active material layer at one surface of the positive electrode precursor, $10 \leq B \leq 100$, and $0.20 \leq A/B \leq 1.00$, when B (g/m$^2$) is a weight of the positive electrode active material in the positive electrode active material layer. Here, a weight of the positive electrode active material contained in the positive electrode precursor means a weight of the material containing, other than the active material, arbitrary components such as the conductive fillers, the binder, the dispersion stabilizers, all of which will be described later, and etc.

When A is equal to or larger than 5, a capacitance of a nonaqueous hybrid capacitor increases, since a sufficient amount of the alkali metal ions is pre-doped to the negative electrode. When A is equal to or smaller than 35, decomposition of the alkali metal compound is promoted due to enhancement of electron conduction in the positive electrode precursor, therefore pre-doping proceeds efficiently. When B is equal to or larger than 10, an energy density can be increased. When B is equal to or smaller than 100, output characteristics are enhanced, because diffusion of ions in the positive electrode is accelerated. When A/B is equal to or larger than 0.20, a sufficient amount of the alkali metal ions is pre-doped to the negative electrode, thereby the capacitance of the nonaqueous hybrid capacitor is increased. When A/B is equal to or smaller than 1.00, voids generated by decomposition of the alkali metal compound in the positive electrode precursor after pre-doping become smaller, thereby the positive electrode is strengthened.

It should be noted here that any combination of the upper limit value of A, B or A/B and the lower limit value of A, B or A/B is arbitrary, including the case where all of A, B and A/B are the upper limit values or the lower limit values.

(Alkali Metal Compound)

The alkali metal compound in the present invention includes lithium carbonate, sodium carbonate, potassium carbonate, rubidium carbonate, cesium carbonate, lithium oxide as well as lithium hydroxide, and one or more kinds of the alkali metal carbonates is suitable for use, which is capable of pre-doping by releasing cations which are formed by decomposition of the compounds in the positive electrode precursor, followed by reduction in the negative electrode. Among them, lithium carbonate is suitable for use from the view of having a high capacitance per unit weight. The alkali metal compound contained in the positive electrode precursor may be one kind or two or more kinds of the alkali metal compounds. Furthermore, the positive electrode precursor of the present invention can contain at least one kind of the alkali metal compound, and may also contain one or more kinds of oxides such as $M_2O$, hydroxides such as MOH, halides such as MF or MCl, and carboxylate salts such as RCOOM (R is H, an alkyl group, and an aryl group), wherein M is one or more kinds selected from Li, Na, K, Rb, and Cs. It may also contain one or more kinds of alkaline earth metal carbonates selected from $BeCO_3$, $MgCO_3$, $CaCO_3$, $SrCO_3$, $BaCO_3$, alkaline earth metal oxides, alkaline earth metal hydroxides, alkaline earth metal halides, and alkaline earth metal carboxylates.

In the case of containing, other than the alkali metal compound, two or more kinds of the alkali metal compounds or the alkaline earth metal compound, it is preferable to prepare the positive electrode precursor so that a total amount of the alkali metal compound and the alkaline earth metal compound contained is equal to or more than 5 g/m$^2$ and equal to or less than 35 g/m$^2$ in the positive electrode active material layer at one surface of the positive electrode precursor.

In the first aspect of the present invention, the alkali metal compound is preferably contained in the positive electrode precursor in an amount of equal to or more than 10% by weight, because desirable charging and discharging cycle characteristics under a high load can be exhibited. Among the alkali metal compounds, lithium carbonate is particularly preferable.

In the second aspect of the present invention, it is preferable that $5 \leq X \leq 50$, where X (% by weight) is a weight ratio of the alkali metal compound in the positive electrode active material layer at one surface of the positive electrode precursor. X is more preferably $10 \leq X \leq 50$, and further preferably $20 \leq X \leq 40$. When X is equal to or larger than 5, a sufficient amount of the alkali metal ions can be pre-doped to the negative electrode, thereby a capacitance of the nonaqueous hybrid capacitor increases. When X is equal to or smaller than 50, electron conduction in the positive electrode precursor can be enhanced, therefore decomposition of the alkali metal compound proceeds efficiently.

When the positive electrode precursor contains the aforementioned two or more kinds of the alkali metal compounds or the alkaline earth metal compounds, other than the alkali metal compound, the positive electrode precursor is preferably prepared, in which a total amount of the alkali metal compound and the alkaline earth metal compound contained is equal to or larger than 5% by weight and equal to or smaller than 50% by weight in the positive electrode active material layer at one surface of the positive electrode precursor.

In the third aspect of the present invention, a content ratio of the alkali metal compound in the positive electrode active material layer should be determined within the aforementioned range by satisfying the specific values of the ratio of $A_1/B_1$ (to be described later), where $A_1$ is a weight of the alkali metal compound per unit area in the positive electrode precursor, $B_1$ (g/m$^2$) which is a weight of the positive electrode active material, and the ratio of $A_1/G_1$, where $G_1$ is a capacitance per unit area in the negative electrode.

—Charging and Discharging Cycle Characteristics Under High Load—

In charging and discharging the nonaqueous hybrid capacitor, alkali metal ions and anions in an electrolytic solution move accompanied by charging and discharging, and react with the active material. Activation energy of an insertion reaction of ions into the active material and that of a desorption reaction are different from each other. Accordingly, when charging or discharging loads are particularly large, the ions cannot follow the change of the charging or discharging, thereby some ions cannot move, and thus are accumulated in the active material. As a result, the concentration of electrolytes in a bulk electrolytic solution decreases, from which the resistance of the nonaqueous hybrid capacitor increases.

However, when the alkali metal compound is contained in the positive electrode precursor, by oxidative decomposition of the alkali metal compound, the alkali metal ions are released for pre-doping to the negative electrode, while voids capable of holding the electrolytic solution inside the positive electrode are formed. It is considered that the ions are supplied to the positive electrode at any time from the electrolyte held in such voids which are formed in the vicinity of the active material during charging and discharging, from which charging and discharging cycle characteristics under a high load are enhanced.

The alkali metal compound contained in the positive electrode precursor releases the alkali metal ions by oxidative decomposition under a high voltage which is applied, when the nonaqueous hybrid capacitor is formed, and the pre-doping proceeds by reduction of the ions at the negative electrode. Therefore, the pre-doping step can be shortened by accelerating the oxidation reaction. In order to promote the reduction reaction, it is important to ensure electron conduction by contacting the alkali metal compound (an insulating material) with the positive electrode active material, and to diffuse the cations released by the oxidation reaction into the electrolytic solution. Thus, it is of importance to cover in a moderate manner the surface of the positive electrode active material with the alkali metal compound.

In the second aspect of the present invention, oxidative decomposition of the alkali metal compound is accelerated when $5 \leq S_1 \leq 60$, and $0.50 \leq S_1/X \leq 2.00$ are satisfied, where $S_1\%$ is an area of oxygen whose luminance values are binarized based on the average luminance value in the oxygen mapping of the surface of the positive electrode precursor measured by a scanning electron microscope—an energy-dispersive X-ray spectroscopy (SEM-EDX). When $S_1$ is equal to or larger than 5%, pre-doping is accelerated, since electron conduction between the alkali metal compound and the positive electrode active material is ensured. When $S_1$ is equal to or less than 60%, pre-doping is accelerated, because diffusion of the alkali metal ions in the electrolytic solution is promoted. When $S_1/X$ is equal to or larger than 0.50, pre-doping is accelerated, because diffusion of the electrolytic solution in the positive electrode precursor is promoted. When $S_1/X$ is equal to or smaller than 2.00, pre-doping is accelerated, because electron conduction between the alkali metal compound and the positive electrode active material is ensured.

In the second aspect, it is also preferable that $5 \leq S_2 \leq 60$, and $0.50 \leq S_2/X \leq 2.00$, where $S_2(\%)$ denotes an area of oxygen whose luminance values are binarized based on the average value of luminance values of oxygen in the oxygen mapping by SEM-EDX of the cross section of the positive precursor which was processed by a broad ion beam (BIB). When $S_2$ is equal to or larger than 5%, electron conduction between the alkali metal compound and the positive electrode active material is secured, and pre-doping is accelerated. When 52 is equal to or smaller than 60%, diffusion of the alkali metal ions in the electrolytic solution is promoted, and therefore the pre-doping is accelerated. When $S_2/X$ is equal to or larger than 0.5, diffusion of the electrolytic solution in the positive electrode precursor is promoted, and then the pre-doping is accelerated. When $S_2/X$ is equal to or smaller than 2.00, electron conduction between the alkali metal compound and the positive electrode active material is secured, thereby the pre-doping is accelerated.

As a measurement method for $S_1$ and $S_2$, they are determined as an area of oxygen at the surface of the positive electrode precursor and the cross-section of the positive electrode precursor, where luminance values of oxygen are binarized based on the average value of luminance value in the element mapping measured by SEM-EDX. As a method for forming the cross-section of the positive electrode precursor, the BIB processing method can be applied in which argon beams are irradiated from the upper part of the positive electrode precursor, followed by preparation of a smooth cross-section along with an end part of a shielding plate installed right above the sample.

Measurement conditions of an element mapping of SEM-EDX are not particularly restricted, and pixel numbers are in a range of 128×128 pixels to 512×512 pixels, brightness and contrast are adjusted so that there are no pixels exhibiting the maximum brightness value in a mapping image, and an average value of brightness ones falls within a range of 40% to 60% of the maximum brightness value.

Various methods can be used for atomization of the alkali metal compound and the alkaline earth metal compound. A grinding machine, for example, a ball mill, a beads mill, a ring mill, a jet mill, a rod mill, etc. can be used.

Alkali metal elements and alkaline earth metal elements can be quantified by using ICP-AES, atomic absorption spectrometry, a fluorescent X-ray analysis method, a neutron radio activation analysis method, ICP-MS, and etc.

In the first and the second aspects of the present invention, an average particle diameter of the alkali metal compound is preferably equal to or larger than 0.1 µm and equal to or smaller than 10 µm. When it is equal to or larger than 0.1 µm, the positive electrode precursor becomes superior in dispersibility thereof. When it is equal to or smaller than 10 µm, a surface area of the alkali metal compound increases, and then decomposition reaction proceeds efficiently.

A measurement method of an average particle diameter of the alkali metal compound in the positive electrode precursor is not particularly restricted, and can be carried out by calculation from a SEM image and a SEM-EDX image of the cross-section of the positive electrode. As a method for forming a cross-section of the positive electrode, a BIB processing method can be applied in which argon beams are irradiated from an upper part of the positive electrode, followed by preparing a smooth cross-section along with an end part of the shielding plate installed right above the sample.

[Discrimination Method of Alkali Metal Compound and Positive Electrode Active Material]

The alkali metal compound and the positive electrode active material can be discriminated in oxygen mapping using a SEM-EDX image of the cross-section of the positive electrode observed at a magnification of 1000 times to 4000 times. As for the measurement method of the SEM-EDX image, it is preferable that brightness and contrast are adjusted so that there are no pixels exhibiting the maximum brightness value in a mapping image, and an average value of brightness values falls within a range of 40% to 60% of the maximum brightness value. Particles having a bright part obtained by binarization based on the average value of the luminance values in the oxygen mapping, and occupying the area of equal to or larger than 50% can be discriminated as the alkali metal compound.

[Calculation Method of Average Particle Diameter]

The average particle diameter of the alkali metal compound can be determined by analysis of an image of the cross-section of the positive electrode obtained by SEM-EDX measurement which was observed, and measured in the same view field as that of the aforementioned SEM cross-section of the positive electrode. A cross-sectional area T is determined on basis of the whole particles of the alkali metal compound which are discriminated from the aforementioned SEM image of the cross-section of the positive electrode, and a particle diameter d is calculated by the following equation (1) (circular constant is represented by $\pi$):

[Equation 1]

$$d = 2 \times (T/\pi)^{1/2} \qquad (1)$$

A volume average particle diameter $Z_0$ is determined by the following equation (2) using the resulting particle diameter d:

[Equation 2]

$$X_0 = \Sigma[\tfrac{4}{3}\pi \times (d/2)^3 \times d] / \Sigma[\tfrac{4}{3}\pi \times (d/2)^3] \qquad (2)$$

The average particle diameter of the alkali metal compound can be calculated by the average value of $Z_0$ values which are calculated by changing a view field of the cross-section of the positive electrode, and measuring these values at five fields and more.

(Other Components of Positive Electrode Active Material Layer)

The positive electrode active material layer of the positive electrode precursor in the present invention may contain arbitrary components as necessary such as the conductive fillers, the binder, the dispersion stabilizer, and etc., other than the positive electrode active material and the alkali metal compound.

As the aforementioned conductive filler, a conductive carbonaceous material having higher conductivity than that of the positive electrode active material can be included. For example, Ketjen black, acetylene black, a vapor-grown carbon fiber, graphite, a carbon nanotube, a mixture thereof, and etc. are preferable for such conductive fillers.

A Mixed amount of the conductive fillers in the positive electrode active material layer of the positive electrode precursor is preferably 0 to 20 parts by weight, and more preferably in a range of 1 to 15 parts by weight with respective to 100 parts by weight of the positive electrode active material. It is preferable to mix the conductive fillers from a high input point of view. However, it is not preferable to mix in an amount exceeding 20 parts by weight, because the content ratio of the positive electrode active material in the positive electrode active material layer decreases, and thus the energy density per volume of the positive electrode active material layer decreases.

The binder is not particularly restricted, and there can be used, for example, PVdF (polyvinylidene fluoride), PTFE (polytetrafluoroethylene), polyimide, a latex, a styrene-butadiene copolymer, a fluorocarbon rubber, an acrylic copolymer, and etc. An amount of the binder used is preferably equal to or more than 1 part by weight and equal to or less than 30 parts by weight, more preferably equal to or more than 3 parts by weight and equal to or less than 27 parts by weight, and further preferably equal to or more than 5 parts by weight and equal to or less than 25 parts by weight with respect to 100 parts by weight of the positive electrode active material. When the amount of the binder is equal to or more than 1% by weight, the material exhibits sufficient electrode strength. On the other hand, when the amount of the binder is equal to or less than 30 parts by weight, entry of ions into the positive electrode active material and exit of ions from the material as well as diffusion of the ions are not hindered, thereby high I/O characteristics are exhibited.

The dispersion stabilizer is not particularly restricted, and there can be used, for example, PVP (polyvinyl pyrrolidone), PVA (polyvinyl alcohol), a cellulose derivative, and etc. An amount of the binder used is preferably equal to or more than 0 part by weight and equal to or less than 10 parts by weight with respect to 100 parts by weight of the positive electrode active material. When the amount of the dispersion stabilizer is equal to or less than 10 parts by weight, no entry of ions into the positive electrode active material and no exit of ions from the material as well as no diffusion of the ions are hindered, thereby high I/O characteristics are exhibited.

[Positive Electrode Power Collector]

A material composing the positive electrode power collector in the present invention is not particularly restricted as long as it has high electron conductivity, and does not induce deterioration caused by elution to the electrolytic solution as well as reactions with the electrolytes or ions, etc., and thus a metal foil is preferable. As the positive electrode power collector in nonaqueous hybrid capacitor of the present embodiment, an aluminum foil is particularly preferable.

The metal foil may be a conventional metal foil without a surface with ruggedness or through holes, a metal foil having a surface with ruggedness, being subjected to emboss finish, chemical etching, an electro-deposition method, blast finish, and etc., or a metal foil having through holes such as an expand metal, a punching metal, an etching foil, and etc.

A thickness of the positive electrode power collector is not particularly restricted as long as the shape and strength of the positive electrode sufficiently hold, and it is preferable, for example, from 1 to 100 μm.

[Production of Positive Electrode Precursor]

In the present invention, the positive electrode precursor, which is converted to the positive electrode of the nonaqueous hybrid capacitor can be produced by production technologies for electrodes of known lithium ion batteries, electric double layer capacitors, and etc. For example, the positive electrode precursor can be prepared using a slurry-like coating solution by dispersing or dissolving the positive electrode active material and the alkali metal compound as well as other arbitrary components used as needed into water or an organic solvent, coating this coating solution onto one surface or both surfaces of the positive electrode power collector to form a coated film, and thus drying them. Furthermore, film thickness or the bulk density of the positive electrode active material layer may be adjusted by applying pressure to the resulting positive electrode precursor. Alternatively, the following method of mixing in a dried atmosphere the positive electrode active material and the alkali metal compound as well as other arbitrary components used as needed without a solvent, press-molding the resulting mixture, and then attaching it to the positive electrode power collector by using conductive adhesives, may also applied.

A coating solution of the aforementioned positive electrode precursor may be prepared by dry-blending a part of or all of various kinds powder materials containing the positive electrode active material, followed by addition of water or an organic solvent, and/or a liquid or slurry material, in which the binder or the dispersing agent is dissolved or dispersed. It may be prepared by addition of various kinds of the powder materials containing the positive electrode active material in the liquid or slurry material, in which the binder or the dispersion stabilizer is dissolved or dispersed. It may be prepared by addition of various kinds of powder materials containing the positive electrode active material into the liquid or slurry material, in which the binder or the dispersing agent is dissolved or dispersed in water or an organic solvent. As the dry-blending method, the conductive material may also be coated onto the alkali metal compound having low conductivity by pre-mixing the positive electrode active material and the alkali metal compound as well as the conductive fillers as needed using for example, a ball mill, etc. In this way, the alkali metal compound has a high likelihood of decomposition easily at the positive electrode precursor in the pre-doping step. When water is used as a solvent of the coating solution, the coating solution may exhibit alkaline by addition of the alkali metal compound, thereby a pH modifier may be added as needed to the coating solution.

Although preparation of the coating solution of the aforementioned positive electrode precursor is not particularly restricted, a dispersing machine such as a homo-disperser or a multi-axis dispersing machine, a planetary mixer, a thin film spin-type high speed mixer, and etc. are suitable for use. It is preferable to carry out dispersion under the condition of a peripheral speed of equal to or faster than 1 m/sec and equal to or slower than 50 m/sec to obtain a coating solution in a well dispersed state. When the peripheral speed is equal to or faster than 1 m/sec, it is preferable, various kinds of materials are preferably dissolved or dispersed in a well dispersed state. When the peripheral speed is equal to or slower than 50 m/sec, various kinds of materials are not fractured by heat or shear force due to dispersion, and no re-aggregation of the materials occurs.

Dispersity of the aforementioned coating solution is preferably equal to or larger than 0.1 µm and equal to or smaller than 100 µm which are measured by a particle gauge. The upper limit of the degree, the particle size is more preferably equal to or smaller than 80 µm, and further preferably equal to or smaller than 50 µm. When the particle size is equal to or smaller than 0.1 µm, that means the size is equal to or smaller than the size of various kinds of powder materials containing the positive electrode active material, therefore the materials is in a state of being unpreferably crushed when preparing the coating solution. When the particle size is equal to or smaller than 100 µm, stable coating can be conducted without clogging in supplying the coating solution or generation of stripes of the coated film, etc.

Viscosity ($\eta b$) of the coating solution of the aforementioned positive electrode precursor is preferably equal to or higher than 1,000 mPa·s and equal to or lower than 20,000 mPa·s. It is more preferably equal to or higher than 1,500 mPa·s and equal to or lower than 10,000 mPa·s, and further preferably equal to or higher than 1,700 mPa·s and equal to or lower than 5,000 mPa·s. When viscosity ($\eta b$) is equal to or higher than 1,000 mPa·s, dripping is suppressed in the case of forming a coated film, and thus width and thickness of the coated film can be controlled as desired. When viscosity is equal to or lower than 20,000 mPa·s, stable coating can be carried out because a pressure loss which occurs by using a coating machine is low at a flow passage of the coating solution, thereby the coated film thickness can be controlled to equal to or less than desired thickness.

The value, TI (thixotropy index value) of the coating solution is preferably equal to or higher than 1.1. It is more preferably equal to or higher than 1.2, and further preferably equal to or higher than 1.5. When TI is equal to or higher than 1.1, width and thickness of the coated film can be controlled as desired.

A method for forming a coating film of the positive electrode precursor is not particularly restricted, and a coating machine such as a die coater or a comma coater, a knife coater, a gravure coating machine, and etc. can preferably be used. The coating film may be formed by single-layer coating or by multi-layer coating. In the case of the multi-layer coating, the composition of the coating solution may be adjusted so that the content of the alkali metal compound in each of the coated film layer is different. A coating speed is preferably equal to or faster than 0.1 m/min and equal to or slower than 100 m/min. It is more preferably equal to or faster than 0.5 m/min and equal to or slower than 70 m/min, and further preferably equal to or faster than 1 m/min and equal to or slower than 50 m/min. When a coating speed is equal to or faster than 0.1 m/min, stable coating can be carried out. On the other hand, when the coating speed is equal to or slower than 100 m/min, coating accuracy is secured.

In the third aspect of the present invention, it is preferable that $A_1/B_1$ is equal to or larger than 0.20 and equal to or smaller than 1.00, where $A_1$ (g/m$^2$) is a weight of the alkali metal compound per unit area in the aforementioned positive electrode precursor formed, and $B_1$ (g/m$^2$) is weight per unit area of the positive electrode active material in the positive electrode precursor. Accordingly, when preparing the aforementioned slurry, the amount of the alkali metal compound to be mixed with the positive electrode materials (the positive electrode active material, the conductive fillers, and the binder, as needed) in preparing the slurry is preferably adjusted so that $A_{1a}/B_{1a}$ becomes equal to or larger than 0.20 and equal to or smaller than 1.00, where $A_{1a}$ (g) is a weight of the alkali metal compound, and $B_{1a}$ (g) is a weight of the positive electrode materials (a total weight of the positive electrode active material, the conductive fillers, and the binder).

When $A_1/B_1$ is equal to or larger than 0.20, a sufficient amount of the alkali metal ions can be pre-doped to the negative electrode. When $A_1/B_1$ is equal to or smaller than 1.00, a positive electrode density after a reaction of the alkali metal compound can be increased, and thus strength of the positive electrode holds.

A drying method of the coating film of the aforementioned positive electrode precursor is not particularly restricted, and a method such as hot air drying or infrared ray (IR) drying, and etc. is suitable for use. Drying of the coating film may be carried out at single temperature or by changing temperatures in multi-stages. It may be dried by a combination of several drying methods. A drying temperature is preferably equal to or higher than 25° C. and equal to or lower than 200° C. It is more preferably equal to or higher than 40° C. and equal to or lower than 180° C., and further preferably equal to or higher than 50° C. and equal to or lower than 160° C. When the drying temperature is equal to or higher than 25° C., a solvent in the coated film can be sufficiently volatilized. On the other hand, when the drying temperature is equal to or lower than 200° C., cracking of the coated film caused by abrupt volatilization of the solvent, localization of the binder caused by migration, and oxidation of the positive electrode power collector or the positive electrode active material layer can be suppressed.

A pressing method of the aforementioned positive electrode precursor is not particularly restricted, and a pressing machine such as a hydraulic machine, a vacuum press machine, and etc. is suitable for use. A film thickness, a bulk density of the positive electrode active material layer, and electrode strength can be adjusted by pressing pressure, a gap between press rolls, and a surface temperature of the pressing part described later. The pressing pressure is preferably equal to or higher than 0.5 kN/cm and equal to or lower than 20 kN/cm. It is more preferably equal to or higher than 1 kN/cm and equal to or lower than 10 kN/cm, and further preferably equal to or higher than 2 kN/cm and equal to or lower than 7 kN/cm. When the pressing pressure is equal to or higher than 0.5 kN/cm, the electrode strength can be increased sufficiently. On the other hand, when the pressing pressure is equal to or lower than 20 kN/cm, the film thickness or the bulk density of the positive electrode active material layer can be adjusted to a desired level, without generating warpage or wrinkle in the positive electrode precursor. A gap between the press rolls can be set to an arbitrary value in accordance to the film thickness of the positive electrode precursor after drying so as to obtain the desired film thickness or the bulk density of the positive electrode active material layer. Further, a pressing speed may be set to arbitrary level where no warpage or wrinkle in the positive electrode precursor is generated. A surface temperature of the pressing part may be room temperature, or it may be heated as needed. The lower limit of surface temperature of the press part when heated is preferably equal to or higher than melting point minus 60° C. of the binder to be used, more preferably equal to or higher than melting point minus 45° C. of the binder, and further preferably equal to or higher than melting point minus 30° C. of the binder. On the other hand, the upper limit of surface temperature of the pressing part when heated is preferably equal to or lower than melting point plus 50° C. of the binder to be used, more preferably equal to or lower than melting point plus 30° C. of the binder, and further preferably equal to or lower than melting point plus 20° C. of the binder. For example, when PVdF (polyvinylidene fluoride: melting point 150° C.) is used as the binder, it is preferably heated to equal to or higher than 90° C. and equal to or lower than 200° C. It is more preferably heated to equal to or higher than 105° C. and equal to or lower than 180° C., and further preferably equal to or higher than 120° C. and equal to or lower than 170° C. When a styrene-butadiene copolymer (melting point 100° C.) is used as the binder, it is preferably heated to equal to or higher than 40° C. and equal to or lower than 150° C. It is more preferably heated to equal to or higher than 55° C. and equal to or lower than 130° C., and further preferably equal to or higher than 70° C. and equal to or lower than 120° C.

A melting point of the binder can be determined by an endothermic peak position of DSC (Differential Scanning Calorimetry). For example, by using a Differential Scanning Calorimeter "DSC7", manufactured by Perkin Elmer Co., Ltd., the endothermic peak temperature in a temperature increasing process provides the melting point, when setting 100 g of a sample resin into a measurement cell, and increasing temperature from 30° C. to 250° C. at a temperature increasing rate of 10° C./min. under a nitrogen gas atmosphere.

The pressing may be carried out several times by changing conditions of the pressing pressure, the gap, the speed, and the surface temperature of the pressing part.

A thickness of the positive electrode active material layer is preferably equal to or more than 20 μm and equal to or less than 200 μm at one surface of the positive electrode power collector. The thickness of the positive electrode active material layer is more preferably equal to or more than 25 μm and equal to or less than 100 μm at one surface, and further preferably equal to or more than 30 μm and equal to or less than 80 μm at one surface. When this thickness is equal to or more than 20 μm, sufficient charging and discharging capacitances can be exhibited. On the other hand, when this thickness is equal to or less than 200 μm, ion diffusion resistance inside the electrode can be maintained low. Therefore, sufficient output characteristics can be ensured as well as cell volume can be reduced, leading to an increase in an energy density. The thickness of the positive electrode active material layer, in the case where the power collector has through halls or a surface with ruggedness, means the average value of thickness at one surface of a part of the layer not having the through halls or the surface with ruggedness of the power collector.

The pore volume, the micropore volume, and the average fine pore diameter in the positive electrode precursor of the present invention are determined by the following methods: Measurement of an isothermal of adsorption and desorption is carried out using nitrogen as an adsorbate by vacuum-drying the positive electrode precursor at 200° C. overnight. Then, by using the resulting desorption isotherm, a BET specific surface area is calculated by a BET multi-point method or a BET one-point method, a mesopore by the BJH method, and a micropore by the MP method, respectively. By dividing each of the resulting BET specific surface area, the mesopore volume, the mesopore volume with an area of the positive electrode precursor, the BET specific surface area per unit area C ($m^2/cm^2$), the mesopore volume per unit area D ($\mu L/cm^2$), and the mesopore volume per unit area E ($\mu L/cm^2$) can be calculated.

The BJH method is a calculation method generally used in analysis of the mesopore proposed by Barrett, Joyner, Halenda et al. (Non-patent Document 1).

The MP method means a method of determining micropore volume, a micropore area, and distribution of the micropore by utilization of "a t-plot method" (Non-patent Document 2), and is a method contrived by R. S. Mikhail, Brunauer, and Bodor (Non-patent Document 3).

The average fine pore diameter is the one determined by dividing total fine pore volume per weight of a sample which is obtained by measuring each equilibrium adsorption amount of nitrogen gas at liquid nitrogen temperature under the corresponding each relative pressure by the BET specific surface area.

In the first aspect of the present invention, it is preferable that a BET specific surface area at unit area, C is equal to or larger than 1 and equal to or smaller than 20, and a ratio of C/B is preferably equal to or larger than 0.05 and equal to or smaller than 0.5, where B ($g/m^2$) is a weight of the positive electrode active material in the positive electrode active material layer in the positive electrode precursor. When the ratio of C/B is equal to or larger than 0.05, a reaction of the alkali metal compound is accelerated, since the nonaqueous electrolytic solution can be impregnated sufficiently in the positive electrode precursor, thereby a pre-doping step can be completed in a short period. When the ratio of C/B is equal to or smaller than 0.5, reaction overvoltage of the alkali metal compound can be lowered, since a contact area between the positive electrode active material and the alkali metal compound increases.

In the second aspect of the present invention, it is preferable that mesopore volume per unit area, D is equal to or larger than 0.3 and equal to or smaller than 5.0. When the volume, D is equal to or larger than 0.3, superior output characteristics are obtained. When the volume, D is equal to or smaller than 5.0, a bulk density of the positive electrode precursor can be increased.

Further, in the second aspect, it is preferable that micropore volume per unit area, E is equal to or larger than 0.5 and equal to or smaller than 10. When the volume, E is equal to or larger than 0.5, an energy density can be increased. When the volume, E is equal to or smaller than 10, the bulk density of the positive electrode precursor can be increased.

Dispersity in the present invention is determined by a dispersity evaluation test using a particle gauge specified in JIS K5600. Here, in a particle gauge having a groove with desired depth which fits to a particle size, a sufficient amount of a sample is poured into the tip of a deeper side of the groove, and then is overflown a little from the groove. Next, a blade tip is placed so as to contact with the deeper tip of the groove of the particle gauge where a longer side of the scraper is placed in parallel to width direction of the gauge, and the scraper, being kept in a state it touches the surface of the gauge, is drawn toward the direction of the right angle to the longer side direction of the groove until it reaches to 0 depth of the groove at the uniform speed within 1 or 2 seconds. After completion of the drawing, by irradiating light to the observed area in an angle of equal to or larger than 20 degree and equal to or smaller than 30 degree within 3 seconds, the depth of the particles which appear at the groove of the particle gauge was measured.

Viscosity ($\eta b$) and the value of TI in the present invention are determined respectively by each of the following methods. Firstly, by using an E-type viscometer, stabilized viscosity ($\eta a$) is measured after it has been measured for equal to or longer than 2 minutes under the condition of a temperature of 25° C. and a shear rate of 2 s$^{-1}$, followed by determination of viscosity ($\eta b$) which is measured under the same conditions as before except for changing the shear rate to 20 s$^{-1}$. TI is calculated by the equation TI=$\eta a/\eta b$ using the viscosity values obtained above. In the case of increasing the shear rate from 2 s$^{-1}$ to 20 s$^{-1}$, it may be increased by one step or in multiple steps within the above range, where the viscosity with respect to the shear rate in each step is determined.

<Negative Electrode>

The negative electrode has a negative electrode power collector and a negative electrode active material layer present at one surface or both surfaces thereof.

[Negative Electrode Active Material Layer]

The negative electrode active material layer contains a negative electrode active material which is capable of intercalating and releasing the alkali metal ions. It may contain arbitrary components such as the conductive fillers, the binder, the dispersion stabilizer, and etc. as needed, other than the materials.

[Negative Electrode Active Material]

The aforementioned negative electrode active material, a material which is capable of intercalating/releasing the alkali metal ions. Specifically, a carbon material, titanium oxide, silicon, silicon oxide, a silicon alloy, a silicon compound, tin, a tin compound, and etc. are exemplified. The content ratio of the carbon material is preferably equal to or larger than 50% by weight, and more preferably equal to or larger than 70% by weight with respect to the total amount of the negative electrode active material. The content ratio of the carbon material may be 100% by weight, however, it is preferable to be equal to or smaller than 90% by weight from the view point of obtaining a desirable effect of combined use of other materials. It may also be equal to or less than 80% by weight. The upper limit and the lower limit of the content ratio of the carbon materials may be combined arbitrarily in these ranges.

As the aforementioned carbon material, there can be included, for example, a hard carbon material; a soft carbon material; carbon black; carbon nanoparticles; an activated carbon; artificial graphite; natural graphite; graphitized mesophase carbon microspheres; graphite whiskers; an amorphous carbonaceous material such as a polyacene-based material; a carbonaceous material obtained by heat treatment of a carbon precursor such as a petroleum-based pitch, a coal-based pitch, mesocarbon microbeads, coke, and synthetic resins (for example, a phenol resin, etc.); a thermal decomposition product of a furfuryl alcohol resin or a novolac resin; fullerene; a carbon nanohorn; and composite carbon materials thereof.

It is preferable that the BET specific surface area of the composite carbon material is equal to or larger than 100 m$^2$/g and equal to or smaller than 350 m$^2$/g. This BET specific surface area is preferably equal to or larger than 150 m$^2$/g and equal to or smaller than 300 m$^2$/g. When the BET specific surface area is equal to or larger than 100 m$^2$/g, the negative electrode active material layer can be made thinner, because a pre-doping amount of the alkali metal ions can be increased sufficiently. When the BET specific surface area is equal to or smaller than 350 m$^2$/g, the negative electrode active material layer exhibits superior coating property.

For the aforementioned composite carbon material, when carrying out charging at a measurement temperature of 25° C. using lithium metal as a counter electrode under the constant current of 0.5 mA/cm$^2$ up to the voltage value of 0.01 V, followed by charging under the constant voltage down to the current value of 0.01 mA/cm$^2$, the initial charging capacitance is preferably equal to or larger than 300 mAh/g and equal to or smaller than 1,600 mAh/g per unit weight of the composite carbon material. It is more preferably equal to or larger than 400 mAh/g and equal to or smaller than 1,500 mAh/g, and further preferably equal to or larger than 500 mAh/g and equal to or smaller than 1,450 mAh/g. When the initial charging capacitance is equal to or larger than 300 mAh/g, a pre-doping amount of the alkali metal ions can be sufficiently increased, thereby, even when the negative electrode active material layer is made thinner, high output characteristics can be obtained. When the initial charging capacitance is equal to or smaller than 1,600 mAh/g, swelling and shrinkage of the composite carbon material in doping and de-doping of the alkali metal ions to the composite carbon material can be decreased, thereby strength of the negative electrode holds.

It is particularly preferable that the negative electrode active material described above is a composite porous material satisfying the following conditions (1) and (2) from the view point of obtaining an excellent internal resistance value.

(1) The mesopore volume, Vm$_1$ (cc/g) (volume of fine pores having a diameter of equal to or larger than 2 nm and equal to or smaller than 50 nm) calculated by the BJH method satisfies the condition of 0.01≤Vm$_1$<0.10.

(2) The micropore volume, Vm$_2$ (cc/g)(volume of fine pores having a diameter of below 2 nm) calculated by the BJH method satisfies the condition of 0.01≤Vm$_2$<0.30.

It is preferable that the negative electrode active material is in a particulate fashion.

Particle diameters of the silicon and the silicon compound as well as tin and the tin compound are preferably equal to or larger than 0.1 μm and equal to or smaller than 30 μm. When the particle diameter is equal to or larger than 0.1 μm, resistance of the nonaqueous hybrid capacitor can be lowered, since a contact area with the electrolytic solution increases. When the particle diameter is equal to or smaller than 30 μm, swelling and shrinkage of the negative electrode are decreased, which is caused by doping and de-doping of the alkali metal ions to the negative electrode which are accompanied by charging and discharging, thereby strength of the negative electrode holds.

The silicon, the silicon compound, and the tin as well as the tin compound can be atomized by crushing using a built-in jet mill in a classifier, a stirring-type ball mill, and etc. The crushing machine is equipped with a centrifugal classifier, and is capable of capturing fine particles using a cyclone or a dust collector under inert atmosphere of an inert gas such as nitrogen, argon, and etc.

A content ratio of the negative electrode active material in the negative electrode active material layer of the negative electrode is preferably equal to or larger than 70% by weight, and more preferably equal to or larger than 80% by weight based on a total weight of the negative electrode active material layer.

(Other Components of Negative Electrode Active Material Layer)

The negative electrode active material layer in the present invention may contain arbitrary components such as conductive fillers, the binder, the dispersion stabilizer, and etc. as needed, other than the negative electrode active material.

As the binder, for example, polyvinylidene fluoride (PVdF), polytetrafluoroethylene (PTFE), fluorocarbon rubber, latex, an acryl polymer, and etc. can be used. An amount of the binder used in the negative electrode active material layer is preferably 3 to 25 parts by weight, and further preferably a range of 5 to 20 parts by weight with respect to 100 parts by weight of the negative electrode active material. When the amount of the binder is below 3 parts by weight, sufficient adhesion strength cannot be secured between the power collector and the negative electrode active material layer in the negative electrode (precursor), thereby interfacial resistance between the power collector and the active material layer increases. On the other hand, when the amount of the binder used is larger than 25 parts by weight, the binder excessively covers the surface of the active material of the negative electrode (precursor), and thereby diffusion resistance of ions inside the fine pores of the active material increases.

It is preferable that the conductive fillers are composed of a conductive carbonaceous material having higher conductivity than that of the negative electrode active material. As such conductive fillers, for example, ketjen black, acetylene black, a vapor-phase growth carbon fiber, graphite, a carbon nanotube, a mixture thereof, and etc. are preferable.

A mixing amount of the conductive fillers in the negative electrode active material layer is preferably equal to or less than 20 parts by weight, and further preferably in a range of 1 to 15 parts by weight with respect to 100 parts by weight of the negative electrode active material. The conductive fillers are preferably mixed from the view point of a high input, however, when the mixing amount of the fillers becomes more than 20 parts by weight, the content of the negative electrode active material in the negative electrode active material layer decreases, thereby the energy density per unit volume unfavorably decreases.

[Negative Electrode Power Collector]

A material for composing the negative electrode power collector in the present invention is preferably a metal foil having high electron conductivity and the one in which no elution to an electrolytic solution as well as no deterioration of the material due to the reaction with the electrolytes, ions, or etc. takes place. The aforementioned metal foil is not particularly restricted, and includes, for example, an aluminum foil, a copper foil, a nickel foil, a stainless steel foil, and etc. As the negative electrode power collector in the nonaqueous hybrid capacitor of the present embodiment, the copper foil is preferable.

The metal foil may be a usual metal foil not having a surface with ruggedness or through holes, or a metal foil having a surface with ruggedness which was formed by emboss finish, chemical etching, an electro-deposition method, blast finish, and etc. It may also be a metal foil having through holes such as an expand metal, a punching metal, an etching foil, and etc.

A thickness of the negative electrode power collector is not particularly restricted as long as shape and strength of the negative electrode hold. The preferable thickness, for example, is in a range of 1 to 100 μm.

[Production of Negative Electrode]

The negative electrode is composed of the negative electrode active material layer at one surface or both surfaces of the negative electrode power collector. In a typical aspect, the negative electrode active material layer is firmly adhered to the negative electrode power collector.

The negative electrode can be produced by utilizing the production technologies of the electrode for known lithium ion batteries, the electric double layer capacitor, and etc. For example, the negative electrode can be obtained by preparing a slurry coating solution in which various kinds of materials containing the negative electrode active material are dispersed or dissolved into water or an organic solvent, coating this coating solution onto one surface or both surfaces of the negative electrode power collector to form a coated film, and then drying this. Further, by applying pressure to the resulting negative electrode, film thickness or a bulk density of the negative electrode active material layer may be adjusted.

A thickness of the negative electrode active material layer is at one surface preferably equal to or more than 10 μm and equal to or less than 70 μm, and more preferably equal to or more than 20 μm and equal to or less than 60 μm. When the thickness is equal to or more than 10 μm, desirable charging and discharging capacitances can be performed. On the other hand, when the thickness is equal to or less than 70 μm, the cell volume can be decreased, thereby the energy density can be increased. In the case that pores exist in the power collector, the thickness of the negative electrode active material layer at one surface of the layer is regarded as an average thickness of a portion of the power collector not having the pores.

<Separator>

The positive electrode precursor and the negative electrode are laminated or rolled via the separator to form an electrode laminated body having the positive electrode precursor, the negative electrode and the separator.

As the separator, there can be used a microporous film made of polyethylene, or a microporous film made of polypropylene which is used in lithium ion secondary batteries, or nonwoven paper made of cellulose which is used in an electric double layer capacitor, or etc. A film composed of organic or inorganic fine particles may be laminated on one surface or both surfaces of these separators. Organic or inorganic fine particles may be contained inside the separator.

A thickness of the separator is preferably equal to or more than 5 μm and equal to or less than 35 μm. When the thickness is equal to or more than 5 μm, self-discharging by micro-short occurred inside tends to decrease. On the other hand, the thickness equal to or less than 35 μm is preferable, since output characteristics of the storage element tends to be enhanced.

It is preferable that the film composed of organic or inorganic fine particles is equal to or more than 1 μm and equal to or less than 10 μm. The thickness is preferably equal to or more than 1 μm, since self-discharging caused by micro-short occurred in an inside section tends to decrease. On the other hand, the thickness is preferably equal to or less than 10 μm, since output characteristics of the storage element tend to be enhanced.

<Casing>

As the casing, a metal can, a laminated film, and etc. can be used.

The metal can made of aluminum is preferable.

A film laminated with a metal foil and a resin film are preferable, and the one having a three-layer constitution composed of the outer layer resin film/the metal foil/the inner resin film is exemplified as an example. The outer layer resin film is the one for preventing the metal foil from receiving damage by contact, etc., and a resin such as nylon, polyester, or etc. is suitable for use. The metal foil is the one for preventing permeation of moisture and gas, and a copper foil, aluminum, stainless steel, and etc. are suitable for use. The inner resin film is the one for protecting the metal foil from an electrolytic solution which is accommodated inside as well as for melt-sealing the casing, and a polyolefin, an acid-modified polyolefin, and etc. are suitable for use.

[Electrolytic Solution]

The electrolytic solution in the present embodiment is a nonaqueous electrolytic solution. Namely, this electrolytic solution contains a nonaqueous solvent. The nonaqueous electrolytic solution contains equal to or more than 0.5 mol/L of an alkali metal salt, based on total amount of the nonaqueous electrolytic solution. Namely, the nonaqueous electrolytic solution contains as an electrolyte the alkali metal salt. The nonaqueous solvent contained in the nonaqueous electrolytic solution includes, for example, a cyclic carbonate represented by ethylene carbonate, propylene carbonate, and etc., and a linear carbonate represented by dimethyl carbonate, diethyl carbonate, ethyl methyl carbonate, and etc.

As the electrolyte salt containing the alkali metal ions which is soluble in the aforementioned nonaqueous solvent, for example, MFSI, $MBF_4$, $MPF_6$, and etc. can be used, where M is Li, Na, K, Rb, or Cs. The nonaqueous electrolytic solution in the present embodiment can contain at least one or more kinds of the alkali metal ions, and may also contain two or more kinds of the alkali metal salts or the alkali metal salts as well as an alkaline earth metal salt selected from a beryllium salt, a magnesium salt, a calcium salt, a strontium salt, and a barium salt. When two or more kinds of the alkali metal salts are contained in the nonaqueous electrolytic solution, viscosity increase under low temperatures can be suppressed due to the presence of cations having different Stokes radii in the nonaqueous electrolytic solution, thereby low temperature characteristics of the nonaqueous hybrid capacitor are enhanced. When the alkaline earth metal ions other than the alkali metal ions are contained in the nonaqueous electrolytic solution, a capacitance of the nonaqueous hybrid capacitor becomes larger, since beryllium ions, magnesium ions, calcium ions, strontium ions, and barium ions are divalent cations.

Although a method for containing the aforementioned two or more kinds of the alkali metal salts in the nonaqueous electrolytic solution or a method for containing the alkali metal salt and the alkaline earth metal salt in the nonaqueous electrolytic solution is not particularly restricted, the alkali metal salts composed of two or more kinds of the alkali metal ions may be dissolved, in advance in the nonaqueous electrolytic solution or the alkali metal salt and the alkaline earth metal salt may also be dissolved. In addition, the method in which the following compounds are decomposed in the pre-doping step (to be described later) is also included, i.e., a method for containing in the positive electrode precursor a carbonate salt such as $M_2CO_3$, an oxide such as $M_2O$, an hydroxide such as MOH, a halide such as MF or MCl, and a carboxylate salt such as RCOOM (wherein R is H, an alkyl group, or an aryl group), where M in the above formula is denoted by one or more kinds selected from Na, K, Rb, and Cs, and/or the alkaline earth metal carbonate salt selected from $BeCO_3$, $MgCO_3$, $CaCO_3$, $SrCO_3$, and $BaCO_3$, an alkaline earth metal oxide, an alkaline earth metal hydroxide, an alkaline earth metal halide, and an alkaline earth metal carboxylate salt.

A concentration of the electrolyte salt in the electrolytic solution is preferably in a range of 0.5 to 2.0 mol/L. When the concentration is equal to or higher than 0.5 mol/L, anions are present in a sufficient amount, and a capacitance of the nonaqueous hybrid capacitor holds. On the other hand, when the concentration is equal to or lower than 2.0 mol/L, the salt is sufficiently dissolved in the electrolytic solution, and desirable viscosity and conductivity of the electrolytic solution desirably are held.

In the case where two or more kinds of the alkali metal salts are contained or in the case where the alkali metal salt and the alkaline earth metal salt are contained in the nonaqueous electrolytic solution, the total concentration of these salts is preferably equal to or higher than 0.5 mol/L, and more preferably in a range of 0.5 to 2.0 mol/L.

Lewis acid, Lewis base, or etc. is preferably added to the nonaqueous electrolytic solution.

By adding Lewis acid, it becomes coordinated to an anion of the alkali metal compound, thus an oxidation reaction can be promoted, since HOMO (Highest Occupied Molecular Orbital) of the anion is decreased. Lewis acid is not particularly restricted, as long as it is capable of forming a complex with the anion of the alkali metal compound. There can be used, for example, a phosphine complex such as a monophosphine metal complex having triphenylphosphine, etc. as a ligand and a diphosphine metal complex having BINAP, etc. as the ligand; an amine complex such as an amine metal complex having trimethylamine, etc. as the ligand and a diamine metal complex having TMEDA (tetramethyl ethylenediamine), etc. as the ligand; an imine metal complex having pyridine or porphyrin as the ligand; a metallocene complex having cyclopentadienyl group as the ligand; an oxalato complex; a cyanato complex; a nitro complex; an acac (acetylacetone) complex; a carbonyl complex; an amino acid complex; an alkenyl complex; an alkynyl complex, etc. Complexes containing one, two or more kinds of these ligands may also be used, and in addition, these ligands may be modified by a functional group of a halogen atom such as fluorine and chlorine; an alkyl group such as methyl group; an aryl group such as phenyl group; an alkoxy group such as methoxy group; a sulfonyl group; amino group; a carboxyl group; a hydroxy group, etc.

As primary central metals of these Lewis acids, there can be used, for example, boron, aluminum, scandium, titanium, vanadium, chromium, manganese, iron, cobalt, nickel, copper, zinc, zirconium, molybdenum, ruthenium, rhodium, palladium, silver, iridium, platinum, gold, and etc.

As Lewis acid, a metal oxide such as aluminum oxide, manganese oxide, magnesium oxide, zinc oxide, boron oxide, and etc. can also be used.

On the other hand, by addition of Lewis base to the nonaqueous electrolytic solution, dissolution equilibrium of the alkali metal compound is shifted, and dissolution of the alkali metal compound into the electrolytic solution proceeds, therefore the oxidation reaction can be accelerated. Lewis base is not particularly restricted as long as it is capable of forming a complex with the alkali metal ions. For example, an ether-type compound such as a crown ether, furan, and etc. is suitable for use. Among them, the crown ether is preferable. In particular, when lithium carbonate is used as the alkali metal compound, 12-crown-4-ether is suitable for use, because it is capable of forming a stable complex with lithium ions.

An amount of Lewis acid used is preferably 0.5% by weight to 5% by weight, and more preferably 1% by weight to 4% by weight based on a total weight of the nonaqueous electrolytic solution. The acid is preferably used within this range because pre-doping of the alkali metal ions to the negative electrode can proceed under a milder condition without impairing superior self-discharging characteristics of the nonaqueous hybrid capacitor.

An amount of Lewis base used is preferably 1.0% by weight to 10.0% by weight, and more preferably 2% by weight to 8% by weight based on a total weight of the nonaqueous electrolytic solution. The base is preferably used in this range, which enables to receive advantage of promoting pre-doping of the alkali metal ions to the negative electrode or which proceeds under milder condition without impairing self-discharging characteristics of the nonaqueous hybrid capacitor.

<Production Method for Nonaqueous Hybrid Capacitor>

The nonaqueous hybrid capacitor in the third aspect of the present invention can be produced by the following steps using the positive electrode precursor and the negative electrode fabricated as above:

(1) a step of accommodating into the casing the laminated body composed of the positive electrode precursor comprising the positive electrode active material and the alkali metal compound, the negative electrode, and the separator (an assembling step), (2) a step of pouring the nonaqueous electrolytic solution inside the casing (liquid pouring, impregnation, and encapsulation steps), and (3) a step of decomposing the alkali metal compound by applying a voltage between the positive electrode precursor and the negative electrode in this order as described above (pre-doping step), wherein the ratio of the aforementioned $A_1$ (g/m$^2$) to the aforementioned $G_1$ (Ah/m$^2$), $A_1/G$, is equal to or larger than 1.0 (g/Ah) and equal to or smaller than 2.0 (g/Ah), and the voltage applied in the pre-doping step is equal to or higher than 4.2 V.

[Assembling Step]

An electrode laminated body obtained in the assembling step is a body which is fabricated by laminating via the separator, the positive electrode precursor and the negative electrode, both of which are cut in a sheet fashion, and is connected with a positive electrode terminal and a negative electrode terminal. An electrode roll is a roll which is fabricated by winding up the positive electrode precursor and the negative electrode via the separator, and is connected with the positive electrode terminal and the negative electrode terminal. The electrode roll may be fabricated in a cylinder or a flat fashion.

Although a connection method of the positive electrode terminal and the negative electrode terminal is not particularly restricted, and a method such as resistance welding or ultrasonic welding, and etc. can be adopted.

The electrode laminated body or the electrode roll which is connected with the terminals is preferably dried to remove a residual solvent. A drying method is not particularly restricted, and drying is carried out by vacuum drying, etc. The residual solvent is preferably equal to or less than 1.5% with respect to a weight of the positive electrode active material layer or the negative electrode active material layer. The residual solvent more than 1.5% is not preferable because the solvent remaining inside the body deteriorates self-discharging characteristics.

The dried electrode laminated body or the dried electrode roll which is accommodated in the casing such as a metal can or a laminated film under a dry environment having a dew point of −40° C. or lower is preferably encapsulated in a state of being open at one side of the body or roll. A temperature higher than a dew point of −40° C. is not preferable because moisture adheres to the electrode laminated body or the electrode roll, and water remaining inside the body deteriorates self-discharging characteristics. An encapsulation method of the casing is not particularly restricted, and a method such as heat-seal or impulse seal, and etc. can be adopted.

[Liquid Pouring, Impregnation, and Encapsulation Steps]

After the assembling step, the nonaqueous electrolytic solution is poured into the electrode laminated body accommodated in the casing. After the liquid pouring step, it is preferable to further impregnate the body, followed by immersing sufficiently the positive electrode, the negative electrode, and the separator with the nonaqueous electrolytic solution. In a state that portions of the positive electrode, the negative electrode, and the separator are not immersed with the nonaqueous electrolytic solution, doping proceeds irregularly in a lithium doping step (to be described later), thereby resistance of the resulting nonaqueous hybrid capacitor may increase or durability thereof may decrease. Although a method of the impregnation is not particularly restricted, for example, there can be used a method for installing the nonaqueous hybrid capacitor to a pressure reduction chamber after the liquid pouring in a state that the casing is opened, by setting the chamber to reduced atmosphere with a vacuum pump, and then returning again to atmospheric pressure, etc. After completion of the impregnation step, the nonaqueous hybrid capacitor, in a state that the casing is opened, is sealed by encapsulation under reduced pressure.

[Pre-Doping Step]

As a preferable step in the pre-doping, by decomposing the alkali metal compound in the positive electrode precursor after applying a voltage between the positive electrode precursor and the negative electrode, the alkali metal ions are released by the decomposition of the alkali metal compound in the positive electrode precursor, and the alkali metal ions are reduced at the negative electrode, thereby the alkali metal ions are pre-doped to the negative electrode active material layer.

In the production method of the nonaqueous hybrid capacitor of the present invention, the voltage applied between the positive electrode precursor and the negative electrode in the pre-doping step is preferably equal to or higher than 4.2 V. This voltage is preferably 4.2 to 5.0 V, and more preferably 4.3 to 4.9 V.

A voltage applying method is not particularly restricted, and there can be used a method of applying the constant voltage of equal to or higher than 4.2 V using a charging and discharging apparatus, a power source, etc.; a method for superimposing a pulse voltage in applying the constant voltage of equal to or higher than 4.2 V; a method for carrying out charging and discharging cycle in the voltage range including the voltage of equal to or higher than 4.2 V using a charging and discharging apparatus, etc.

In this pre-doping step, gas such as $CO_2$ is generated, which is accompanied by oxidative decomposition of the alkali metal compound in the positive electrode precursor. Thus, when applying a voltage, it is preferable to take means for releasing the generated gas outside the casing. There are included, for example, a method for applying a voltage in a state that a part of the casing is opened;

a method for applying a voltage in a state that a suitable gas releasing means such as a gas venting valve, a gas permeation film, etc. are installed in advance to a part of the casing.

(Relation Between $A_1$ and $G_1$)

$A_1$ or $G_1$ is preferably adjusted so that $A_1/G_1$ is equal to or larger than 1.0 (g/Ah) and equal to or smaller than 2.0 (g/Ah), where $A_1$ (g/m$^2$) is a weight of the alkali metal compound per unit area in the aforementioned positive electrode precursor, and $G_1$ (Ah/m$^2$) is a capacitance per unit area in the aforementioned negative electrode. When $A_1/G_1$ is equal to or larger than 1.0 (g/Ah), an energy density of the nonaqueous hybrid capacitor can be enhanced, because a sufficient amount of the alkali metal ions can be pre-doped to the negative electrode. When $A_1/G_1$ is equal to or smaller than 2.0 (g/Ah), pre-doping of an excessive amount of the alkali metal ions to the negative electrode can be suppressed, and precipitation of the alkali metal onto the electrode can also be suppressed.

The capacitance ($G_1$) per unit area in the negative electrode can be determined by the following method.

An electrochemical cell is prepared by cutting out the negative electrode prepared as above in a constant area (defining as P (cm$^2$)) as an operation electrode, using metal lithium as each of a counter electrode and a reference electrode, and also using a nonaqueous solvent containing a lithium salt as the electrolytic solution. By using a charging and discharging apparatus, after the constant current charging for the electrochemical cell is carried out up to the voltage of 0.01 V under the current of 0.5 mA/cm$^2$ at 25° C., the constant voltage charging is carried out down to the current value of 0.01 mA/cm$^2$. The sum of charging capacitances in these constant current charging and constant voltage charging is obtained, and evaluated as a capacitance, Q (Ah) of the negative electrode. The capacitance ($G_1$) obtained per unit area of the negative electrode can be calculated by Q/P using the resulting P and Q.

The amount ($A_1$) of the lithium compound per unit area in the positive electrode precursor can be adjusted in preparation of the aforementioned slurry for fabricating the positive electrode precursor by taking an amount of the lithium compound as well as an amount of the slurry which is coated onto the positive electrode power collector. The capacitance $G_1$ per unit area of the negative electrode can be adjusted by selecting a kind and an amount of the negative electrode active material which is used in preparation for the negative electrode as well as an amount of the slurry which is coated on to the negative electrode power collector.

[Aging Step]

Aging is preferably carried out for the nonaqueous hybrid capacitor after the pre-doping step. In the aging step, a solvent in the electrolytic solution is decomposed at the negative electrode, and a solid polymer coating film having permeability for alkali metal ions is formed at a surface of the negative electrode.

A method of the aforementioned aging is not particularly restricted, and for example, a method of reacting a solvent in the electrolytic solution under a high temperature environment, etc. can be used.

[Gas Venting Step]

It is preferable to completely remove remaining gas in the electrolytic solution, the positive electrode, and the negative electrode by further carrying out gas venting after completion of the aging step. In a state that the gas remains at least in a part of the electrolytic solution, the positive electrode, and the negative electrode, ion conductivity is prevented, thereby resistance of the resulting nonaqueous hybrid capacitor is increased.

A method of the gas venting is not particularly restricted, and there can be used, for example, a method of installing the nonaqueous hybrid capacitor in a pressure reduction chamber in a state that the casing is opened, and setting the chamber to a reduced pressure atmosphere by using a vacuum pump, etc.

[Nonaqueous Hybrid Capacitor]

From all those methods described above, the nonaqueous hybrid capacitor can be produced.

This storage element is provided with the positive electrode having the porous positive electrode active material layer with voids which were previously filled with the alkali metal compound in the positive electrode precursor, and as a consequence removed by decomposition of the compound, and also the negative electrode having the negative electrode active material layer doped with the alkali metal compound as a dopant source.

[Positive Electrode]

An average pore diameter of the voids in the positive electrode active material layer of the positive electrode is preferably 0.1 to 10 µm, and more preferably 0.3 to 5 µm. A void ratio of the positive electrode active material layer is preferably 10 to 60%, and more preferably 15 to 50%.

A bulk density of the positive electrode active material layer is preferably equal to or higher than 0.30 g/cm$^3$, and more preferably in a range of equal to or higher than 0.40 g/cm$^3$ to equal to or lower than 1.3 g/cm$^3$. When the bulk density of the positive electrode active material layer is equal to or higher than 0.30 g/cm$^3$, a high energy density can be obtained, and the storage element can be made small-sized. When this bulk density is equal to or lower than 1.3 g/cm$^3$, the electrolytic solution diffuses sufficiently inside the voids in the positive electrode active material layer, thereby high output characteristic is exhibited.

[Negative Electrode]

An amount of pre-doping of the alkali metal ions to the negative electrode active material in the negative electrode is preferably 50 to 100%, and more preferably 60 to 98% with respect to the capacitance, Q of the negative electrode.

A bulk density of the negative electrode active material layer is preferably equal to or higher than 0.50 g/cm$^3$ and equal to or lower than 1.8 g/cm$^3$, and further preferably equal to or higher than 0.60 g/cm$^3$ and equal to or lower than 1.5 g/cm$^3$. When the bulk density is equal to or higher than 0.50 g/cm$^3$, sufficient strength is held as well as sufficient conductivity between active materials can be exhibited. When it is equal to or lower than 1.8 g/cm$^3$, the sufficient volume of voids in which ions are capable of diffusing well inside the active material layer is ensured.

[Characteristics Evaluation of Storage Element]
(Static Capacitance)

In the present specification, a static capacitance, Fa (F) is a value obtained by the following method:

First, charging under a constant current is carried out in a thermostat chamber set at 25° C. for a cell corresponding to the nonaqueous hybrid capacitor up to 3.8 V under the current value of 2C, followed by charging under the constant voltage of 3.8 V for 30 minutes in total. After that, discharging down to 2.2 V under the constant current of 2C is carried out, and the capacitance obtained here is defined as Q(C). The static capacitance Fa is a value calculated by Fa=Q/$\Delta$Vx=Q/(3.8−2.2) using Q obtained here as well as the voltage change, $\Delta$Vx (V).

In the present specification, 1C is defined as the current value when discharging is completed within 1 hour in carrying out discharging under the constant current from the upper limit voltage of 3.8 V to the lower limit voltage of 2.2 V.

<Identification Method for Alkali Metal Compound in Electrode>

An identification method of the alkali metal compound contained in the positive electrode is not particularly restricted, and it can be identified, for example by the following method. The alkali metal compound is preferably identified by a combination of a plural of analysis means described below.

In the ion chromatography to be described later, anions can be identified by analysis of the water obtained after washing the positive electrode with distilled water.

When the alkali metal compound cannot be identified by the aforementioned analysis means, it can also be identified by using $^7$Li-solid state NMR, XRD (X-ray diffraction), TOF-SIMS (Time of Flight-Secondary Ion Mass Spectrometry), AES (Auger Electron Spectroscopy), TPD/MS (Thermally Programmed Desorption/Mass Spectrometry), DSC (Differential Scanning Calorimetry), and etc. as other analysis means.

[Scanning Electron Microscope-Energy-Dispersive X-Ray Spectroscopy (SEM-EDX)]

The alkali metal compound and the positive electrode active material can be discriminated in oxygen mapping using the SEM-EDX image of the surface of the positive electrode, measured by setting the observation magnification to 1000 times to 4000 times. As a measurement example of the SEM-EDX image, it can be measured under the conditions of an acceleration voltage of 10 kV, an emission current of 10 μA, a measurement pixel number of 256×256 pixels, and an integration number of 50 times. In order to prevent electrification of the sample it may be subjected to surface treatment by vacuum deposition or sputtering, etc. of gold, platinum, osmium, and etc. For a measurement method of the SEM-EDX image, brightness as well as contrast is preferably adjusted so that there are no pixels showing the maximum brightness value in the mapping image, and the average value of brightness values falls within a range of 40% to 60% for the maximum brightness value. Such a particle having an area of oxygen equal to or more than 50% of a bright part where the luminance values of oxygen are binarized based on the average luminance value of oxygen in the resulting oxygen mapping, can be discriminated as the alkali metal compound.

[Microscopic Raman Spectrometry]

The alkali metal compound and the positive electrode active material can be discriminated by Raman imaging of carbonate ions at the surface of the positive electrode, measured by setting the observation magnification to 1000 times to 4000 times. As examples of measurement conditions, they can be measured under the conditions as 532 nm excitation light, excitation light intensity of 1%, a long operation of an objective lens by 50 times, a diffraction lattice of 1800 gr/mm, a mapping system of point scanning (a slit with 65 mm, a binning with 5 pix), a 1 mm step, 3 second exposure time per one point, one time of an integration number, and a noise filter present. In the Raman spectrum measured by setting a straight base line in a range of 1071 to 1104 cm$^{-1}$, the area of carbonate ion peaks having positive values for the baseline is approximated to an integrated frequency distribution by assuming the peak shape of the area as a Gaussian type peak, and the frequencies attributable to the noises in the frequency distribution are subtracted from the distribution.

[X-Ray Photoelectron Spectroscopy (XPS)]

The bonding state of compounds contained in the positive electrode precursor can be discriminated by analysis of an electron state of the compounds in the positive electrode precursor using XPS. As an example of measurement conditions, it can be measured under the conditions of an X-ray source of monochromatic AlKα, an X-ray beam diameter of 100 μm φ (25 W, 15 kV), a path energy of narrow scan: 58.70 eV, the electrification neutralization presents, sweep number of narrow scan: 10 times (carbon, oxygen), 20 times (fluorine), 30 times (phosphorous), 40 times (alkali metal), 50 times (silicon), an energy step of narrow scan: 0.25 eV. The positive electrode surface is preferably cleaned by sputtering before XPS measurement. As an example, the positive electrode surface in a range of 2 mm×2 mm can be cleaned under the sputtering conditions of an acceleration voltage of 1.0 kV for 1 minute (1.25 nm/min as converted to that for SiO$_2$). In the resulting XPS spectrum, each peak is assigned as follows: a peak having the bonding energy of Li1s of 50 to 54 eV as LiO$_2$ or Li—C bonding, a peak of 55 to 60 eV as LiF, Li$_2$CO$_3$, and Li$_x$PO$_y$F$_z$ (x, y, z are integers from 1 to 6), a peak having the bonding energy of C1s of 285 eV as C—C bonding, a peak of 286 eV as C—O bonding, a peak of 288 eV as COO, a peak of 290 to 292 eV as CO$_3^{2-}$ and C—F bonding, a peak having the bonding energy of O1s of 527 to 530 eV as O$^{2-}$ (Li$_2$O), a peak of 531 to 532 eV as CO, CO$_3$, OH, PO$_x$ (x is an integer from 1 to 4), and SiO$_x$ (x is an integer from 1 to 4), a peak of 533 eV as C—O and SiO$_x$ (x is an integer from 1 to 4), a peak having the bonding energy of F1s of 685 eV as LiF, a peak of 687 eV as C—F boning, for the bonding energies of Li$_x$PO$_y$F$_z$ (x, y, z are integers from 1 to 6), PF$_6^-$, and P2p, a peak of 133 eV as PO$_x$ (x is an integer from 1 to 4), a peak of 134 to 136 eV as PF$_x$ (x is an integer from 1 to 6), a peak having the bonding energy Si2p of 99 eV as Si, silicide, a peak of 101 to 107 eV as Si$_x$O$_y$ (x, y are arbitrary integers). When the peaks overlap with each other in the spectrum, it is preferable to assign the spectrum by separating the peaks assuming a Gaussian function type peak or a Lorentz function type peak. The alkali metal compound present can be identified from the measurement result of the electron state obtained above and the ratio of the elements present.

[Ion Chromatography]

By analyzing ion-chromatographically the washing solution obtained by washing the positive electrode by distilled water, anion species eluted in the water can be identified. A column such as an ion exchange-type, an ion exclusion-type, or a reversed phase ion pair-type can be used. An electric conductivity detector, a UV/visible ray absorbance detector, an electrochemical detector, and etc. can be used as a detector, and a suppressor apparatus installed with a suppressor in front of the detector, or a non-suppressor apparatus in which a solution having low electric conductivity is used as eluent without the suppressor can be used. Measurement using the detector can also be carried out by combination of a mass spectrometer and a detector of charged particles.

Holding time of the sample is constant for each of the ion species, when conditions of the column, the eluent, and etc. are once fixed, and peak responses differ for each of the ion species, however are proportional to the concentration. Qualitative and quantitative analyses of components of the ion species are possible by measuring, in advance, a standard solution having a known concentration where traceability is ensured.

<Quantitative Method for Alkali Metal Compound: Calculation of A, B, $A_1$, $B_1$, and X>

Described below is a quantitative method of the alkali metal compound contained in the positive electrode precursor. The alkali metal compound can be quantitatively determined by washing the positive electrode precursor with distilled water, and measuring a weight change of the positive electrode before and after washed by the distilled water. Area Y ($cm^2$) of the positive electrode precursor to be measured is not particularly restricted, however, from the view point of reducing measurement variation, it is preferable to be equal to or larger than 5 $cm^2$ and equal to or smaller than 200 $cm^2$, and further preferable to be equal to or larger than 25 $cm^2$ and equal to or smaller than 150 $cm^2$. When the area is equal to or larger than 5 $cm^2$, the measurement values are reproducible. When the area is equal to or smaller than 200 $cm^2$, the sample is superior in handling for the measurement.

Described below is calculation methods for A ($g/m^2$), a weight of the alkali metal compound in the positive electrode active material layer at one surface of the positive electrode precursor, and B ($g/m^2$), a weight of the positive electrode active material in the positive electrode active material layer of the positive electrode precursor.

In the case of the positive electrode precursor with the electrode in which the positive electrode active material layer is coated on both surfaces of the positive electrode power collector, the weight of the material layer which is removed from on either one of the surfaces of the precursor by using a spatula, a brush, and etc., is identified as the weight ($M_0$ (g)) of the positive electrode precursor which was cut in a size of an area Y. In the case of the electrode in which the positive electrode active material layer is coated only on one surface of the positive electrode power collector is defined as $M_0$ (g) of the weight of the sample cut in the size of area Y. Subsequently, the positive electrode precursor is fully immersed in distilled water whose amount is 100 times of that of the positive electrode precursor (100 $M_0$ (g)) for equal to or longer than 3 days under an environment of 25° C., and then the alkali metal compound is eluted into the water. It is preferable in this case to take measures for putting a lid on the container so that the distilled water does not volatilize. After immersing it for equal to or longer than 3 days, the positive electrode precursor is taken out from the distilled water (when the aforementioned ion chromatography measurement is carried out, the solution amount is adjusted so that the amount of distilled water is 100 $M_0$ (g)), followed by vacuum drying. The conditions of the vacuum drying are preferable as follows: temperature range from 100 to 200° C., a pressure from 0 to 10 kPa, drying time from 5 to 20 hours when the amount of residual moisture in the positive electrode precursor becomes equal to or lower than 1% by weight. A residual amount of moisture can be quantitatively determined by the KARL FISCHER method. A weight of the positive electrode precursor after the vacuum drying is defined as $M_1$ (g), and subsequently, for the purpose of measuring the weight of the positive electrode power collector in the precursor, the remaining positive electrode active material layer on the positive electrode power collector is removed using a spatula, a brush, and etc. When the weight of the resulting positive electrode power collector is defined as $M_2$ (g), A ($g/m^2$), i.e., the weight of the alkali metal compound in the active material layer at one surface of the positive electrode precursor, B ($g/m^2$), the weight of the active material contained in the active material layer at one surface of the positive electrode, and the weight ratio X (% by weight) of the alkali metal compound contained in the active material layer of the positive electrode precursor can be calculated by the equations (3), (4), and (5), respectively.

[Equation 3]

$$A=10000\times(M_0-M_1)/Y \quad (3)$$

[Equation 4]

$$B=10000\times(M_1-M_2)/Y \quad (4)$$

[Equation 5]

$$X=100\times(M_0-M_1)/(M_0-MD) \quad (5)$$

It should be noted that $A_1$ which is a weight of the alkali metal compound per unit area of the positive electrode precursor corresponds to the aforementioned A, and $B_1$ which is a weight of the positive electrode active material per unit area corresponds to the aforementioned B.

<Quantitative Method of Alkali Metal Element: ICP-MS>

The positive electrode precursor is oxidatively decomposed using a strong acid such as concentrated nitric acid, concentrated hydrochloric acid, nitrohydrochloric acid, and etc., and the resulting solution is diluted with pure water so as to obtain an acid concentration of 2% to 3%. In the oxidative decomposition, heat and pressure can also be applied as appropriate. The resulting diluted solution is analyzed using ICP-MS, in which a known amount of an element is preferably added as an internal standard. When the alkali metal elements as measurement objects are present in concentration of equal to or higher than the measurement upper limit, it is preferable to further dilute the solution, while keeping the acid concentration. Each element can be quantitatively determined based on a calibration curve which is prepared in advance by using a standard solution for chemical analysis.

EXAMPLES

Features of the present invention will be clarified further below with reference to Examples and Comparative Examples. The present invention, however, should not be limited to the following Examples.

The following provides a detailed explanation of the embodiment in the first aspect of the present invention.

Example 1

Preparation of Positive Electrode Active Material

Preparation Example 1a

A carbide was obtained by carbonization treatment of a crushed coconut shell carbide in a compact-type carbonization furnace at 500° C. for 3 hours under a nitrogen atmosphere. The resulting carbide was put inside an activation furnace where steam which was heated in a preheating furnace was introduced to the activation furnace in a warm state at a rate of 1 kg/h, and activated by increasing a temperature up to 900° C. over a period of 8 hours. The carbide after activation was taken out, and cooled it down under a nitrogen atmosphere, from which an activated carbon was obtained. The resulting activated carbon was washed in a passing water bath for 10 hours. After the activated carbon was dried for 10 hours in an electric drying machine at 115° C., it was crushed for 1 hour using a ball mill, and then activated carbon 1 was obtained.

The average particle diameter of this activated carbon 1 was 4.2 µm measured by using a laser diffraction-type particle size distribution measurement apparatus (SALD-2000), manufactured by Shimadzu Corp. The fine pore distribution thereof was measured using a fine pore distribution measurement apparatus (AUTOSORB-1, AS-1-MP, manufactured by Yuasa Ionics Co., Ltd.), and the BET specific area was found to be 2360 m$^2$/g, the mesopore volume ($V_1$) 0.52 cc/g, the micropore volume ($V_2$) 0.88 cc/g, and $V_1/V_2$=0.59.

Preparation Example 2a

A carbide having an average particle diameter of 7 µm was obtained by carrying out carbonization of a phenol resin in a furnace at 600° C. for 2 hours under a nitrogen atmosphere, crushing it using a ball mill, followed by classification of the carbide. Activation was carried out by mixing the carbide and KOH in the weight ratio of 1:5, and heating the mixture at 800° C. for 1 hour in the furnace under a nitrogen atmosphere. Then, activated carbon 2 was obtained by washing it under stirring for 1 hour in diluted hydrochloric acid whose concentration was adjusted to that of 2 mol/L, washing with distilled water under boiling in which pH is held in a range of pH 5 to 6, and then carrying out drying.

The average particle diameter of activated carbon 2 was 7.0 µm measured by using a laser diffraction-type particle size distribution measurement apparatus (SALD-2000), manufactured by Shimadzu Corp. The fine pore distribution thereof was measured using a fine pore distribution measurement apparatus (AUTOSORB-1, AS-1-MP, manufactured by Yuasa Ionics Co., Ltd). The BET specific area was 3627 m$^2$/g, the mesopore volume ($V_1$) 1.50 cc/g, the micropore volume ($V_2$) 2.28 cc/g, and $V_1/V_2$=0.66.

[Crushing of Lithium Carbonate]

After cooling 20 g of lithium carbonate having an average particle diameter of 53 µm from 25° C. down to −196° C. by liquid nitrogen in a crushing machine, manufactured by IMEX Co., Ltd., lithium carbonate 1 having an average particle diameter of 2.5 µm was obtained by crushing it with zirconia beads having a diameter of 1.0 mm at a peripheral speed of 10.0 m/s for 30 minutes.

[Production of Positive Electrode Precursor]

A positive electrode precursor was produced using activated carbon 1 as the positive electrode active material and the lithium carbonate 1 as the alkali metal compound.

A coating solution was obtained by mixing 55.5 parts by weight of activated carbon 1, 32.0 parts by weight of lithium carbonate 1, 3.0 parts by weight of Ketjen black, 1.5 parts by weight of PVP (polyvinyl pyrrolidone), and 8.0 parts by weight of PVDF (polyvinylidene fluoride) as well as a mixed solvent of NMP (N-methylpyrrolidone) and pure water in a weight ratio of 99:1, and dispersing them using a thin-film spin-type high speed mixer, Filmix, manufactured by PRIMIX Co., Ltd. under the condition of a peripheral speed of 17 m/s. The viscosity (ηb) and the value (TI) of the resulting coating solution were measured using an E-type viscometer, TVE-35H, manufactured by Touki Sangyo Co., Ltd. The viscosity (ηb) was 2,850 mPa·s, and the value (TI) 4.4. Dispersity of the resulting coating solution was measured using a particle gauge, manufactured by YOSHIMITSU SEIKI Co., Ltd. The particle size was 31 µm. Positive electrode precursor 1 was obtained by setting a clearance of an applicator in the following coating apparatus to 150 µm, coating the coating solution on one surface of an aluminum foil having a thickness of 15 µm under the condition of a coating speed of 1 m/min. by using an automatic coating apparatus (PI-1210), manufactured by TESTER SANGYO Co., Ltd., and dying it at a drying temperature of 120° C. Positive electrode precursor 1 was subjected to roll-pressing under the condition of a pressure of 6 kN/cm and a surface temperature of the pressing part as 25° C. A film thickness of the positive electrode active material layer in positive electrode precursor 1 was determined by subtracting the thickness of the aluminum foil from the average value of thicknesses of positive electrode precursor 1 measured at arbitrary 10 points of the precursor by using a film thickness meter, Linear Gauge Sensor, GS-551, manufactured by ONO SOKKI Co., Ltd. Then the film thickness of the positive electrode active material layer was found to be 52 µm.

<Calculation of A, B>

Sample 1 was prepared by cutting positive electrode precursor 1 in a size of 10 cm×5 cm, and the weight $M_0$ thereof was measured to be 0.3104 g. By immersing sample 1 in 31.0 g of distilled water under an environment of 25° C. for 3 days, lithium carbonate in sample 1 was eluted in the distilled water. Then sample 1 was taken out, and vacuum dried for 12 hours under conditions of 150° C. and 3 kPa. The weight, $M_1$ at this time was 0.2424 g. After this, the active material layer on a positive electrode power collector was removed using a spatula or a brush, and the weight, $M_2$ of the positive electrode power collector in this time measured was found to be 0.099 g. According to equations (3) and (4), the following calculation results were obtained: A=13.60 g/m$^2$, B=28.68 g/m$^2$, and A/B=0.474.

<Calculation of C, D, and E>

Sample 2 was prepared by cutting positive electrode precursor 1 in a size of 4.0 cm×1.0 cm, and vacuum drying for 12 hours under conditions of 150° C. and 3 kPa. The fine pore distribution was measured by a fine pore distribution measurement apparatus (AUTOSORB-1, AS-1-MP, manufactured by Yuasa Ionics Co., Ltd.) by using sample 2 after the vacuum drying which was cut into eight equivalent parts with a size of 0.5 cm×0.5 cm. The following calculation values were obtained: the BET specific area was 13.84 m$^2$/g, the mesopore volume 3.28 µL, the micropore volume 5.60 µL, C=3.46 m$^2$/cm$^2$, D=0.82 µL/cm$^2$, and E=1.40 µL/cm$^2$.

<Calculation of Average Particle Diameter of Alkali Metal Compound>

A cross section perpendicular to the surface direction of the positive electrode, sample 1 was prepared by cutting the positive electrode precursor in a size of 0.5 cm×0.5 cm, and using SM-09020CP, manufactured by JEOL under conditions of an acceleration voltage of 4 kV, a beam diameter of 500 µm, and argon gas atmosphere. After this, SEM and EDX of the cross section of the positive electrode were measured by a method shown below.

(SEM-EDX Measurement Condition)

Measurement apparatus: Field emission-type SEM, FE-SEM, S-4700, manufactured by Hitachi High-Technologies Corp. and energy dispersion-type X-ray analysis apparatus, EMAX, manufactured by Horiba, Co., Ltd.

Acceleration voltage: 10 kV
Emission current: 10 μA
Measurement magnification: 2000 times
Electron beam incident angle: 90°
X-ray take out angle: 30°
Dead time: 15%
Mapping elements: C, O, F
Measurement pixel number: 256×256 pixels
Measurement time: 60 sec.
Integration number: 50 times In the mapping image, brightness and contrast obtained were adjusted so that there observed no pixels in the image showing the maximum brightness value, and the average value of brightness values fell within a range of 40% to 60% of the maximum brightness value.

Image analysis for the resulting image of the cross section of the positive electrode so measured by SEM and EDX was carried out using image analysis software (ImageJ). In the resulting oxygen mapping, the particle containing an area of oxygen equal to or more than 50% of the bright part where luminance values of oxygen are binarized based on the average luminance value of oxygen, was defined as particle Z of lithium carbonate, the cross-sectional area T was determined for all of the Z particles observed in the cross-sectional SEM image, and then the average particle diameter by equations (1) and (2) was found to be 2.3 μm.

[Production of Negative Electrode]

A coating solution was obtained by mixing 84 parts by weight of commercial hard carbon (Carbotron, produced by Kureha Corp.), 10 parts by weight of acetylene black, 6 parts by weight of PVdF (polyvinylidene fluoride) as well as NMP (N-methylpyrrolidone), and dispersing them using a thin film spin-type high speed mixer, Filmix, manufactured by PRIMIX Co., Ltd. under the condition of a peripheral speed of 17 m/s. Negative electrode 1 was obtained by setting a clearance of the applicator in the following apparatus to 300 μm, coating the coating solution on one surface of an electrolytic copper foil having a thickness of 10 μm under the condition of a coating speed of 1 m/min. using an automatic coating apparatus (PI-1210), manufactured by TESTER SANGYO Co., Ltd., and drying it at a drying temperature of 120° C. Resulting negative electrode 1 was subjected to roll-pressing under the conditions of a pressure of 5 kN/cm and a surface temperature of the pressing part as 25° C. The film thickness of the positive electrode active material layer in resulting negative electrode 1 was 30 μm.

[Preparation of Nonaqueous Hybrid Capacitor]

One sheet of positive electrode precursor 1 in which the positive electrode active material layer has a size of 10.0 cm×5.0 cm, one sheet of negative electrode 1 in which the negative electrode active material layer has a size of 10.1 cm×5.1 cm, and one sheet of the separator made of polyethylene and having a size of 10.3 cm×5.3 cm (manufactured by Asahi Kasei, Corp., thickness 15 μm) were respectively prepared. An electrode laminated body was obtained by laminating them in the order of positive electrode precursor 1, the separator, and negative electrode 1. After the resulting electrode laminated body was connected with a positive electrode terminal and a negative electrode terminal by ultrasonic welding, the body was put into a container made of an aluminum laminate packaging material, and was heat-sealed for the three sides including the side with terminals. The nonaqueous hybrid capacitor was prepared by pouring 3.5 g of a PC solution of $LiPF_6$ having an electrolyte concentration of 1.2 M as a nonaqueous electrolytic solution under an atmospheric pressure at 25° C. into the electrode laminated body accommodated in the aluminum laminate packaging material under a dry air environment having a dew point of −40° C. or lower. Subsequently, the nonaqueous hybrid capacitor was introduced to a pressure reduction chamber, and a pressure was reduced from an atmospheric pressure to −87 kPa, and returned to an atmospheric pressure. After this, the capacitor was allowed to stand for 5 minutes. Then, a step of returning to an atmospheric pressure after reducing the pressure from an atmospheric pressure to −87 kPa was repeated four times, followed by allowing the capacitor to stand for 15 minutes. Furthermore, after the pressure was reduced from an atmospheric pressure to −91 kPa, it was returned to an atmospheric pressure. Similarly, the step of reducing the pressure and returning to an atmospheric pressure was repeated seven times in total (each pressure was reduced to −95, −96, −97, −81, −97, −97, and −97 kPa, respectively). The nonaqueous electrolytic solution was impregnated to the electrode laminated body by the above steps.

After this, the nonaqueous hybrid capacitor was put in a reduced-pressure sealing machine in which the pressure is in a state of −95 kPa, the aluminum laminate packaging material was encapsulated by applying pressure of 0.1 MPa at 180° C. for 10 seconds.

[Pre-Doping Step]

The resulting nonaqueous hybrid capacitor was put into an argon box having a temperature of 25° C., dew point −60° C., and an oxygen concentration of 1 ppm. Doping of lithium to the negative electrode was carried out by unsealing the aluminum laminate packaging material accommodating the nonaqueous hybrid capacitor, followed by cutting a surplus portion of the packaging material, carrying out initial charging by a method of charging under the constant current of 50 mA up to 4.5 V, and subsequently charging under the constant voltage at 4.5 V for 2 hours using a power source (P4LT18-0.2), manufactured by Matsusada Precision Inc. After completion of the lithium doping, the aluminum laminate was encapsulated using a heat seal machine (FA-300), manufactured by FUJIIMPULSE Co., Ltd.

[Aging Step]

The nonaqueous hybrid capacitor after the lithium doping was taken out from the argon box, and then, by carrying out discharging under the constant current of 50 mA down to 3.8 V under an environment of 25° C., followed by carrying out discharging under the constant current down to 3.8 V for 1 hour, the voltage was adjusted to 3.8 V. Subsequently, the nonaqueous hybrid capacitor was stored in a thermostat chamber set at 60° C. for 8 hours.

[Gas Venting Step]

After the aging, a part of the aluminum laminate packaging material accommodating the nonaqueous hybrid capacitor was unsealed at a temperature of 25° C. under a dry air environment having a dew point of −40° C. or lower. Subsequently, the nonaqueous hybrid capacitor was put in a pressure reduction chamber, and the step was repeated in total three times, in which the pressure was reduced from an atmospheric pressure to −80 kPa for 3 minutes, and returned to an atmospheric pressure over a period of 3 minutes by using a diaphragm pump (manufactured by KNF Co., Ltd., N816. 3KT. 45. 18). Then, after putting the nonaqueous hybrid capacitor in a reduced-pressure sealing machine to reduce the pressure to −90 kPa, the aluminum laminate packaging material was encapsulated by sealing under a pressure of 0.1 MPa at 200° C. for 10 seconds.

[Evaluation of Nonaqueous Hybrid Capacitor]
[Measurement of Static Capacitance Fa]

The nonaqueous hybrid capacitor obtained in the previous step was subjected to charging under the constant current of 2C (10 mA) up to 3.8 V, and subsequently charging under the constant voltage by applying the constant voltage of 3.8 V for 30 minutes in total using a charging and discharging apparatus (ACD-01), manufactured by Aska Electronics Co., Ltd. in a thermostat chamber set at 25° C. After this, discharging under the constant current of 2C (10 mA) down to 2.2 V was carried out to obtain the capacitance, Q(C), and the static capacitance, Fa calculated by $F=Q/(3.8-2.2)$ was found to be 11.86 F.

Example 2

A nonaqueous hybrid capacitor was prepared in a similar manner as described in Example 1, except for preparing a positive electrode precursor by using with respect to the composition of a coating solution of a positive electrode, 63.4 parts by weight of activated carbon 1, 22.3 parts by weight of lithium carbonate 1, 3.4 parts by weight of Ketjen black, 1.7 parts by weight of PVP (polyvinyl pyrrolidone), and 9.1 parts by weight of PVDF (polyvinylidene fluoride).

Example 3

A nonaqueous hybrid capacitor was prepared in a similar manner as described in Example 1, except for preparing a positive electrode precursor by using with respect to the composition of a coating solution of a positive electrode, 67.3 parts by weight of activated carbon 1, 17.5 parts by weight of lithium carbonate 1, 3.6 parts by weight of Ketjen black, 1.8 parts by weight of PVP (polyvinyl pyrrolidone), and 9.7 parts by weight of PVDF (polyvinylidene fluoride).

Example 4

A nonaqueous hybrid capacitor was prepared in a similar manner as described in Example 1, except for preparing a positive electrode precursor by using with respect to the composition of a coating solution of a positive electrode, 48.0 parts by weight of activated carbon 1, 41.2 parts by weight of lithium carbonate 1, 2.6 parts by weight of Ketjen black, 1.3 parts by weight of PVP (polyvinyl pyrrolidone), and 6.9 parts by weight of PVDF (polyvinylidene fluoride).

Example 5

A nonaqueous hybrid capacitor was prepared in a similar manner as described in Example 1, except for preparing a positive electrode precursor by using with respect to the composition of a coating solution of a positive electrode, 41.3 parts by weight of activated carbon 1, 49.4 parts by weight of lithium carbonate 1, 2.2 parts by weight of Ketjen black, 1.1 parts by weight of PVP (polyvinyl pyrrolidone), and 6.0 parts by weight of PVDF (polyvinylidene fluoride).

Comparative Example 1

A nonaqueous hybrid capacitor was prepared in a similar manner as described in Example 1, except for preparing a positive electrode precursor by using with respect to the composition of a coating solution of a positive electrode, 68.7 parts by weight of activated carbon 1, 15.8 parts by weight of lithium carbonate 1, 3.7 parts by weight of Ketjen black, 1.9 parts by weight of PVP (polyvinyl pyrrolidone), and 9.9 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 2

A nonaqueous hybrid capacitor was prepared in a similar manner as described in Example 1, except for preparing a positive electrode precursor by using with respect to the composition of a coating solution of a positive electrode, 69.9 parts by weight of activated carbon 1, 14.3 parts by weight of lithium carbonate 1, 3.8 parts by weight of Ketjen black, 1.9 parts by weight of PVP (polyvinyl pyrrolidone), and 10.1 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 3

A nonaqueous hybrid capacitor was prepared in a similar manner as described in Example 1, except for preparing a positive electrode precursor by using with respect to the composition of a coating solution of a positive electrode, 72.7 parts by weight of activated carbon 1, 11.0 parts by weight of lithium carbonate 1, 3.9 parts by weight of Ketjen black, 2.0 parts by weight of PVP (polyvinyl pyrrolidone), and 10.5 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Example 6

A positive electrode precursor was prepared by using with respect to the composition of a coating solution of a positive electrode, 52.9 parts by weight of activated carbon 1, 35.2 parts by weight of lithium carbonate 1, 2.9 parts by weight of Ketjen black, 1.4 parts by weight of PVP (polyvinyl pyrrolidone), and 7.6 parts by weight of PVDF (polyvinylidene fluoride). At this time, the positive electrode precursor having a film thickness of the positive electrode active material layer of 101 μm was prepared by setting a clearance of the applicator to 300 μm. Thereafter, a nonaqueous hybrid capacitor was prepared in a similar manner as described in Example 1.

Example 7

A nonaqueous hybrid capacitor was prepared in a similar manner as described in Example 6, except for preparing a positive electrode precursor by using with respect to the composition of a coating solution of a positive electrode, 50.8 parts by weight of activated carbon 1, 37.8 parts by weight of lithium carbonate 1, 2.7 parts by weight of Ketjen black, 1.4 parts by weight of PVP (polyvinyl pyrrolidone), and 7.3 parts by weight of PVDF (polyvinylidene fluoride).

Example 8

A nonaqueous hybrid capacitor was prepared in a similar manner as described in Example 6, except for preparing a positive electrode precursor by using with respect to the composition of a coating solution of a positive electrode, 67.6 parts by weight of activated carbon 1, 17.2 parts by weight of lithium carbonate 1, 3.7 parts by weight of Ketjen black, 1.8 parts by weight of PVP (polyvinyl pyrrolidone), and 9.7 parts by weight of PVDF (polyvinylidene fluoride).

Example 9

A nonaqueous hybrid capacitor was prepared in a similar manner as described in Example 6, except for preparing a positive electrode precursor by using with respect to the composition of a coating solution of a positive electrode, 66.0 parts by weight of activated carbon 1, 19.2 parts by weight of lithium carbonate 1, 3.6 parts by weight of Ketjen black, 1.8 parts by weight of PVP (polyvinyl pyrrolidone), and 9.5 parts by weight of PVDF (polyvinylidene fluoride).

Comparative Example 4

A nonaqueous hybrid capacitor was prepared in a similar manner as described in Example 6, except for preparing a positive electrode precursor by using with respect to the composition of a coating solution of a positive electrode, 66.0 parts by weight of activated carbon 1, 19.2 parts by weight of lithium carbonate 1, 3.6 parts by weight of Ketjen black, 1.8 parts by weight of PVP (polyvinyl pyrrolidone), and 9.5 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 5

A nonaqueous hybrid capacitor was prepared in a similar manner as described in Example 6, except for preparing a positive electrode precursor by using with respect to the composition of a coating solution of a positive electrode, 75.1 parts by weight of activated carbon 1, 8.0 parts by weight of lithium carbonate 1, 4.1 parts by weight of Ketjen black, 2.0 parts by weight of PVP (polyvinyl pyrrolidone), and 10.8 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 6

A nonaqueous hybrid capacitor was prepared in a similar manner as described in Example 6, except for preparing a positive electrode precursor by using with respect to the composition of a coating solution of a positive electrode, 77.2 parts by weight of activated carbon 1, 5.5 parts by weight of lithium carbonate 1, 4.2 parts by weight of Ketjen black, 2.1 parts by weight of PVP (polyvinyl pyrrolidone), and 11.1 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Example 10

A positive electrode precursor was prepared by using with respect to the composition of a coating solution of a positive electrode, 54.2 parts by weight of activated carbon 1, 33.6 parts by weight of lithium carbonate 1, 2.9 parts by weight of Ketjen black, 1.5 parts by weight of PVP (polyvinyl pyrrolidone), and 7.8 parts by weight of PVDF (polyvinylidene fluoride). At this time, the positive electrode precursor having a film thickness of the positive electrode active material layer of 19 μm was prepared by setting a clearance of the applicator to 60 μm. Thereafter, a nonaqueous hybrid capacitor was prepared in a similar manner as described in Example 1.

Example 11

A nonaqueous hybrid capacitor was prepared in a similar manner as described in Example 10, except for preparing a positive electrode precursor by using with respect to the composition of a coating solution of a positive electrode, 46.3 parts by weight of activated carbon 1, 43.2 parts by weight of lithium carbonate 1, 2.5 parts by weight of Ketjen black, 1.3 parts by weight of PVP (polyvinyl pyrrolidone), and 6.7 parts by weight of PVDF (polyvinylidene fluoride).

Example 12

A nonaqueous hybrid capacitor was prepared in a similar manner as described in Example 10, except for preparing a positive electrode precursor by using with respect to the composition of a coating solution of a positive electrode, 41.2 parts by weight of activated carbon 1, 49.5 parts by weight of lithium carbonate 1, 2.2 parts by weight of Ketjen black, 1.1 parts by weight of PVP (polyvinyl pyrrolidone), and 5.9 parts by weight of PVDF (polyvinylidene fluoride).

Comparative Example 7

A nonaqueous hybrid capacitor was prepared in a similar manner as described in Example 10, except for preparing a positive electrode precursor by using with respect to the composition of a coating solution of a positive electrode, 55.9 parts by weight of activated carbon 1, 31.5 parts by weight of lithium carbonate 1, 3.0 parts by weight of Ketjen black, 1.5 parts by weight of PVP (polyvinyl pyrrolidone), and 8.1 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 8

A nonaqueous hybrid capacitor was prepared in a similar manner as described in Example 10, except for preparing a positive electrode precursor by using with respect to the composition of a coating solution of a positive electrode, 64.3 parts by weight of activated carbon 1, 21.2 parts by weight of lithium carbonate 1, 3.5 parts by weight of Ketjen black, 1.7 parts by weight of PVP (polyvinyl pyrrolidone), and 9.3 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 9

A nonaqueous hybrid capacitor was prepared in a similar manner as described in Example 10, except for preparing a positive electrode precursor by using with respect to the composition of a coating solution of a positive electrode, 70.8 parts by weight of activated carbon 1, 13.3 parts by weight of lithium carbonate 1, 3.8 parts by weight of Ketjen black, 1.9 parts by weight of PVP (polyvinyl pyrrolidone), and 10.2 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 10

A nonaqueous hybrid capacitor was prepared in a similar manner as described in Example 10, except for preparing a positive electrode precursor by using with respect to the composition of a coating solution of a positive electrode, 35.6 parts by weight of activated carbon 1, 56.4 parts by weight of lithium carbonate 1, 1.9 parts by weight of Ketjen black, 1.0 part by weight of PVP (polyvinyl pyrrolidone), and 5.1 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 11

A nonaqueous hybrid capacitor was prepared in a similar manner as described in Example 10, except for preparing a positive electrode precursor by using with respect to the composition of a coating solution of a positive electrode, 38.9 parts by weight of activated carbon 1, 52.4 parts by weight of lithium carbonate 1, 2.1 parts by weight of Ketjen black, 1.1 parts by weight of PVP (polyvinyl pyrrolidone), and 5.6 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Example 13

A positive electrode precursor was prepared by using, with respect to the composition of a coating solution of a positive electrode, 61.8 parts by weight of activated carbon 1, 24.2 parts by weight of lithium carbonate 1, 3.3 parts by weight of Ketjen black, 1.7 parts by weight of PVP (polyvinyl pyrrolidone), and 8.9 parts by weight of PVDF (polyvinylidene fluoride). At this time, the positive electrode precursor having a film thickness of the positive electrode active material layer of 153 µm was prepared by setting a clearance of the applicator to 450 µm. Thereafter, a nonaqueous hybrid capacitor was prepared in a similar manner as described in Example 1.

Example 14

A nonaqueous hybrid capacitor was prepared in a similar manner as described in Example 13, except for preparing a positive electrode precursor by using with respect to the composition of a coating solution of a positive electrode, 57.8 parts by weight of activated carbon 1, 29.2 parts by weight of lithium carbonate 1, 3.1 parts by weight of Ketjen black, 1.6 parts by weight of PVP (polyvinyl pyrrolidone), and 8.3 parts by weight of PVDF (polyvinylidene fluoride).

Comparative Example 12

A nonaqueous hybrid capacitor was prepared in a similar manner as described in Example 13, except for preparing a positive electrode precursor by using with respect to the composition of a coating solution of a positive electrode, 72.9 parts by weight of activated carbon 1, 10.7 parts by weight of lithium carbonate 1, 3.9 parts by weight of Ketjen black, 2.0 parts by weight of PVP (polyvinyl pyrrolidone), and 10.5 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

Comparative Example 13

A nonaqueous hybrid capacitor was prepared in a similar manner as described in Example 13, except for preparing a positive electrode precursor by using with respect to the composition of a coating solution of a positive electrode, 77.2 parts by weight of activated carbon 1, 5.4 parts by weight of lithium carbonate 1, 4.2 parts by weight of Ketjen black, 2.1 parts by weight of PVP (polyvinyl pyrrolidone), and 11.1 parts by weight of PVDF (polyvinylidene fluoride) as well as a mixed solvent of NMP (N-methylpyrrolidone) and pure water in a weight ratio of 90:10, followed by dispersing the constituting substances to prepare the coating solution.

The evaluation results of the positive electrode precursors and those of the nonaqueous hybrid capacitors in Examples 1 to 14 and Comparative Examples 1 to 13 are shown in Table 1.

TABLE 1

| | A (g/m$^2$) | B (g/m$^2$) | A/B | C (m$^2$/cm$^2$) | C/B | D (µL/cm$^2$) | E (µL/cm$^2$) | Fa (F) | Fa/B |
|---|---|---|---|---|---|---|---|---|---|
| Exp. 1 | 13.60 | 28.68 | 0.474 | 3.46 | 0.121 | 0.82 | 1.40 | 11.86 | 0.414 |
| Exp. 2 | 8.54 | 29.76 | 0.287 | 3.63 | 0.122 | 0.87 | 1.47 | 11.97 | 0.402 |
| Exp. 3 | 6.11 | 28.74 | 0.213 | 3.70 | 0.132 | 0.86 | 1.42 | 11.75 | 0.409 |
| Exp. 4 | 20.21 | 28.89 | 0.700 | 3.53 | 0.122 | 0.85 | 1.41 | 12.01 | 0.416 |
| Exp. 5 | 28.13 | 28.79 | 0.977 | 3.41 | 0.118 | 0.84 | 1.45 | 12.05 | 0.419 |
| Com. Exp. 1 | 5.43 | 28.87 | 0.188 | 0.47 | 0.016 | 0.26 | 0.48 | 9.21 | 0.319 |
| Com. Exp. 2 | 4.73 | 28.31 | 0.167 | 0.49 | 0.017 | 0.27 | 0.45 | 7.61 | 0.269 |
| Com. Exp. 3 | 3.54 | 28.76 | 0.123 | 0.52 | 0.018 | 0.23 | 0.43 | 6.47 | 0.225 |
| Exp. 6 | 30.53 | 56.30 | 0.542 | 6.53 | 0.116 | 1.63 | 2.76 | 23.54 | 0.418 |
| Exp. 7 | 34.60 | 56.93 | 0.608 | 7.02 | 0.123 | 1.68 | 2.87 | 24.04 | 0.422 |
| Exp. 8 | 11.56 | 55.79 | 0.207 | 6.77 | 0.121 | 1.57 | 2.81 | 23.41 | 0.420 |
| Exp. 9 | 13.31 | 56.13 | 0.237 | 6.89 | 0.123 | 1.69 | 2.84 | 23.88 | 0.425 |
| Com. Exp. 4 | 9.72 | 56.34 | 0.173 | 0.97 | 0.017 | 0.52 | 0.88 | 17.65 | 0.313 |
| Com. Exp. 5 | 4.89 | 56.61 | 0.086 | 0.95 | 0.017 | 0.53 | 0.91 | 11.43 | 0.202 |
| Com. Exp. 6 | 3.24 | 56.11 | 0.058 | 0.89 | 0.016 | 0.49 | 0.86 | 8.89 | 0.158 |

TABLE 1-continued

|  | A (g/m²) | B (g/m²) | A/B | C (m²/cm²) | C/B | D (μL/cm²) | E (μL/cm²) | Fa (F) | Fa/B |
|---|---|---|---|---|---|---|---|---|---|
| Exp. 10 | 5.12 | 10.12 | 0.506 | 1.23 | 0.122 | 0.34 | 0.57 | 4.41 | 0.436 |
| Exp. 11 | 7.65 | 10.04 | 0.762 | 1.17 | 0.117 | 0.33 | 0.55 | 4.39 | 0.437 |
| Exp. 12 | 10.01 | 10.21 | 0.980 | 1.20 | 0.118 | 0.31 | 0.52 | 4.35 | 0.426 |
| Com. Exp. 7 | 4.75 | 10.32 | 0.460 | 0.23 | 0.022 | 0.12 | 0.27 | 3.41 | 0.330 |
| Com. Exp. 8 | 2.75 | 10.22 | 0.269 | 0.21 | 0.021 | 0.13 | 0.25 | 2.66 | 0.260 |
| Com. Exp. 9 | 1.56 | 10.19 | 0.153 | 0.22 | 0.022 | 0.11 | 0.22 | 1.41 | 0.138 |
| Com. Exp. 10 | 13.21 | 10.21 | 1.294 | 0.25 | 0.024 | 0.10 | 0.21 | 3.74 | 0.366 |
| Com. Exp. 11 | 11.33 | 10.31 | 1.099 | 0.21 | 0.020 | 0.11 | 0.2 | 3.56 | 0.345 |
| Exp. 13 | 26.97 | 84.31 | 0.320 | 11.20 | 0.133 | 2.73 | 4.57 | 35.45 | 0.420 |
| Exp. 14 | 34.97 | 84.87 | 0.412 | 10.87 | 0.128 | 2.79 | 4.63 | 35.21 | 0.415 |
| Com. Exp. 12 | 10.21 | 85.61 | 0.119 | 1.52 | 0.018 | 0.72 | 1.35 | 24.43 | 0.285 |
| Com. Exp. 13 | 4.87 | 84.54 | 0.058 | 1.53 | 0.018 | 0.67 | 1.32 | 12.32 | 0.146 |

Charging and discharging of the nonaqueous hybrid capacitor proceed by decomposing the alkali metal compound contained in the positive electrode precursor, from which the alkali metal ions associating with charging and discharging are pre-doped to the negative electrode or released in the electrolytic solution. When the alkali metal ions are sufficiently present in the negative electrode or the electrolytic solution, the static capacitance, Fa of the nonaqueous hybrid capacitor is proportional to the weight, B of the positive electrode active material. Namely, the ratio of Fa/B, i.e., the ratio of the static capacitance, Fa of the nonaqueous hybrid capacitor to the weight, B of the positive electrode active material takes a certain fixed value, however, when decomposition of the alkali metal compound is incomplete, the alkali metal ions associating with charging and discharging are deficient, thereby the value of Fa/B is decreased.

From Table 1, Fa/B is found to be a value of from 0.4 to 0.45, when 0.20≤A/B≤1.00 as well as 1≤C≤20 is satisfied, from which a sufficient amount of the alkali metal ions is considered to be present in the nonaqueous hybrid capacitor. On the other hand, it is conjectured that when at least either one of 0.20≤A/B≤1.00 or 1≤C≤20 is not satisfied, decomposition of the alkali metal compound is incomplete, thereby the value of Fa/B is decreased.

It is conjectured that when the coating solution of the positive electrode is dispersed, the alkali metal compound in the coating solution which dissolves in a trace amount by addition of about 1% of pure water into NMP could stick to the surface of the activated carbon in a moderate amount. Therefore, it is considered that the alkali metal compound in the pre-doping was decomposed efficiently, and the pre-doping was completed in a short period of only 2 hours. On the other hand, it is conjectured that when the amount of pure water increases to about 10%, an excessive amount of the alkali metal compound proceeds to dissolve into the solution, from which impregnation of the electrolytic solution becomes incomplete, since the surface and the side of the activated carbon are converted with the alkali metal compound, thereby decomposition of the alkali metal compound was inhibited.

Example 15

A nonaqueous hybrid capacitor was prepared in a similar manner as described in Example 1, except for using activated carbon 2 as the activated carbon and sodium carbonate as the alkali metal compound.

Example 16

A nonaqueous hybrid capacitor was prepared in a similar manner as described in Example 1, except for using activated carbon 2 as the activated carbon and potassium carbonate as the alkali metal compound.

Example 17

A nonaqueous hybrid capacitor was prepared in a similar manner as described in Example 1, except for using activated carbon 2 as the activated carbon and a mixture of lithium carbonate and sodium carbonate in a weight ratio of 9:1 as the alkali metal compound.

Example 18

A nonaqueous hybrid capacitor was prepared in a similar manner as described in Example 1, except for using activated carbon 2 as the activated carbon and a mixture of lithium carbonate and sodium carbonate in a weight ratio of 1:1 as the alkali metal compound.

Example 19

A nonaqueous hybrid capacitor was prepared in a similar manner as described in Example 1, except for using activated carbon 2 as the activated carbon and a mixture of lithium carbonate and sodium carbonate in a weight ratio of 1:9 as the alkali metal compound.

Example 20

A nonaqueous hybrid capacitor was prepared in a similar manner as described in Example 1, except for using activated carbon 2 as the activated carbon and a mixture of lithium carbonate and potassium carbonate in a weight ratio of 9:1 as the alkali metal compound.

Example 21

A nonaqueous hybrid capacitor was prepared in a similar manner as described in Example 1, except for using activated carbon 2 as the activated carbon and a mixture of lithium carbonate and rubidium carbonate in a weight ratio of 9:1 as the alkali metal compound.

Example 22

A nonaqueous hybrid capacitor was prepared in a similar manner as described in Example 1, except for using activated carbon 2 as the activated carbon and a mixture of lithium carbonate and cesium carbonate in a weight ratio of 9:1 as the alkali metal compound.

Example 23

A nonaqueous hybrid capacitor was prepared in a similar manner as described in Example 1, except for using activated carbon 2 as the activated carbon and a mixture of lithium carbonate, sodium carbonate and potassium carbonate in a weight ratio of 9:0.5:0.5 as the alkali metal compound.

Comparative Example 14

A nonaqueous hybrid capacitor was prepared in a similar manner as described in Example 15, except for using a mixed solvent of NMP (N-methylpyrrolidone) and pure water in a weight ratio of 90:10 as a dispersing solvent for the positive electrode coating solution.

Comparative Example 15

A nonaqueous hybrid capacitor was prepared in a similar manner as described in Example 16, except for using a mixed solvent of NMP (N-methylpyrrolidone) and pure water in a weight ratio of 90:10 as a dispersing solvent for the positive electrode coating solution.

Comparative Example 16

A nonaqueous hybrid capacitor was prepared in a similar manner as described in Example 17, except for using a mixed solvent of NMP (N-methylpyrrolidone) and pure water in a weight ratio of 90:10 as a dispersing solvent for the positive electrode coating solution.

Comparative Example 17

A nonaqueous hybrid capacitor was prepared in a similar manner as described in Example 18, except for using a mixed solvent of NMP (N-methylpyrrolidone) and pure water in a weight ratio of 90:10 as a dispersing solvent for the positive electrode coating solution.

Comparative Example 18

A nonaqueous hybrid capacitor was prepared in a similar manner as described in Example 19, except for using a mixed solvent of NMP (N-methylpyrrolidone) and pure water in a weight ratio of 90:10 as a dispersing solvent for the positive electrode coating solution.

Comparative Example 19

A nonaqueous hybrid capacitor was prepared in a similar manner as described in Example 20, except for using a mixed solvent of NMP (N-methylpyrrolidone) and pure water in a weight ratio of 90:10 as a dispersing solvent for the positive electrode coating solution.

Comparative Example 20

A nonaqueous hybrid capacitor was prepared in a similar manner as described in Example 21, except for using a mixed solvent of NMP (N-methylpyrrolidone) and pure water in a weight ratio of 90:10 as a dispersing solvent for the positive electrode coating solution.

Comparative Example 21

A nonaqueous hybrid capacitor was prepared in a similar manner as described in Example 22, except for using a mixed solvent of NMP (N-methylpyrrolidone) and pure water in a weight ratio of 90:10 as a dispersing solvent for the positive electrode coating solution.

Comparative Example 22

A nonaqueous hybrid capacitor was prepared in a similar manner as described in Example 23, except for using a mixed solvent of NMP (N-methylpyrrolidone) and pure water in a weight ratio of 90:10 as a dispersing solvent for the positive electrode coating solution.

Example 24

A nonaqueous hybrid capacitor was prepared in a similar manner as described in Example 6, except for using activated carbon 2 as the activated carbon and a mixture of lithium carbonate and sodium carbonate in a weight ratio of 9:1 as the alkali metal compound.

Example 25

A nonaqueous hybrid capacitor was prepared in a similar manner as described in Example 6, except for using activated carbon 2 as the activated carbon and a mixture of lithium carbonate and potassium carbonate in a weight ratio of 9:1 as the alkali metal compound.

Comparative Example 23

A nonaqueous hybrid capacitor was prepared in a similar manner as described in Comparative Example 5, except for using activated carbon 2 as the activated carbon and a mixture of lithium carbonate and sodium carbonate in a weight ratio of 9:1 as the alkali metal compound.

Comparative Example 24

A nonaqueous hybrid capacitor was prepared in a similar manner as described in Comparative Example 5, except for using activated carbon 2 as the activated carbon and a mixture of lithium carbonate and potassium carbonate in a weight ratio of 9:1 as the alkali metal compound.

Example 26

A nonaqueous hybrid capacitor was prepared in a similar manner as described in Example 1, except for using activated carbon 2 as the activated carbon and a mixture of lithium carbonate and sodium oxide in a weight ratio of 9:1 as the alkali metal compound.

Example 27

A nonaqueous hybrid capacitor was prepared in a similar manner as described in Example 1, except for using activated carbon 2 as the activated carbon and a mixture of lithium carbonate and potassium hydroxide in a weight ratio of 1:1 as the alkali metal compound.

Example 28

A nonaqueous hybrid capacitor was prepared in a similar manner as described in Example 1, except for using activated carbon 2 as the activated carbon and a mixture of lithium carbonate and sodium chloride in a weight ratio of 9:1 as the alkali metal compound.

Example 29

A nonaqueous hybrid capacitor was prepared in a similar manner as described in Example 1, except for using activated carbon 2 as the activated carbon and a mixture of lithium carbonate and potassium fluoride in a weight ratio of 9:1 as the alkali metal compound.

The evaluation results of positive electrode precursors and those of nonaqueous hybrid capacitors in Examples 15 to 29 and Comparative Examples 14 to 24 are shown in Table 2.

TABLE 2

| | Alkali metal carbonate | | | | | | | | | | |
|---|---|---|---|---|---|---|---|---|---|---|---|
| | Mixture | Formulation ratio | A ($g/m^2$) | B ($g/m^2$) | A/B | C ($m^2/cm^2$) | C/B | D ($\mu L/cm^2$) | E ($\mu L/cm^2$) | Fa (F) | Fa/B |
| Exp. 15 | $Na_2CO_3$ | 1 | 13.60 | 28.43 | 0.478 | 8.06 | 0.284 | 1.76 | 3.34 | 14.42 | 0.507 |
| Exp. 16 | $K_2CO_3$ | 1 | 13.32 | 28.73 | 0.464 | 8.97 | 0.312 | 1.86 | 3.65 | 14.12 | 0.491 |
| Exp. 17 | $Li_2CO_3\ Na_2CO_3$ | 9:1 | 13.54 | 28.12 | 0.482 | 7.79 | 0.277 | 1.82 | 3.42 | 15.31 | 0.544 |
| Exp. 18 | $Li_2CO_3\ Na_2CO_3$ | 1:1 | 13.57 | 29.02 | 0.468 | 8.68 | 0.299 | 1.85 | 3.54 | 15.11 | 0.521 |
| Exp. 19 | $Li_2CO_3\ Na_2CO_3$ | 1:9 | 13.26 | 29.21 | 0.454 | 8.39 | 0.287 | 1.82 | 3.59 | 14.88 | 0.509 |
| Exp. 20 | $Li_2CO_3\ K_2CO_3$ | 9:1 | 13.76 | 28.81 | 0.477 | 8.65 | 0.300 | 1.72 | 3.41 | 15.19 | 0.527 |
| Exp. 21 | $Li_2CO_3\ Rb_2CO_3$ | 9:1 | 13.83 | 28.53 | 0.485 | 8.06 | 0.283 | 1.91 | 3.37 | 15.01 | 0.526 |
| Exp. 22 | $Li_2CO_3\ Ca_2CO_3$ | 9:1 | 13.42 | 28.12 | 0.477 | 8.18 | 0.291 | 1.90 | 3.32 | 14.85 | 0.528 |
| Exp. 23 | $Li_2CO_3\ Na_2CO_3\ K_2CO_3$ | 9:0.5:0.5 | 13.58 | 28.43 | 0.478 | 8.36 | 0.294 | 1.88 | 3.51 | 15.34 | 0.540 |
| Com. Exp. 14 | $Na_2CO_3$ | 1 | 13.68 | 28.94 | 0.473 | 0.51 | 0.018 | 0.24 | 0.47 | 10.52 | 0.364 |
| Com. Exp. 15 | $K_2CO_3$ | 1 | 13.49 | 28.43 | 0.474 | 0.48 | 0.017 | 0.26 | 0.51 | 10.11 | 0.356 |
| Com. Exp. 16 | $Li_2CO_3\ Na_2CO_3$ | 9:1 | 13.38 | 29.03 | 0.461 | 0.52 | 0.018 | 0.27 | 0.49 | 10.32 | 0.355 |
| Com. Exp. 17 | $Li_2CO_3\ Na_2CO_3$ | 1:1 | 13.75 | 28.65 | 0.480 | 0.49 | 0.017 | 0.25 | 0.53 | 10.05 | 0.351 |
| Com. Exp. 18 | $Li_2CO_3\ Na_2CO_3$ | 1:9 | 13.18 | 28.87 | 0.457 | 0.50 | 0.017 | 0.28 | 0.56 | 9.85 | 0.341 |
| Com. Exp. 19 | $Li_2CO_3\ K_2CO_3$ | 9:1 | 13.86 | 28.45 | 0.487 | 0.46 | 0.016 | 0.23 | 0.49 | 10.09 | 0.355 |
| Com. Exp. 20 | $Li_2CO_3\ Rb_2CO_3$ | 9:1 | 13.49 | 28.41 | 0.475 | 0.48 | 0.017 | 0.24 | 0.47 | 9.94 | 0.350 |
| Com. Exp. 21 | $Li_2CO_3\ Ca_2CO_3$ | 9:1 | 13.33 | 29.11 | 0.458 | 0.53 | 0.018 | 0.21 | 0.49 | 9.68 | 0.333 |
| Com. Exp. 22 | $Li_2CO_3\ Na_2CO_3\ K_2CO_3$ | 9:0.5:0.5 | 13.58 | 28.94 | 0.469 | 0.51 | 0.018 | 0.25 | 0.51 | 10.51 | 0.363 |
| Exp. 24 | $Li_2CO_3\ Na_2CO_3$ | 9:1 | 30.21 | 56.74 | 0.532 | 16.45 | 0.290 | 4.07 | 7.31 | 29.21 | 0.515 |
| Exp. 25 | $Li_2CO_3\ K_2CO_3$ | 9:1 | 30.98 | 56.12 | 0.552 | 17.43 | 0.311 | 3.91 | 7.15 | 29.84 | 0.532 |
| Com. Exp. 23 | $Li_2CO_3\ Na_2CO_3$ | 9:1 | 29.78 | 56.18 | 0.530 | 0.91 | 0.016 | 0.41 | 0.81 | 20.31 | 0.362 |
| Com. Exp. 24 | $Li_2CO_3\ K_2CO_3$ | 9:1 | 30.56 | 26.35 | 0.542 | 0.87 | 0.015 | 0.42 | 0.84 | 19.56 | 0.347 |
| Exp. 26 | $Li2CO_3\ Na_2O$ | 9:1 | 13.42 | 28.76 | 0.467 | 8.16 | 0.284 | 1.93 | 3.41 | 15.31 | 0.532 |
| Exp. 27 | $Li_2CO_3\ KOH$ | 9:1 | 13.55 | 28.13 | 0.482 | 8.31 | 0.295 | 1.79 | 3.57 | 15.11 | 0.537 |
| Exp. 28 | $Li_2CO_3\ NaCl$ | 9:1 | 13.28 | 28.63 | 0.464 | 8.52 | 0.298 | 1.81 | 3.51 | 15.09 | 0.527 |
| Exp. 29 | $Li_2CO_3\ KF$ | 9:1 | 13.72 | 28.49 | 0.482 | 8.22 | 0.289 | 1.95 | 3.55 | 15.27 | 0.536 |

From Table 2, even in the case the different activated carbon and the different alkali metal compound are used, Fa/B shows the maximum value, when 0.20≤A/B≤1.00 and 1≤C≤20 are satisfied. By considering the result, a sufficient amount of the alkali metal ions is considered to be present in the nonaqueous hybrid capacitor.

Next, a detailed explanation on the embodiments in the second aspect of the present invention will be given below.

Example 30

<Crushing of Lithium Carbonate>

Lithium carbonate 2 having an average particle diameter of 0.4 µm was obtained by allowing 20 g of lithium carbonate having an average particle diameter of 53 µm to stand under an environment of a temperature of 60° C. and humidity of 80% RH for 2 hours, cooling it to −20° C. in a rotation and revolution-type crushing machine (NP-100), manufactured by Thinky Co., Ltd., and crushing it in the machine with zirconia beads having a diameter of 1.0 mm under 1700 rpm for 20 minutes.

<Production of Positive Electrode Precursor>

A positive electrode precursor was produced as follows using activated carbon 1 as the positive electrode active material and lithium carbonate 2 as the alkali metal compound.

A coating solution was obtained by mixing 55.5 parts by weight of activated carbon 1, 32.0 parts by weight of lithium carbonate, 3.0 parts by weight of ketjen black, 1.5 parts by weight of PVP (polyvinyl pyrrolidone), and 8.0 parts by weight of PVDF (polyvinylidene fluoride) as well as a mixed solvent of NMP (N-methylpyrrolidone) and pure water in a weight ratio of 99:1, followed by dispersing them using a thin film spin-type high speed mixer, Filmix, manufactured by PRIMIX Co., Ltd. under the condition of a peripheral speed of 17 m/s.

The viscosity (ηb) and the value, TI of the resulting coating solution were measured using an E-type viscometer, TVE-35H, manufactured by Touki Sangyo Co., Ltd. As a result, the viscosity (ηb) was 2,490 mPa·s, and the value, TI 4.2. Dispersity of the resulting coating solution was measured using a particle gauge, manufactured by YOSHIMITSU SEIKI Co., Ltd. and the particle size was 31 µm.

Positive electrode precursor 2 was obtained by setting a clearance of the applicator of an automatic coating apparatus, manufactured by TESTER SANGYO Co., Ltd. to 150 µm, and coating the coating solution on one surface of an aluminum foil having a thickness of 15 µm under the condition of a coating speed of 1 m/min. Resulting positive electrode precursor 2 was subjected to press rolling by using a roll-press machine under the conditions of a pressure of 6 kN/cm and a surface temperature at the pressing part of 25° C. A film thickness of the positive electrode active material layer of resulting positive electrode precursor 2 was determined by subtracting the thickness of the aluminum foil from the average value of thicknesses of the precursor measured at arbitrary 10 points by using a film thickness meter, Linear Gauge Sensor, GS-551, manufactured by ONO SOKKI Co., Ltd. As a result, the film thickness of the positive electrode active material layer was 49 μm.

<Calculation of X>

Sample 3 was prepared by cutting positive electrode precursor 2 in a size of 10 cm×5 cm, and weighing $M_0$ thereof to be 0.3076 g. Lithium carbonate in sample 3 was eluted in distilled water by impregnating sample 1 in 31.0 g of distilled water, followed by holding it until the elapse of 3 days in an environment at 25° C. Then sample 3 was taken out, and vacuum dried for 12 hours under conditions of 150° C. and 3 kPa. The weight, $M_1$ of the sample at this time was 0.2411 g. After this, the active material layer on the positive electrode power collector was removed using a spatula and a brush, and then the weight $M_2$ of the positive electrode power collector was measured to be 0.0990 g. According to equation (5), X was calculated to be 31.9% by weight.

<Calculation of $S_1$, $S_2$>

[Preparation of Sample]

A small piece having a size of 1 cm×1 cm was cut out from positive electrode precursor 2, and the surface thereof was coated by sputtering gold under a vacuum of 10 Pa.

[Measurement of Surface SEM and EDX]

The surface of the positive electrode prepared above which was exposed to an atmospheric environment was analyzed by SEM and EDX. The measurement conditions are described below.

(Measurement Conditions of SEM-EDX)

Measurement apparatus: Field emission-type SEM, FE-SEM, S-4700, manufactured by Hitachi High-Technologies Corp., and energy dispersion-type X-ray analysis apparatus, EMAX, manufactured by Horiba, Co., Ltd.

Acceleration voltage: 10 kV
Emission current: 10 μA
Measurement magnification: 2000 times
Electron beam incident angle: 90°
X-ray take out angle: 30°
Dead time: 15%
Mapping elements: C, O, F
Measurement pixel number: 256×256 pixels
Measurement time: 60 sec.
Integration number: 50 times Brightness and contrast were adjusted so that there were no pixels showing the maximum brightness value, and an average value of brightness value fell within a range of 40% to 60% of the maximum brightness value.

(Analysis of SEM-EDX)

In the oxygen mapping, the images obtained were binarized based on the average value of luminance values by using image analysis software (ImageJ). Area S of oxygen obtained in the oxygen mapping this time was 25.6% with respect to the total images.

[Measurement of Cross-Section SEM and EDX]

A cross section perpendicular to the surface direction of positive electrode precursor 2 was prepared by cutting out from positive electrode precursor 2 in a size of 1 cm×1 cm, using SM-09020CP, manufactured by JEOL in an argon gas atmosphere under the conditions of an acceleration voltage of 4 kV and a beam diameter of 500 μm. After this, the cross-section SEM and EDX were measured by the method described above.

In the cross-section SEM and EDX of the resulting positive electrode precursor, the images obtained in the oxygen mapping and fluorine mapping were binarized in a similar manner described above. The area $S_2$ of oxygen obtained in the oxygen mapping this time was 24.5% with respect to the total images.

From the measurement results of SEM-EDX, the following calculation results were obtained: $S_1/X=0.80$, and $S_2/X=0.77$.

[Preparation of Nonaqueous Hybrid Capacitor]

One sheet of positive electrode precursor 2 in which the positive electrode active material layer has a size of 10.0 cm×5.0 cm, and one sheet of negative electrode 1 in which the negative electrode active material layer has a size of 10.1 cm×5.1 cm were cut out respectively, and also one sheet of a separator made of polyethylene and having a size of 10.3 cm×5.3 cm (manufactured by Asahi Kasei, Corp., thickness 15 μm) was prepared. An electrode laminated body was obtained by laminating them in the order of positive electrode precursor 2, the separator, and negative electrode 1.

After the resulting electrode laminated body was connected to a positive electrode terminal and a negative electrode terminal by ultrasonic welding, the body was put into a container fabricated by an aluminum laminate packaging material, and then, three sides of the container including the side with the two electrode terminals were heat-sealed. The nonaqueous hybrid capacitor was prepared by pouring 3.5 g of a propylene carbonate (PC) solution of $LiPF_6$ having a concentration of an electrolyte of 1.2 M as a nonaqueous electrolytic solution under an atmospheric pressure at 25° C. into the electrode laminated body accommodated in the aluminum laminate packaging material in a dry air environment having a dew point of −40° C. or lower. Subsequently, the nonaqueous hybrid capacitor was introduced to a pressure reduction chamber, and a pressure inside the chamber was reduced from an atmospheric pressure to −87 kPa, and returned to an atmospheric pressure. After this, the capacitor was allowed to stand for 5 minutes. Then, a step of returning to an atmospheric pressure after reducing the pressure from an atmospheric pressure to −87 kPa was repeated four times, followed by allowing the capacitor to stand for 15 minutes. Furthermore, after the pressure was reduced from an atmospheric pressure to −91 kPa, it was returned to an atmospheric pressure. Similarly, the step of reducing the pressure and returning to an atmospheric pressure was repeated seven times in total (each pressure was reduced to −95, −96, −97, −81, −97, −97, and −97 kPa, respectively). The nonaqueous electrolytic solution was impregnated to the electrode laminated body by the above steps.

After this, the nonaqueous hybrid capacitor was put in a reduced-pressure sealing machine in which the pressure was in a state of a reduced pressure of −95 kPa, and the aluminum laminate packaging material was encapsulated by applying pressure of 0.1 MPa at 180° C. for 10 seconds.

[Pre-Doping Step]

The resulting nonaqueous hybrid capacitor was put into an argon box having a temperature of 25° C., dew point −60° C., and an oxygen concentration of 1 ppm. Doping of lithium to the negative electrode was carried out by unsealing the aluminum laminate packaging material accommodating the nonaqueous hybrid capacitor, cutting out a surplus portion of the packaging material, carrying out charging up to 4.5 V under the constant current of 50 mA, and subsequently initial charging under the constant voltage at 4.5 V for 2 consecutive hours using a power source (P4LT18-0.2), manufactured by Matsusada Precision Inc. After completion of the lithium doping, the aluminum laminate was encapsulated using a heat seal machine (FA-300), manufactured by FUJIIMPULSE Co., Ltd.

[Aging Step]

The nonaqueous hybrid capacitor after the lithium doping was taken out from the argon box, and then, after carrying out constant current discharging down to 3.8 V under the current of 50 mA at 25° C., a voltage was adjusted to 3.8 V by carrying out constant voltage discharging under the voltage at 3.8 V for 1 hour. Subsequently, the nonaqueous hybrid capacitor was stored in a thermostat chamber at 60° C. for 8 hours.

[Gas Venting Step]

After aging, a part of the aluminum laminate packaging material accommodating the nonaqueous hybrid capacitor was unsealed at a temperature of 25° C. under a dry air environment having a dew point of −40° C. or lower. Subsequently, the nonaqueous hybrid capacitor was put in a pressure reduction chamber, and the step was repeated three times in total, in which the pressure was reduced from an atmospheric pressure to −80 kPa over a period of 3 minutes, and returned to an atmospheric pressure over a period of 3 minutes by using a diaphragm pump (manufactured by KNF Co., Ltd., N816. 3KT. 45. 18). Then, after putting the nonaqueous hybrid capacitor in a reduced-pressure sealing machine to reduce pressure to −90 kPa, the aluminum laminate packaging material was encapsulated by sealing under a pressure of 0.1 MPa at 200° C. for 10 seconds.

[Evaluation of Nonaqueous Hybrid Capacitor]

[Measurement of Static Capacitance Fa]

The nonaqueous hybrid capacitor obtained in the previous step was subjected to constant current charging in a thermostat chamber set at 25° C. up to 3.8 V under the current of 2C (10 mA), and subsequently constant voltage charging by applying the voltage of 3.8 V for 30 minutes in total. After this, constant current discharging was carried out down to 2.2 V under the current of 2C (10 mA), and the capacitance so obtained is defined as Q(C). The static capacitance, Fa calculated by F=Q/(3.8−2.2) was 11.52 F.

Example 31

A nonaqueous hybrid capacitor was prepared in a similar manner as described in Example 30, except for preparing a positive electrode precursor using a mixed solvent of NMP (N-methylpyrrolidone) and pure water in a weight ratio of 98:2 as a dispersing solvent of for the positive electrode coating solution.

Example 32

A nonaqueous hybrid capacitor was prepared in a similar manner as described in Example 30, except for preparing a positive electrode precursor using a mixed solvent of NMP (N-methylpyrrolidone) and pure water in a weight ratio of 97:3 as a dispersing solvent for the positive electrode coating solution.

Example 33

A nonaqueous hybrid capacitor was prepared in a similar manner as described in Example 30, except for using with respect to the composition of the positive electrode coating solution, 64.4 parts by weight of activated carbon 1, 21.1 parts by weight of lithium carbonate 2, 3.5 parts by weight of Ketjen black, 1.7 parts by weight of PVP (polyvinyl pyrrolidone), and 9.3 parts by weight of PVDF (polyvinylidene fluoride).

Example 34

A nonaqueous hybrid capacitor was prepared in a similar manner as described in Example 33, except for preparing a positive electrode precursor using a mixed solvent of NMP (N-methylpyrrolidone) and pure water in a weight ratio of 98:2 as a dispersing solvent for the positive electrode coating solution.

Example 35

A nonaqueous hybrid capacitor was prepared in a similar manner as described in Example 33, except for preparing a positive electrode precursor using a mixed solvent of NMP (N-methylpyrrolidone) and pure water in a weight ratio of 97:3 as a dispersing solvent for the positive electrode coating solution.

Example 36

A nonaqueous hybrid capacitor was prepared in a similar manner as described in Example 30, except for preparing a positive electrode precursor using with respect to the composition of the positive electrode coating solution, 71.7 parts by weight of activated carbon 1, 12.2 parts by weight of lithium carbonate 2, 3.9 parts by weight of Ketjen black, 1.9 parts by weight of PVP (polyvinyl pyrrolidone), and 10.3 parts by weight of PVDF (polyvinylidene fluoride).

Example 37

A nonaqueous hybrid capacitor was prepared in a similar manner as described in Example 36, except for preparing a positive electrode precursor using a mixed solvent of NMP (N-methylpyrrolidone) and pure water in a weight ratio of 98:2 as a dispersing solvent for the positive electrode coating solution.

Example 38

A nonaqueous hybrid capacitor was prepared in a similar manner as described in Example 36, except for preparing a positive electrode precursor using a mixed solvent of NMP (N-methylpyrrolidone) and pure water in a weight ratio of 97:3 as a dispersing solvent of a coating solution for the positive electrode.

Example 39

A nonaqueous hybrid capacitor was prepared in a similar manner as described in Example 30, except for preparing a positive electrode precursor using with respect to the composition of the positive electrode coating solution, 74.4 parts by weight of activated carbon 1, 8.8 parts by weight of lithium carbonate 2, 4.0 parts by weight of Ketjen black, 2.0 parts by weight of PVP (polyvinyl pyrrolidone), and 10.7 parts by weight of PVDF (polyvinylidene fluoride).

Example 40

A nonaqueous hybrid capacitor was prepared in a similar manner as described in Example 39, except for preparing a positive electrode precursor using a mixed solvent of NMP (N-methylpyrrolidone) and pure water in a weight ratio of 98:2 as a dispersing solvent for the positive electrode coating solution.

Example 41

A nonaqueous hybrid capacitor was prepared in a similar manner as described in Example 39, except for preparing a positive electrode precursor using a mixed solvent of NMP (N-methylpyrrolidone) and pure water in a weight ratio of 97:3 as a dispersing solvent for the positive electrode coating solution.

Example 42

A nonaqueous hybrid capacitor was prepared in a similar manner as described in Example 30, except for preparing a positive electrode precursor using with respect to the composition of the positive electrode coating solution, 76.5 parts by weight of activated carbon 1, 6.3 parts by weight of lithium carbonate 2, 4.1 parts by weight of Ketjen black, 2.1 parts by weight of PVP (polyvinyl pyrrolidone), and 11.0 parts by weight of PVDF (polyvinylidene fluoride).

Example 43

A nonaqueous hybrid capacitor was prepared in a similar manner as described in Example 42, except for preparing a positive electrode precursor using a mixed solvent of NMP (N-methylpyrrolidone) and pure water in a weight ratio of 98:2 as a dispersing solvent for the positive electrode coating solution.

Example 44

A nonaqueous hybrid capacitor was prepared in a similar manner as described in Example 42, except for preparing a positive electrode precursor using a mixed solvent of NMP (N-methylpyrrolidone) and pure water in a weight ratio of 97:3 as a dispersing solvent for the positive electrode coating solution.

Example 45

A nonaqueous hybrid capacitor was prepared in a similar manner as described in Example 30, except for preparing a positive electrode precursor using with respect to the composition of the positive electrode coating solution, 43.1 parts by weight of activated carbon 1, 47.2 parts by weight of lithium carbonate 2, 2.3 parts by weight of Ketjen black, 1.2 parts by weights of PVP (polyvinyl pyrrolidone), and 6.2 parts by weight of PVDF (polyvinylidene fluoride).

Example 46

A nonaqueous hybrid capacitor was prepared in a similar manner as described in Example 45, except for preparing the positive electrode precursor using a mixed solvent of NMP (N-methylpyrrolidone) and pure water in a weight ratio of 98:2 as a dispersing solvent for the positive electrode coating solution.

Example 47

A nonaqueous hybrid capacitor was prepared in a similar manner as described in Example 45, except for preparing a positive electrode precursor using a mixed solvent of NMP (N-methylpyrrolidone) and pure water in a weight ratio of 97:3, as a dispersing solvent for the positive electrode coating solution.

Comparative Example 26

Lithium carbonate 3 having an average particle diameter of 1.5 μm was obtained by crushing 20 g of lithium carbonate having an average particle diameter of 53 μm with zirconia beads having a diameter of 0.1 mm by using a rotation and revolution-type crushing machine (NP-100), manufactured by Thinky Corp. at 1,700 rpm for 20 minutes in an environment of 25° C.

A nonaqueous hybrid capacitor was prepared in a similar manner as described in Comparative Example 30, except for preparing a positive electrode precursor using with respect to the composition of the positive electrode coating solution, 78.5 parts by weight of activated carbon 1, 3.8 parts by weight of lithium carbonate 3, 4.2 parts by weight of Ketjen black, 2.1 parts by weight of PVP (polyvinyl pyrrolidone), and 11.3 parts by weight of PVDF (polyvinylidene fluoride) as well as NMP (N-methylpyrrolidone) as a dispersing solvent.

Comparative Example 27

A nonaqueous hybrid capacitor was prepared in a similar manner as described in Comparative Example 26, except for preparing a positive electrode precursor using a mixed solvent of NMP (N-methylpyrrolidone) and pure water in a weight ratio of 99.9:0.1 as a dispersing solvent for the positive electrode coating solution.

Comparative Example 28

A nonaqueous hybrid capacitor was prepared in a similar manner as described in Comparative Example 26, except for preparing a positive electrode precursor using with respect to the composition of the positive electrode coating solution, 76.5 parts by weight of activated carbon 1, 6.3 parts by weight of lithium carbonate 3, 4.1 parts by weight of Ketjen black, 2.1 parts by weight of PVP (polyvinyl pyrrolidone), and 11.0 parts by weight of PVDF (polyvinylidene fluoride) as well as NMP (N-methylpyrrolidone) as a dispersing solvent.

Comparative Example 29

A nonaqueous hybrid capacitor was prepared in a similar manner as described in Comparative Example 28, except for preparing a positive electrode precursor using a mixed solvent of NMP (N-methylpyrrolidone) and pure water in a weight ratio of 99.9:0.1 as a dispersing solvent for the positive electrode coating solution.

Comparative Example 30

A nonaqueous hybrid capacitor was prepared in a similar manner as described in Comparative Example 26, except for preparing a positive electrode precursor using with respect to the composition of the positive electrode coating solution, 71.7 parts by weight of activated carbon 1, 12.2 parts by weight of lithium carbonate 3, 3.9 parts by weight of Ketjen black, 1.9 parts by weight of PVP (polyvinyl pyrrolidone), and 10.3 parts by weight of PVDF (polyvinylidene fluoride) as well as NMP (N-methylpyrrolidone) as a dispersing solvent.

Comparative Example 31

A nonaqueous hybrid capacitor was prepared in a similar manner as described in Comparative Example 30, except for preparing a positive electrode precursor using a mixed solvent of NMP (N-methylpyrrolidone) and pure water in a weight ratio of 99.9:0.1 as a dispersing solvent for the positive electrode coating solution.

Comparative Example 32

A nonaqueous hybrid capacitor was prepared in a similar manner as described in Comparative Example 26, except for preparing a positive electrode precursor using with respect to the composition of the positive electrode coating solution, 64.4 parts by weight of activated carbon 1, 21.1 parts by weight of lithium carbonate 3, 3.5 parts by weight of Ketjen black, 1.7 parts by weight of PVP (polyvinyl pyrrolidone), and 9.3 parts by weight of PVDF (polyvinylidene fluoride) as well as a mixed solvent of NMP (N-methylpyrrolidone) and pure water in a weight ratio of 90:10 as a dispersing solvent.

Comparative Example 33

A nonaqueous hybrid capacitor was prepared in a similar manner as described in Comparative Example 32, except for preparing a positive electrode precursor using a mixed solvent of NMP (N-methylpyrrolidone) and pure water in a weight ratio of 80:20 as a dispersing solvent for the positive electrode coating solution.

Comparative Example 34

A nonaqueous hybrid capacitor was prepared in a similar manner as described in Comparative Example 26, except for preparing a positive electrode precursor using with respect to the composition of the positive electrode coating solution, 55.6 parts by weight of activated carbon 1, 31.9 parts by weight of lithium carbonate 3, 3.0 parts by weight of Ketjen black, 1.5 parts by weight of PVP (polyvinyl pyrrolidone), and 8.0 parts by weight of PVDF (polyvinylidene fluoride) as well as a mixed solvent of NMP (N-methylpyrrolidone) and pure water in a weight ratio of 90:10 as a dispersing solvent.

Comparative Example 35

A nonaqueous hybrid capacitor was prepared in a similar manner as described in Comparative Example 34, except for preparing a positive electrode precursor using a mixed solvent of NMP (N-methylpyrrolidone) and pure water in a weight ratio of 80:20 as a dispersing solvent for the positive electrode coating solution.

Comparative Example 36

A nonaqueous hybrid capacitor was prepared in a similar manner as described in Comparative Example 26, except for preparing a positive electrode precursor using with respect to the composition of the positive electrode coating solution a coating solution of a positive electrode, 30.8 parts by weight of activated carbon 1, 62.3 parts by weight of lithium carbonate 3, 1.7 parts by weight of Ketjen black, 0.8 part by weight of PVP (polyvinyl pyrrolidone), and 4.4 parts by weight of PVDF (polyvinylidene fluoride) as well as a mixed solvent of NMP (N-methylpyrrolidone) and pure water in a weight ratio of 90:10 as a dispersing solvent.

Comparative Example 37

A nonaqueous hybrid capacitor was prepared in a similar manner as described in Comparative Example 36, except for preparing a positive electrode precursor using a mixed solvent of NMP (N-methylpyrrolidone) and pure water in a weight ratio of 80:20 as a dispersing solvent for the positive electrode coating solution.

The evaluation results of positive electrode precursors and those of nonaqueous hybrid capacitors in Examples 30 to 47 and Comparative Examples 26 to 37 are shown in Table 3.

TABLE 3

|  | X (% by weight) | $S_1$ (%) | $S_1/X$ | $S_2$ (%) | $S_2/X$ | Fa (F) |
|---|---|---|---|---|---|---|
| Exp. 30 | 31.9 | 25.6 | 0.80 | 24.5 | 0.77 | 11.52 |
| Exp. 31 | 32.1 | 34.9 | 1.09 | 33.8 | 1.05 | 11.87 |
| Exp. 32 | 32.0 | 47.2 | 1.48 | 45.1 | 1.41 | 11.49 |
| Exp. 33 | 21.0 | 15.2 | 0.72 | 13.2 | 0.63 | 11.65 |
| Exp. 34 | 21.2 | 22.5 | 1.06 | 20.7 | 0.98 | 11.38 |
| Exp. 35 | 21.1 | 31.7 | 1.50 | 30.9 | 1.46 | 11.54 |
| Exp. 36 | 12.3 | 9.6 | 0.78 | 8.9 | 0.72 | 11.39 |
| Exp. 37 | 12.3 | 13.1 | 1.07 | 11.1 | 0.90 | 11.41 |
| Exp. 38 | 12.2 | 18.9 | 1.55 | 17.2 | 1.41 | 11.15 |
| Exp. 39 | 8.9 | 6.3 | 0.71 | 5.9 | 0.66 | 10.97 |
| Exp. 40 | 8.8 | 9.1 | 1.03 | 8.4 | 0.95 | 11.05 |
| Exp. 41 | 8.8 | 15.3 | 1.74 | 13.9 | 1.58 | 10.96 |
| Exp. 42 | 6.2 | 5.4 | 0.87 | 5.1 | 0.82 | 10.86 |
| Exp. 43 | 6.3 | 7.3 | 1.16 | 6.7 | 1.06 | 10.97 |
| Exp. 44 | 6.3 | 12.5 | 1.98 | 11.1 | 1.76 | 10.98 |
| Exp. 45 | 47.2 | 30.3 | 0.64 | 28.0 | 0.59 | 11.97 |
| Exp. 46 | 47.3 | 45.1 | 0.95 | 42.1 | 0.89 | 11.99 |
| Exp. 47 | 47.1 | 58.9 | 1.25 | 55.1 | 1.17 | 12.14 |
| Com. Exp. 26 | 3.8 | 1.2 | 0.32 | 0.9 | 0.24 | 6.69 |
| Com. Exp. 27 | 3.9 | 1.7 | 0.44 | 1.3 | 0.33 | 7.71 |
| Com. Exp. 28 | 6.2 | 2.5 | 0.40 | 1.9 | 0.31 | 8.36 |
| Com. Exp. 29 | 6.3 | 3.1 | 0.49 | 2.8 | 0.44 | 9.17 |
| Com. Exp. 30 | 12.1 | 4.9 | 0.40 | 4.2 | 0.35 | 8.86 |
| Com. Exp. 31 | 12.2 | 5.9 | 0.48 | 4.9 | 0.40 | 9.45 |
| Com. Exp. 32 | 21.0 | 45.5 | 2.17 | 43.4 | 2.07 | 9.45 |
| Com. Exp. 33 | 21.2 | 51.1 | 2.41 | 49.1 | 2.32 | 8.37 |
| Com. Exp. 34 | 31.8 | 68.4 | 2.15 | 64.9 | 2.04 | 9.26 |
| Com. Exp. 35 | 31.9 | 73.2 | 2.29 | 71.1 | 2.23 | 9.01 |
| Com. Exp. 36 | 62.4 | 75.5 | 1.21 | 72.3 | 1.16 | 8.56 |
| Com. Exp. 37 | 62.3 | 79.2 | 1.27 | 75.7 | 1.22 | 8.15 |

As explained about the present embodiments above, charging and discharging of the nonaqueous hybrid capacitor proceed by decomposing the alkali metal compound contained in the positive electrode precursor, from which the alkali metal ions associating with charging and discharging are pre-doped to the negative electrode or released in the electrolytic solution.

From Table 3, it has been understood that the capacitance of the nonaqueous hybrid capacitor takes the maximum value, when $5 \leq X \leq 50$, $5 \leq S_1 \leq 60$, and $0.50 \leq S_1/X \leq 2.00$ are all satisfied. The reason is conjectured as follows: When X is below 5, the static capacitance Fa decreases, because the concentration of the alkali metal ions associated with charging and discharging are deficient; when X is larger than 60, the pre-doping rate is decreased, because the excessive amount of the alkali metal compound covers the surface of the active material; when $S_1$ is less than 5 or $S_1/X$ is less than 0.50, the reaction overvoltage in the pre-doping increases, because the electric conduction between the positive electrode active material and the alkali metal compound is insufficient; when $S_1$ is larger than 60 or $S_1/X$ is larger than 2.00, the excessive amount of the alkali metal compound covers the surface of the positive electrode active material, from which diffusion of the alkali metal ions generated by decomposition of the alkali metal compound into the electrolytic solution is inhibited, thereby the pre-doping rate is decreased.

It is conjectured that when the coating solution for the positive electrode is dispersed, the alkali metal compound in the coating solution which dissolves in a trace amount by addition of a trace amount of pure water into NMP could stick to the surface of the activated carbon in a moderate amount. Therefore, it is considered that the alkali metal compound in the pre-doping was decomposed efficiently, and the pre-doping was completed in a short period of only 2 hours. On the other hand, it is conjectured that when the amount of pure water increases to about 10%, an excessive amount of the alkali metal compound proceeds to dissolve into the solution, from which impregnation of the electrolytic solution became incomplete, since the surface and the side of the activated carbon are converted with the alkali metal compound, thereby decomposition of the alkali metal compound was inhibited.

Example 48

A nonaqueous hybrid capacitor was prepared in a similar manner as described in Example 30, except for using activated carbon 2 as the activated carbon and sodium carbonate as the alkali metal compound.

Example 49

A nonaqueous hybrid capacitor was prepared in a similar manner as described in Example 30, except for using activated carbon 2 as the activated carbon and potassium carbonate as the alkali metal compound.

Example 50

A nonaqueous hybrid capacitor was prepared in a similar manner as described in Example 30, except for using activated carbon 2 as the activated carbon, and a mixture of lithium carbonate and sodium carbonate in a weight ratio of 9:1 as the alkali metal compound.

Example 51

A nonaqueous hybrid capacitor was prepared in a similar manner as described in Example 30, except for using activated carbon 2 as the activated carbon, and a mixture of lithium carbonate and sodium carbonate in a weight ratio of 1:1 as the alkali metal compound.

Example 52

A nonaqueous hybrid capacitor was prepared in a similar manner as described in Example 30, except for using activated carbon 2 as the activated carbon, and a mixture of lithium carbonate and sodium carbonate in a weight ratio of 1:9 as the alkali metal compound.

Example 53

A nonaqueous hybrid capacitor was prepared in a similar manner as described in Example 30, except for using activated carbon 2 as the activated carbon, and a mixture of lithium carbonate and potassium carbonate in a weight ratio of 9:1 as the alkali metal compound.

Example 54

A nonaqueous hybrid capacitor was prepared in a similar manner as described in Example 30, except for using activated carbon 2 as the activated carbon, and a mixture of lithium carbonate and rubidium carbonate in a weight ratio of 9:1 as the alkali metal compound.

Example 55

A nonaqueous hybrid capacitor was prepared in a similar manner as described in Example 30, except for using activated carbon 2 as the activated carbon, and a mixture of lithium carbonate and cesium carbonate in a weight ratio of 9:1 as the alkali metal compound.

Example 56

A nonaqueous hybrid capacitor was prepared in a similar manner as described in Example 30, except for using activated carbon 2 as the activated carbon, and a mixture of lithium carbonate, sodium carbonate, and potassium carbonate in a weight ratio of 9:0.5:0.5 as the alkali metal compound.

Comparative Example 38

A nonaqueous hybrid capacitor was prepared in a similar manner as described in Example 48, except for using a mixed solvent of NMP (N-methylpyrrolidone) and pure water in a weight ratio of 90:10 as a dispersing solvent for the positive electrode coating solution.

Comparative Example 39

A nonaqueous hybrid capacitor was prepared in a similar manner as described in Example 49, except for using a mixed solvent of NMP (N-methylpyrrolidone) and pure water in a weight ratio of 90:10 as a dispersing solvent for the positive electrode coating solution.

Comparative Example 40

A nonaqueous hybrid capacitor was prepared in a similar manner as described in Example 50, except for using a mixed solvent of NMP (N-methylpyrrolidone) and pure water in a weight ratio of 90:10 as a dispersing solvent for the positive electrode coating solution.

Comparative Example 41

A nonaqueous hybrid capacitor was prepared in a similar manner as described in Example 51, except for using a mixed solvent of NMP (N-methylpyrrolidone) and pure water in a weight ratio of 90:10 as a dispersing solvent for the positive electrode coating solution.

Comparative Example 42

A nonaqueous hybrid capacitor was prepared in a similar manner as described in Example 52, except for using a mixed solvent of NMP (N-methylpyrrolidone) and pure water in a weight ratio of 90:10 as a dispersing solvent for the positive electrode coating solution.

Comparative Example 43

A nonaqueous hybrid capacitor was prepared in a similar manner as described in Example 53, except for using a mixed solvent of NMP (N-methylpyrrolidone) and pure water in a weight ratio of 90:10 as a dispersing solvent for the positive electrode coating solution.

Comparative Example 44

A nonaqueous hybrid capacitor was prepared in a similar manner as described in Example 54, except for using a mixed solvent of NMP (N-methylpyrrolidone) and pure water in a weight ratio of 90:10 as a dispersing solvent for the positive electrode coating solution.

Comparative Example 45

A nonaqueous hybrid capacitor was prepared in a similar manner as described in Example 55, except for using a mixed solvent of NMP (N-methylpyrrolidone) and pure water in a weight ratio of 90:10 as a dispersing solvent for the positive electrode coating solution.

Comparative Example 46

A nonaqueous hybrid capacitor was prepared in a similar manner as described in Example 56, except for using a mixed solvent of NMP (N-methylpyrrolidone) and pure water in a weight ratio of 90:10 as a dispersing solvent for the positive electrode coating solution.

Example 57

A nonaqueous hybrid capacitor was prepared in a similar manner as described in Example 30, except for using activated carbon 2 as the activated carbon, and replacing the alkali metal compound with a mixture of lithium carbonate and sodium oxide in a weight ratio of 9:1.

Example 58

A nonaqueous hybrid capacitor was prepared in a similar manner as described in Example 30, except for using activated carbon 2 as the activated carbon, and replacing the alkali metal compound with a mixture of lithium carbonate and potassium hydroxide in a weight ratio of 9:1.

Example 59

A nonaqueous hybrid capacitor was prepared in a similar manner as described in Example 30, except for using activated carbon 2 as the activated carbon, and replacing the alkali metal compound with a mixture of lithium carbonate and sodium chloride in a weight ratio of 9:1.

Example 60

A nonaqueous hybrid capacitor was prepared in a similar manner as described in Example 30, except for using activated carbon 2 as the activated carbon, and replacing the alkali metal compound with a mixture of lithium carbonate and potassium fluoride in a weight ratio of 9:1.

The evaluation results of positive electrode precursors and those of nonaqueous hybrid capacitors in Examples 48 to 60 and Comparative Examples 38 to 46 are shown in Table 4.

TABLE 4

| | Alkali metal carbonate | | | | | | | |
|---|---|---|---|---|---|---|---|---|
| | Mixture | Formulation ratio | X (% by mass) | $S_1$ (%) | $S_1/X$ | $S_2$ (%) | $S_2/X$ | Fa (F) |
| Exp. 48 | $Na_2CO_3$ | 1 | 31.9 | 23.6 | 0.74 | 22.5 | 0.71 | 11.65 |
| Exp. 49 | $K_2CO_3$ | 1 | 32.0 | 23.1 | 0.72 | 22.8 | 0.71 | 11.72 |
| Exp. 50 | $Li_2CO_3\ Na_2CO_3$ | 9:1 | 32.1 | 24.2 | 0.75 | 23.1 | 0.72 | 11.83 |
| Exp. 51 | $Li_2CO_3\ Na_2CO_3$ | 1:1 | 32.2 | 24.4 | 0.76 | 23.1 | 0.72 | 11.52 |
| Exp. 52 | $Li_2CO_3\ Na_2CO_3$ | 1:9 | 32.0 | 25.1 | 0.78 | 22.5 | 0.70 | 11.24 |
| Exp. 53 | $Li_2CO_3\ K_2CO_3$ | 9:1 | 32.0 | 24.9 | 0.78 | 21.0 | 0.66 | 11.58 |
| Exp. 54 | $Li_2CO_3\ Rb_2CO_3$ | 9:1 | 32.1 | 25.8 | 0.80 | 23.1 | 0.72 | 11.32 |
| Exp. 55 | $Li_2CO_3\ Cs_2CO_3$ | 9:1 | 31.9 | 22.5 | 0.71 | 20.7 | 0.65 | 11.21 |
| Exp. 56 | $Li_2CO_3\ Na_2CO_3\ K_2CO_3$ | 9:0.5:0.5 | 32.0 | 26.1 | 0.82 | 24.7 | 0.77 | 11.68 |
| Com. Exp. 38 | $Na_2CO_3$ | 1 | 32.1 | 67.2 | 2.09 | 65.9 | 2.05 | 8.65 |
| Com. Exp. 39 | $K_2CO_3$ | 1 | 32.0 | 66.8 | 2.09 | 64.9 | 2.03 | 8.53 |
| Com. Exp. 40 | $Li_2CO_3\ Na_2CO_3$ | 9:1 | 32.1 | 69.8 | 2.17 | 68.3 | 2.13 | 9.02 |
| Com. Exp. 41 | $Li_2CO_3\ Na_2CO_3$ | 1:1 | 32.0 | 68.6 | 2.14 | 67.1 | 2.10 | 8.95 |
| Com. Exp. 42 | $Li_2CO_3\ Na_2CO_3$ | 1:9 | 32.1 | 67.8 | 2.11 | 64.8 | 2.02 | 8.91 |
| Com. Exp. 43 | $Li_2CO_3\ K_2CO_3$ | 9:1 | 31.9 | 69.5 | 2.18 | 65.8 | 2.06 | 9.11 |
| Com. Exp. 44 | $Li_2CO_3\ Rb_2CO_3$ | 9:1 | 31.9 | 67.8 | 2.13 | 65.1 | 2.04 | 9.04 |
| Com. Exp. 45 | $Li_2CO_3\ Cs_2CO_3$ | 9:1 | 32.1 | 69.5 | 2.17 | 67.4 | 2.10 | 8.76 |
| Com. Exp. 46 | $Li_2CO_3\ Na_2CO_3\ K_2CO_3$ | 9:0.5:0.5 | 32.0 | 68.1 | 2.13 | 67.1 | 2.10 | 8.97 |
| Exp. 57 | $Li_2CO_3\ Na_2O$ | 9:1 | 32.0 | 26.4 | 0.83 | 23.1 | 0.72 | 11.63 |
| Exp. 58 | $Li_2CO_3\ KOH$ | 9:1 | 32.1 | 27.8 | 0.87 | 25.8 | 0.80 | 11.52 |
| Exp. 59 | $Li_2CO_3\ NaCl$ | 9:1 | 32.0 | 25.3 | 0.79 | 22.1 | 0.69 | 11.49 |
| Exp. 60 | $Li_2CO_3$ | 9:1 | 32.0 | 22.1 | 0.69 | 20.6 | 0.64 | 11.31 |

In Table 4, even in the case that the different activated carbon and the different alkali metal compound are used, the static capacitance, Fa exhibits the maximum value, when $5 \leq X \leq 50$, $5 \leq S_1 \leq 60$, and $0.50 \leq S_1/X \leq 2.00$ are all satisfied, probably because a sufficient amount of the alkali metal ions are present in the nonaqueous electrolytic solution and the negative electrode of the nonaqueous hybrid capacitor.

A detailed explanation on the embodiments in the third aspect of the present invention will be given below.

Example 61

[Preparation of Positive Electrode Precursor]
A slurry for a positive electrode having a solid concentration of 14% by weight was obtained by mixing 63.5 parts by weight of commercial acetylene black (produced by Denka Co., Ltd.) as the positive electrode active material, 26.5 parts by weight of lithium carbonate having an average particle diameter of 3.0 µm as the lithium compound, 10.0 parts by weight of PTFE (polytetrafluoroethylene), and NMP (N-methylpyrrolidone). The positive electrode precursor was obtained by coating the resulting slurry on one surface of an aluminum foil having a thickness of 15 µm which is used as the positive electrode power collector, drying, and pressing it. The thickness of the positive electrode active material layer in the resulting positive electrode precursor was 36 µm. The film thickness of the positive electrode active material layer is a value determined by subtracting the thickness of the power collector from the average value of thicknesses of the positive electrode precursor measured at arbitrary 10 points of the precursor by using a film thickness meter (Linear Gauge Sensor, GS-551), manufactured by ONO SOKKI Co., Ltd. The amount, $A_1$ of lithium oxide per unit area of the positive electrode precursor was 8.5 g/m², and $A_1/B_1$ was 0.036.

[Preparation of Negative Electrode]

A slurry for a negative electrode was obtained by mixing 85.4 parts by weight of commercially available hard carbon (produced by Kureha Corp.), 8.3 parts by weight of acetylene black, 6.3 parts by weight of PVdF (polyvinylidene fluoride), and NMP (N-methylpyrrolidone). The negative electrode was obtained by coating the resulting slurry on one surface of an electrolytic copper foil having a thickness of 10 µm which is used as the negative electrode power collector, drying, and pressing it. The thickness of the negative electrode active material layer in the resulting negative electrode was measured in similar manner to that of the positive electrode active material layer, and was found to be 28 µm.

[Measurement of Capacitance Per Unit Weight of Negative Electrode]

By using the resulting negative electrode cut out in a size of 1.4 cm×2.0 cm (2.8 cm²) as an operating electrode, metal lithium used as a counter electrode and a reference electrode, respectively, and the nonaqueous solution as an electrolytic solution in which $LiPF_6$ was dissolved in propylene carbonate (PC) at a concentration of 1.0 mol/L, an electrochemical cell was prepared in an argon box.

For the resulting electrochemical cell, an initial charging capacitance was measured by the following procedure by using a charging and discharging apparatus (TOSCAT-3100U), manufactured by Toyosystem Corp.

For the electrochemical cell obtained, charging under the constant current of 0.5 mA/cm² was carried out up to 0.01 V at a temperature of 25° C., and further charging under the constant voltage was carried out down to the current value of 0.01 mA/cm². The charging capacitance for this charging under the constant current as well as charging under the constant voltage, which was evaluated as the initial charging capacitance was 1.6 mAh, and the capacitance, $G_1$ per unit area of the negative electrode was 5.7 Ah/m².

[Preparation of Nonaqueous Hybrid Capacitor]

Each sheet of the positive electrode precursor and the negative electrode, both of which were prepared above was cut out to a size of 1.4 cm×2.0 cm (2.8 cm²), respectively. In addition, one sheet of a separator made of polyethylene (manufactured by ASAHI KASEI E-materials Corp., thickness 20 µm) was prepared. An electrode laminated body was fabricated by laminating them in the order of the positive electrode precursor, the separator, and the negative electrode. In this electrode laminated body, $A_1$ was 8.5 g/m², $G_1$ 5.7 Ah/m², and thus, the value of $A_1/G_1$ was 1.49 g/Ah, all of which have been confirmed to satisfy requirement of the present invention.

An electrochemical cell was prepared by putting this laminated body and a stainless steel foil adhered with a metal lithium foil as a reference electrode to a container fabricated with an aluminum laminate film composed of polypropylene and an aluminum foil, and pouring the electrolytic solution to the container in which $LiPF_6$ was dissolved in propylene carbonate (PC) at a concentration of 1.0 mol/l.

(Voltage Applying Step (Pre-Doping Step))

The nonaqueous hybrid capacitor of Example 61 was prepared by carrying out for the resulting electrochemical cell an initial charging by a method of the constant current charging up to 5.0 V under the current value of 0.1 mA at an environment of 25° C., subsequently charging under the constant voltage at 5.0 V for 72 hours by using a charging and discharging apparatus (TOSCAT-3100U), manufactured by Toyosystem Corp., and pre-doping lithium ions to the negative electrode. The charging curves (the current value, the voltage change, the positive electrode potential change, and the negative electrode potential change) in this case are shown in FIG. 1.

Then, it has been confirmed by disassembling the nonaqueous hybrid capacitor prepared in the argon box that metal lithium did not deposit on the negative electrode surface.

Comparative Example 47

Figure 2:
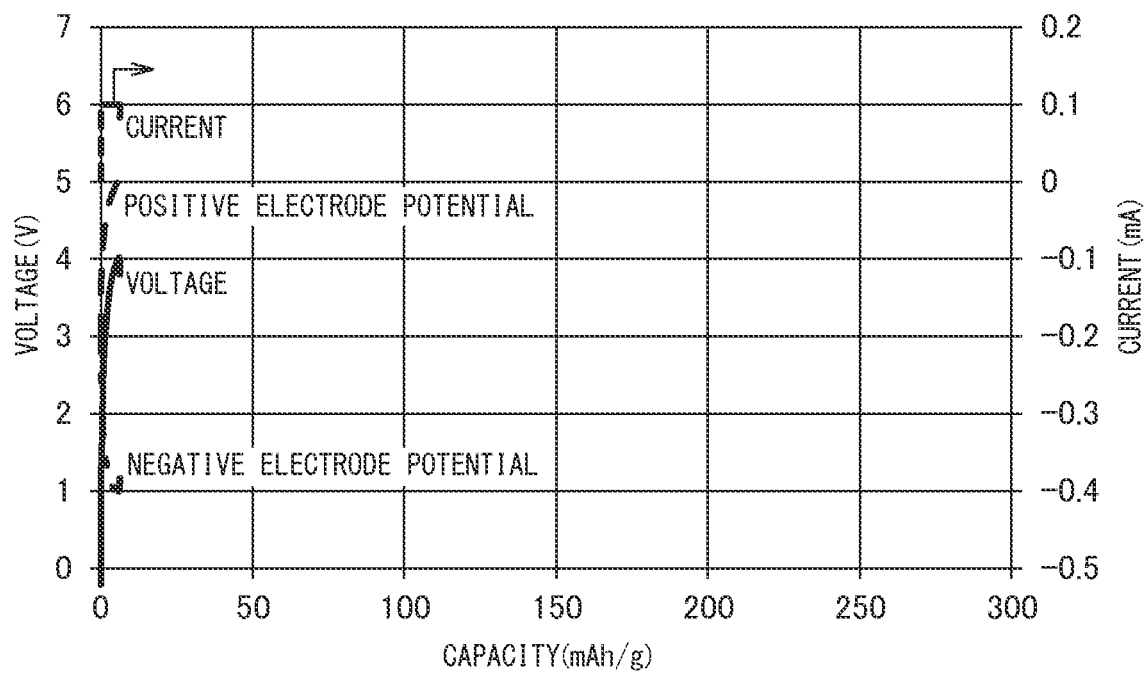
FIG. 2 is a drawing showing charging curves at the initial charging of the nonaqueous hybrid capacitor obtained in Comparative Example 1.

In [Preparation of positive electrode precursor] of the Example 61, a slurry for a positive electrode was prepared in a similar manner as described in Example 61 except for changing the amount of acetylene black to 90.0 parts by weight, and not using the alkali metal compound. By using the slurry, a positive electrode precursor having the positive electrode active material layer having a thickness of 34 µm was obtained. Then an electrochemical cell was fabricated, and evaluated by the similar method as described in Example 61 except for using the resulting positive electrode precursor. The charging curves at the initial charging are shown in FIG. 2.

Evaluation of Voltage Applying Step (Pre-Doping Step) (Comparison of Example 61 and Comparative Example 47)

In Comparative Example 47 (FIG. 2), an electric current of about 6 mAh/g flowed at the very initial period of charging, however, the reaction was finished just after this period. It is considered that the electric current flown at the initial period was generated by pre-doping of lithium ions in the electrolytic solution to the negative electrode, and the electric current was not flown after the electrolytes in the electrolytic solution were completely consumed.

On the other hand, in Example 61 (FIG. 1), the electric current of 264 mAh/g flowed, that was over the equivalent amount (6 mAh/g) of the electrolytes in the electrolytic solution. At the same time, by observing that the negative electrode potential dropped down to 0.2 V, a sufficient amount of lithium ions was confirmed to be pre-doped to the negative electrode. In Example 61, it is considered that by oxidative decomposition of the alkali metal compound in the positive electrode precursor at the initial charging period, followed by reduction of thus generated lithium ions at the negative electrode, therefore lithium ions were pre-doped to the negative electrode.

Example 62

[Preparation of Positive Electrode Precursor]

A carbide having an average particle diameter of 7 μm was obtained by carrying out carbonization treatment of a phenol resin in a furnace at 600° C. for 2 hours under a nitrogen atmosphere, crushing it using a ball mill, and carrying out its classification. Activation was carried out by mixing this carbide and KOH in a weight ratio of 1:4.3, and heating it at 800° C. for 1 hour in the furnace under a nitrogen atmosphere. Then, activated carbon 2a which was to be used as the positive electrode material was obtained by washing the activated carbon under stirring for 1 hour in a diluted hydrochloric acid, the concentration of which was adjusted to 2 mol/L, subsequently washing with distilled water under boiling in which pH holds in a range of pH 5 to 6, and then drying it.

The fine pore distribution in the resulting active carbon 2a was measured using a fine pore distribution measurement apparatus (AUTOSORB-1, AS-1-MP), manufactured by Yuasa Ionics Co. Ltd., and based on the desorption isotherm, the mesopore volume and micropore volume were determined by the BJH method and the MP method, respectively. The specific surface area was determined by the BET one-point method. As a result, the BET specific area was 3,120 m$^2$/g, the mesopore volume ($V_1$) 1.33 cc/g, micropore volume ($V_2$) 1.88 cc/g, and $V_1/V_2$=0.71.

A slurry having a solid concentration of 14% by weight was obtained by mixing 63.9 parts by weight of activated carbon 2a as the positive electrode active material, 30.5 parts by weight of lithium carbonate having an average particle diameter of 5.3 μm as the alkali metal compound, 6.3 parts by weight of ketjen black, and 6.3 parts by weight of PVdF (polyvinylidene fluoride), and NMP (N-methylpyrrolidone). A positive electrode precursor was obtained by coating the resulting slurry on one surface of an aluminum foil (thickness of 15 μm) which was used as the positive electrode power collector, drying, and pressing it. The thickness of the positive electrode active material layer in the resulting positive electrode precursor was 95 μm. $A_1/B_1$ of this positive electrode precursor was 0.44, and the amount $A_1$ of lithium carbonate per unit area was 32.0 g/m$^2$.

[Preparation of Negative Electrode]

The fine pore distribution of a commercial coconut shell activated carbon was measured using a fine pore distribution measurement apparatus (AUTOSORB-1, AS-1-MP, manufactured by Yuasa Ionics Co., Ltd., and nitrogen as an adsorbate. The specific surface area was determined by the BET one-point method. Based on the desorption isotherm, the mesopore volume and the micropore volume are calculated by the BJH method and the MP method, respectively. As a result, the BET specific area was 1780 m$^2$/g, the mesopore volume ($V_1$) 0.198 cc/g, the micropore volume ($V_2$) 0.695 cc/g, and $V_1/V_2$=0.29, and the average fine particle diameter was 21.2 Å.

A thermal reaction was carried out by putting 150 g of this coconut shell activated carbon in a cage made of a stainless steel mesh, putting it on a stainless steel tray containing 270 g of coal-based pitch (softening point: 50° C.), and installing it inside an electric furnace (effective dimension of inside the furnace: 300 mm×300 mm×300 mm). Composite porous material 1 which was used as the negative electrode material was prepared by heating it under a nitrogen atmosphere, increasing the temperature up to 600° C. over the period of 8 hours, and holding it at the same temperature for 4 hours. After cooling down the composite porous material to 60° C. by natural cooling, it was taken out from the furnace.

As for resulting composite porous material 1, the measurement of the fine pore distribution was carried out in similar manner to that of the coconut shell activated carbon, and the results were obtained as follows: the BET specific area was 262 m$^2$/g, the mesopore volume 0.180 cc/g, the micropore volume 0.0843 cc/g, and $V_1/V_2$=2.13.

A slurry was obtained by mixing 83.4 parts by weight of the composite porous material 1, 8.3 parts by weight of acetylene black, 8.3 parts by weight of PVdF (polyvinylidene fluoride), and NMP (N-methylpyrrolidone). Next, a negative electrode was obtained by coating the resulting slurry on one surface of an electrolytic copper foil having a thickness of 10 μm, which was to be used as the negative electrode power collector, drying, and pressing it. The thickness of the negative electrode active material layer in the resulting negative electrode was 43 μm.

[Fabrication of Nonaqueous Hybrid Capacitor]

One sheet of the positive electrode precursor prepared above was cut out to a size of 2.0 cm×2.0 cm (4.0 cm$^2$), and one sheet of the negative electrode prepared above was cut out to a size of 2.1 cm×2.1 cm (4.4 cm$^2$). Further, one sheet of a separator made of polyethylene (manufactured by ASAHI KASEI E-materials Corp., thickness 20 μm) was prepared. An electrode laminated body was fabricated by laminating them in the order of the positive electrode precursor, the separator, and the negative electrode. For this electrode laminated body, $A_1$ was 32.0 g/m$^2$, $G_1$ 22.0 Ah/m$^2$, and thus the value of $A_1/G_1$ was 1.45 g/Ah, all of which have been confirmed to satisfy the requirement of the present invention.

An electrochemical cell was prepared by putting this laminated body into a container formed with a laminate film composed of polypropylene and an aluminum foil, pouring into it the electrolytic solution in which LiPF$_6$ was dissolved in a mixed solvent of ethylene carbonate (EC) and ethyl methyl carbonate (EMC) in a weight ratio of 1:2 at a concentration of 1.5 mol/l.

(Voltage Applying Step (Pre-Doping Step))

In order to obtain the nonaqueous hybrid capacitor of Example 62, for the resulting electrochemical cell, after charging up to 4.5 V under the constant current of 2 mA at an environment of 25° C. by using a charging and discharging apparatus (TOSCAT-3100U), manufactured by Toyosystem Corp., followed by charging under the constant voltage at 4.5 V for 72 hours, lithium ions were pre-doped to the negative electrode.

Three pieces, in total, of the nonaqueous hybrid capacitor of Example 62 were prepared in a similar manner to that above.

[Measurement of Time Constant after Pre-Doping]

For the first piece of the nonaqueous hybrid capacitors fabricated above, discharging was carried out down to 2.2 V in a thermostat chamber set at 25° C. Next, after charging under the constant current of the maximum current of 2 mA as well as the constant voltage of the maximum voltage of 3.8 V was carried out for 1 hour, constant discharging at the discharging current of 10 mA was carried out down to 2.2 V.

The discharging capacitance at this time was 2.48 F, the direct current resistance value was 0.69Ω, and the time constant (ΩF) was calculated from them to be 1.71 sec.

By using the following values such as the voltage value at 0 second (initiation of discharging) denoted as $V_0$, $V_1$ corresponding to the voltage at 0 second which was obtained by extrapolating the voltages from during 1.0 to 2.0 seconds to 0 second, and the discharging a current value I, then a direct current resistance value expressed by the numerical equation of ($V_0-V_1$)/I was calculated.

[Presence or Absence of Deposition of Metal Lithium]

It has been confirmed by checking the surface of the negative electrode after disassembling the nonaqueous hybrid capacitor in an argon box that the metal lithium did not deposit on the surface.

[Charging and Discharging Cycle Characteristics Under High Load]

The second piece of the nonaqueous hybrid capacitor was installed in a thermostat chamber set at 25° C., and by setting a charging current to 0.2 Å as well as a discharging current to 0.2 Å using a charging and discharging apparatus (ACD-01), manufactured by Asca Densi Co., Ltd., high-load charging as well as discharging of the capacitor at the constant current for both charging and discharging in the range between the lower limit voltage of 2.2 V and the upper limit voltage of 3.8 V was repeated 5,000 cycles. After the high-load charging and discharging cycle were completed, the time constant was calculated by measuring the discharging capacitance and the direct current resistance in a similar manner to that of the previous method.

[Storage Characteristics at High Temperature]

The third piece of the nonaqueous hybrid capacitor was installed in a thermostat chamber set at 25° C., and charging under the constant current of the maximum current of 2 mA as well as under the constant voltage of the maximum voltage of 3.8 V was carried out for 1 hour by using a charging and discharging apparatus (ACD-01), manufactured by Asca Densi Co., Ltd. Next, the nonaqueous hybrid capacitor was immersed in Florinert FC40 (trade name, produced by 3M Co., Ltd., a fluorine-based inert liquid), where the temperature was adjusted to 25° C., and the volume of the nonaqueous hybrid capacitor was measured. After this, it was stored for 30 days in the thermostat chamber set at 80° C. After the elapse of the 30 days, it was stored in the thermostat chamber set at 25° C. for 2 hours, and then the volume of the nonaqueous hybrid capacitor was measured in a similar manner to the above method.

By comparing the volumes before and after storage at 80° C. for 30 days, it was confirmed that the gas generation volume during storage was only 0.1 cc.

Examples 63 to 70 and Comparative Examples 48 to 55

Each of positive electrode precursors for nonaqueous hybrid capacitors was fabricated in a similar manner to that described in Example 62 except for changing an amount of lithium carbonate in the positive electrode precursor and an amount of a slurry for the positive electrode to be coated on the positive electrode power collector.

Negative electrodes for the nonaqueous hybrid capacitors were prepared in a similar manner to that described in Example 62 except for adjusting an amount of a slurry for the negative electrode which was coated on the negative electrode power collector. Each of the nonaqueous hybrid capacitors was fabricated and evaluated in a similar manner to that described in Example 62 except for using the resulting positive electrode precursors and the negative electrodes. The evaluation results are shown in Table 5.

TABLE 5

|  | $A_1$ [g/m$^2$] | $G_1$ [Ah/m$^2$] | $B_1$ [g/m$^2$] | $A_1/G_1$ [g/Ah] | $A_1/B_1$ | Time const. after pre-doping [sec] | Deposition of metal Li | Time const. after charging/discharging cycle under high load [sec] |
|---|---|---|---|---|---|---|---|---|
| Exp. 62 | 32.0 | 22.0 | 72.9 | 1.45 | 0.44 | 1.71 | No | 1.79 |
| Exp. 63 | 32.0 | 17.2 | 72.9 | 1.86 | 0.44 | 1.65 | No | 1.72 |
| Exp. 64 | 32.0 | 29.8 | 72.9 | 1.07 | 0.44 | 1.77 | No | 1.83 |
| Exp. 65 | 24.2 | 22.0 | 72.9 | 1.1 | 0.33 | 1.74 | No | 1.84 |
| Exp. 66 | 42.1 | 22.0 | 72.9 | 1.91 | 0.58 | 1.81 | No | 1.87 |
| Exp. 67 | 32.0 | 22.0 | 35.4 | 1.45 | 0.90 | 1.89 | No | 1.95 |
| Exp. 68 | 18.5 | 17.2 | 72.9 | 1.08 | 0.25 | 1.74 | No | 1.89 |
| Exp. 69 | 32.0 | 17.2 | 35.4 | 1.86 | 0.90 | 1.73 | No | 1.81 |
| Exp. 70 | 25.3 | 17.2 | 52.2 | 1.47 | 0.48 | 1.76 | No | 1.87 |
| Com. Exp. 48 | 15.1 | 22.0 | 72.9 | 0.69 | 0.21 | 2.26 | No | 2.67 |
| Com. Exp. 49 | 17.3 | 22.0 | 52.2 | 0.79 | 0.33 | 2.05 | No | 2.48 |
| Com. Exp. 50 | 12.4 | 17.2 | 52.2 | 0.72 | 0.24 | 2.11 | No | 2.87 |
| Com. Exp. 51 | 15.8 | 17.2 | 52.2 | 0.92 | 0.30 | 1.97 | No | 2.65 |
| Com. Exp. 52 | 46.7 | 22.0 | 52.2 | 2.12 | 0.89 | 2.2 | Yes | 2.33 |
| Com. Exp. 53 | 46.7 | 22.0 | 72.9 | 2.12 | 0.64 | 2.38 | Yes | 2.52 |
| Com. Exp. 54 | 42.1 | 18.2 | 35.4 | 2.31 | 1.19 | 2.65 | Yes | 2.78 |
| Com. Exp. 55 | 46.7 | 18.2 | 35.4 | 2.57 | 1.32 | 3.02 | Yes | 3.18 |

Comparative Example 56

The nonaqueous hybrid capacitor was fabricated by a similar method as described in Example 62 except for using lithium oxalate instead of lithium carbonate as the lithium compound. The storage characteristics of the resulting storage element, at the high temperature were evaluated by a similar method described in Example 62, and it has been confirmed that 1.8 cc of gas was generated.

It has been understood by comparing Example 62 with Comparative Example 56, that gas was generated during storage at the high temperature when lithium oxalate was used instead of the lithium compound specified in the present invention. It is considered that, in the case of the lithium compound having low oxidation potential and being represented by lithium oxalate, the lithium compound does not react completely in the voltage applying step, thereby gas was generated due to the lithium compound remained in the storage element.

Example 71

A nonaqueous hybrid capacitor was fabricated by a similar method as described in Example 62 except for carrying out charging under the conditions of constant voltage of 4.2 V and an environment of 60° C. for 168 hours as those in the voltage application step (pre-doping step). A charging current was observed in the resulting nonaqueous hybrid capacitor by charging at 4.2 V, from which it has been confirmed that pre-doping of lithium ions to a negative electrode proceeded.

Comparative Example 57

A nonaqueous hybrid capacitor was fabricated by a similar method as described in Example 62 except for carrying out charging under the conditions of the constant voltage of 4.1 V and an environment of 60° C. for 168 hours as those in the voltage application step (pre-doping step). The resulting nonaqueous hybrid capacitor did not operate as the storage element.

Comparison of Example 71 and Comparative Example 57

By comparing Example 71 with Comparative Example 57, it has been understood that the voltage of equal to or higher than 4.2 V ought to be applied to the nonaqueous hybrid capacitor in order to carry out pre-doping of lithium ions to the negative electrode by decomposing a lithium compound contained in a positive electrode.

Example 72

[Preparation of Positive Electrode Precursor]
A positive electrode precursor having thickness (37 μm) of the positive electrode active material layer was obtained in a similar manner as described in Example 61 except for using 70.0 parts by weight of acetylene black and 20.0 parts by weight of lithium oxide having an average particle diameter of 23 μm, instead of lithium carbonate as the lithium compound. $A_1/G_1$ of this positive electrode precursor was 0.25, and the amount, $A_1$ of lithium oxide per unit area of the positive electrode precursor was 7.0 g/m².
[Preparation of Lithium-Type Storage Element]
An electrode laminated body was fabricated by a similar method as described in Example 61 except for using the positive electrode precursor described above. For this electrode laminated body, $A_1$ was 7.0 g/m², and $G_1$ was 5.7 Ah/m², from which $A_1/G_1$ can be calculated as 1.23, and it has been confirmed that the requirement of the present invention is satisfied.

Figure 3:
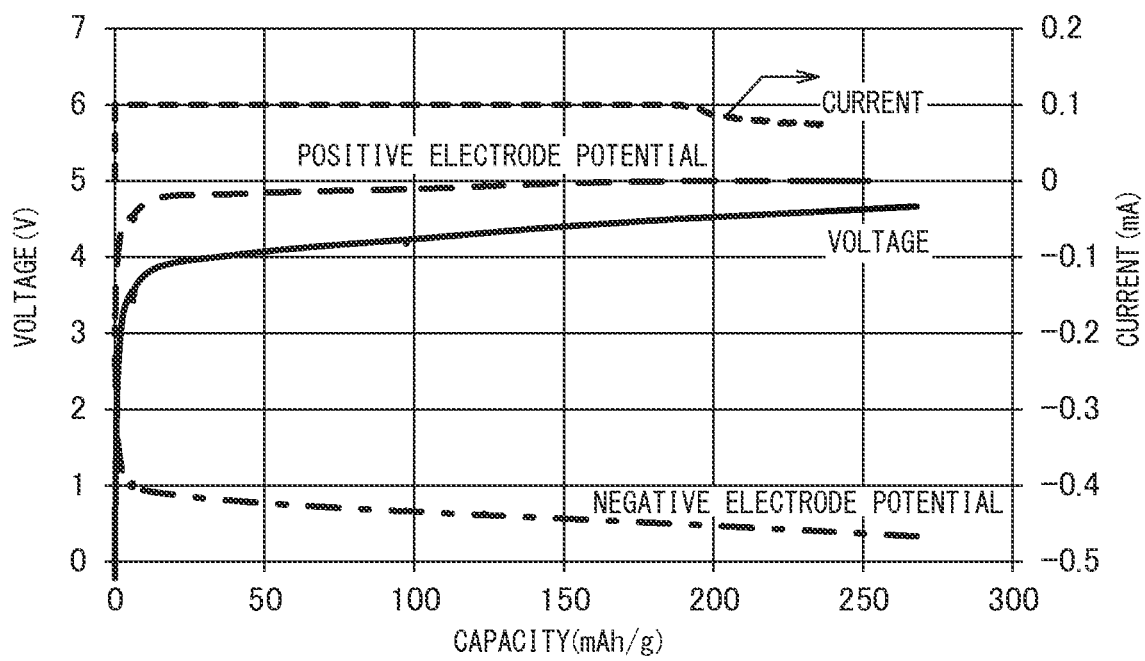
FIG. 3 is a drawing showing charging curves at the initial charging of the nonaqueous hybrid capacitor obtained in Example 12.

The following nonaqueous hybrid capacitors were fabricated by a similar method as described in Example 61 by using the electrode laminated body.
<Evaluation of Voltage Application Step (Pre-Doping Step)>
Pre-doping of lithium ions to the negative electrode in the resulting electrochemical cell was carried out by a similar method as described in Example 61. The charging curves (the current value, the voltage change, the positive electrode potential change, and the negative electrode potential change) at this time are shown in FIG. 3.

In Example 72, too, by a similar manner as described in Example 61, an electric current of 268 mAh/g flowed in the negative electrode which was larger than the reacted amount (10 mAh/g) of the electrolyte contained in an electrolytic solution, and the negative electrode potential was lowered to 0.2 V, from which a sufficient amount of lithium ions was able to be pre-doped to the negative electrode. As described above, it has been confirmed that even in the case that lithium oxide was used as the lithium compound, lithium ions can be pre-doped to the negative electrode by allowing oxidative decomposition of a lithium compound to proceed in a similar manner to the case of lithium carbonate, and by reducing the generated lithium ions at the negative electrode.

Examples 73 to 81 and Comparative Examples 58 to 65

Each of positive electrode precursors of nonaqueous hybrid capacitors was fabricated in a similar manner as described in Example 62 except for using lithium hydroxide as the lithium compound, and changing an amount of lithium hydroxide in the positive electrode active material layer and an amount of a slurry to be coated on to the positive electrode power collector.

Negative electrodes of the nonaqueous hybrid capacitors were fabricated in a similar manner as described in Example 62 except for adjusting an amount of the slurry for the negative electrode to be coated on to the negative electrode power collector.

Each of the nonaqueous hybrid capacitors was fabricated and evaluated by a similar method as described in Example 62 except for using the resulting positive electrode precursors and the negative electrode. The evaluation results are shown in Table 6.

TABLE 6

|  | $A_1$ [g/m²] | $G_1$ [Ah/m²] | $B_1$ [g/m²] | $A_1/G_1$ [g/Ah] | $A_1/B_1$ | Time const. after pre-doping [sec] | Deposition of metal Li | Time const. after charging/discharging cycle under high load [sec] |
|---|---|---|---|---|---|---|---|---|
| Exp. 73 | 31.0 | 22.0 | 74.5 | 1.41 | 0.42 | 0.00 | No | 1.76 |
| Exp. 74 | 31.0 | 17.2 | 74.5 | 1.80 | 0.42 | 0.00 | No | 1.71 |
| Exp. 75 | 31.0 | 25.0 | 74.5 | 1.04 | 0.42 | 0.00 | No | 1.94 |
| Exp. 72 | 25.4 | 22.0 | 74.5 | 1.15 | 0.34 | 0.00 | No | 1.84 |
| Exp. 77 | 43.2 | 22.0 | 74.5 | 1.96 | 0.58 | 0.00 | No | 1.89 |
| Exp. 78 | 31.0 | 22.0 | 36.2 | 1.41 | 0.86 | 0.00 | No | 1.91 |
| Exp. 79 | 18.9 | 17.2 | 74.5 | 1.10 | 0.25 | 0.00 | No | 1.92 |
| Exp. 80 | 31.0 | 17.2 | 36.2 | 1.60 | 0.86 | 0.00 | No | 1.86 |
| Exp. 81 | 22.7 | 17.2 | 55.1 | 1.32 | 0.41 | 0.00 | No | 1.87 |
| Com. Exp. 58 | 13.4 | 22.0 | 72.9 | 0.61 | 0.18 | 2.26 | No | 2.76 |
| Com. Exp. 59 | 17.1 | 22.0 | 55.1 | 0.78 | 0.31 | 2.05 | No | 2.53 |
| Com. Exp. 60 | 13.1 | 17.2 | 55.1 | 0.76 | 0.24 | 2.11 | No | 2.80 |
| Com. Exp. 61 | 15.1 | 17.2 | 55.1 | 0.88 | 0.27 | 1.97 | No | 2.42 |

TABLE 6-continued

| | $A_1$ [g/m²] | $G_1$ [Ah/m²] | $B_1$ [g/m²] | $A_1/G_1$ [g/Ah] | $A_1/B_1$ | Time const. after pre-doping [sec] | Deposition of metal Li | Time const. after charging/ discharging cycle under high load [sec] |
|---|---|---|---|---|---|---|---|---|
| Com. Exp. 62 | 48.1 | 22.0 | 55.1 | 2.19 | 0.87 | 2.20 | Yes | 2.31 |
| Com. Exp. 63 | 48.1 | 22.0 | 74.5 | 2.19 | 0.65 | 2.38 | Yes | 2.49 |
| Com. Exp. 64 | 45.3 | 18.2 | 36.2 | 2.49 | 1.25 | 2.65 | Yes | 2.75 |
| Com. Exp. 65 | 48.1 | 16.2 | 36.2 | 2.64 | 1.33 | 3.02 | Yes | 3.13 |

Example 82

[Preparation of Electrolytic Solution]

After a solution was prepared by mixing ethylene carbonate (EC) and methyl ethyl carbonate (EMC) in a weight ratio of 1:2, and dissolving $LiPF_6$ to 1 L of the mixture so as to adjust the concentration of $LiPF_6$ to be 1.5 mol/L, by adding 3% by weight of ferrocene as an additive for the electrolytic solution with respect to the solution, an electrolytic solution of this Example 82 was prepared.

[Preparation of Nonaqueous Hybrid Capacitor]

A nonaqueous hybrid capacitor was fabricated by a similar method as described in Example 62 except for carrying out charging by using the electrolytic solution under the conditions of the constant voltage of 4.2 V and an environment of 45° C. for 168 hours as those in the voltage application step (pre-doping step).

In the voltage application step a charging current was observed by charging at 4.2 V, from which it has been confirmed that pre-doping of lithium ions to the negative electrode proceeded.

Example 83

A nonaqueous hybrid capacitor was fabricated by a similar method as described in Example 82 except for using 3% by weight of titanocene dichloride, instead of ferrocene as the additive for the electrolytic solution.

In the voltage application step a charging current was observed accompanied with charging at 4.2 V, from which it has been confirmed that pre-doping of lithium ions to the negative electrode proceeded.

Example 84

A nonaqueous hybrid capacitor was fabricated by a similar method as described in Example 82 except for using 5% by weight of 12-crown 4-ether, instead of ferrocene as the additive for the electrolytic solution.

In the voltage application step a charging current was observed accompanied with charging at 4.2 V, from which it has been confirmed that pre-doping of lithium ions to the negative electrode proceeded.

Evaluation of Examples 82 to 84

In Examples 82 to 84, pre-doping of lithium ions to a negative electrode proceeded by the voltage applying step at an environment of 45° C. The reason is as follows: Activation energy of an oxidation reaction of the lithium compound lowered by addition of Lewis acid or Lewis base to the electrolytic solution, and thus the temperature required in pre-doping of lithium ions lowered.

INDUSTRIAL APPLICABILITY

The positive electrode precursor of the present invention is suitable for use such as a positive electrode precursor of a nonaqueous hybrid capacitor which is used in a power regeneration system in automotive hybrid drive system, in which charging and discharging cycle characteristics under a high load are required; a power load smoothing system in natural power generation such as solar power generation, wind power generation, microgrid, and etc.; a non-service interruption power source system in production facility in a plant, etc.; a non-contact power supply system aiming at microwave power transmission, smoothing of voltage variation of electrolytic resonance, and energy storage; an energy harvest system aiming at utilization of power generated by vibration power, and etc. The nonaqueous hybrid capacitor can be used for a storage module, for example, by connecting multiple pieces of the nonaqueous lithium storage elements in series or in parallel. The nonaqueous hybrid capacitor of the present invention is preferably applied, and used as the lithium ion capacitor since the maximum effect of the present invention can be achieved.

The invention claimed is:
1. A positive electrode precursor comprising:
a positive electrode active material containing a carbon material; and
an alkali metal compound,
wherein the positive electrode precursor has one surface and another surface, and a positive electrode active material layer is present at the one surface or both the one surface and the other of the positive electrode precursor,
wherein $24.2 \leq A \leq 42.1$, when A (g/m²) is a weight of the alkali metal compound in the positive electrode active material layer at the one surface of the positive electrode precursor,
wherein $10 \leq B \leq 100$ as well as $0.20 \leq A/B \leq 1.00$, when B (g/m²) is a weight of the positive electrode active material in the positive electrode active material layer, and
wherein $1 \leq C \leq 20$ as well as $0.116 \leq C/B \leq 0.5$, when C (m²/cm²) is a specific surface area measured by the BET method using nitrogen as an adsorbate at the one surface of the positive electrode precursor per unit area of the one surface of the positive electrode precursor.

* * * * *